(12) United States Patent
Sinclair

(10) Patent No.: US 7,383,375 B2
(45) Date of Patent: Jun. 3, 2008

(54) DATA RUN PROGRAMMING

(75) Inventor: Alan Welsh Sinclair, Falkirk (GB)

(73) Assignee: SanDisk Corporation, Milpitas, CA (US)

(*) Notice: Subject to any disclaimer, the term of this patent is extended or adjusted under 35 U.S.C. 154(b) by 411 days.

(21) Appl. No.: 11/016,271

(22) Filed: Dec. 16, 2004

(65) Prior Publication Data

US 2005/0144367 A1 Jun. 30, 2005

Related U.S. Application Data

(63) Continuation-in-part of application No. 10/841,118, filed on May 7, 2004, which is a continuation-in-part of application No. 10/749,189, filed on Dec. 30, 2003.

(51) Int. Cl.
*G06F 12/00* (2006.01)

(52) U.S. Cl. ....................... 711/103; 711/203

(58) Field of Classification Search ...................... None
See application file for complete search history.

(56) References Cited

U.S. PATENT DOCUMENTS

| | | |
|---|---|---|
| 5,043,940 A | 8/1991 | Harari |
| 5,070,032 A | 12/1991 | Yuan et al. |
| 5,095,344 A | 3/1992 | Harari |
| 5,172,338 A | 12/1992 | Mehrotra et al. |
| 5,313,421 A | 5/1994 | Guterman et al. |
| 5,315,541 A | 5/1994 | Harari et al. |
| 5,343,063 A | 8/1994 | Yuan et al. |
| 5,367,484 A | 11/1994 | Alexander et al. |
| 5,404,485 A | 4/1995 | Ban |
| 5,473,765 A | 12/1995 | Gibbons et al. |
| 5,532,962 A | 7/1996 | Auclair et al. |
| 5,570,315 A | 10/1996 | Tanaka et al. |
| 5,661,053 A | 8/1997 | Yuan |
| 5,742,934 A | 4/1998 | Shinohara |
| 5,751,634 A | 5/1998 | Itoh |
| 5,768,192 A | 6/1998 | Eitan |
| 5,774,397 A | 6/1998 | Endoh et al. |
| 5,798,968 A | 8/1998 | Lee et al. |
| 5,860,124 A | 1/1999 | Matthews et al. |

(Continued)

FOREIGN PATENT DOCUMENTS

EP 0 887 732 12/1998

(Continued)

OTHER PUBLICATIONS

Conley et al., "Management of Non-Volatile Memory System Having Large Erase Blocks", U.S. Appl. No. 10/749,831, filed Dec. 30, 2003.

(Continued)

*Primary Examiner*—Reginald Bragdon
*Assistant Examiner*—Ngoc Dinh
(74) *Attorney, Agent, or Firm*—Weaver Austin Villeneuve Sampson LLP

(57) ABSTRACT

Data in data runs are stored in a non-volatile memory array in adaptive metablocks that are configured according to the locations of data boundaries. A serial flash buffer is used to store some data, while other data are directly stored in non-volatile memory. Data may be stored with alignment to data boundaries during updating of the data to improve efficiency of subsequent updates.

15 Claims, 46 Drawing Sheets

U.S. PATENT DOCUMENTS

| | | | |
|---|---|---|---|
| 5,890,192 A | 3/1999 | Lee et al. | |
| 5,903,495 A | 5/1999 | Takeuchi et al. | |
| 5,907,856 A | 5/1999 | Estakhri et al. | |
| 5,909,449 A | 6/1999 | So et al. | |
| 5,930,167 A | 7/1999 | Lee et al. | |
| 5,937,425 A | 8/1999 | Ban | |
| 6,011,725 A | 1/2000 | Eitan | |
| 6,034,897 A | 3/2000 | Estakhri et al. | |
| 6,046,935 A | 4/2000 | Takeuchi et al. | |
| 6,125,435 A | 9/2000 | Estakhri et al. | |
| 6,141,249 A | 10/2000 | Estakhri et al. | |
| 6,222,762 B1 | 4/2001 | Guterman et al. | |
| 6,226,728 B1 | 5/2001 | See et al. | |
| 6,272,610 B1 | 8/2001 | Katayama et al. | |
| 6,304,980 B1 | 10/2001 | Beardsley et al. | |
| 6,377,500 B1 | 4/2002 | Fujimoto et al. | |
| 6,401,160 B1 | 6/2002 | See et al. | |
| 6,421,279 B1 | 7/2002 | Tobita et al. | |
| 6,426,893 B1 | 7/2002 | Conley et al. | |
| 6,456,528 B1 | 9/2002 | Chen | |
| 6,490,649 B2 | 12/2002 | Sinclair | |
| 6,522,580 B2 | 2/2003 | Chen et al. | |
| 6,542,956 B1 | 4/2003 | Lee et al. | 711/103 |
| 6,563,734 B2 | 5/2003 | Taki | |
| 6,567,307 B1 | 5/2003 | Estakhri | |
| 6,571,261 B1 | 5/2003 | Wang-Knop et al. | |
| 6,591,330 B2 | 7/2003 | Lasser | |
| 6,643,170 B2 | 11/2003 | Huang et al. | 365/185.03 |
| 6,725,321 B1 | 4/2004 | Sinclair et al. | |
| 6,763,424 B2 | 7/2004 | Conley | |
| 6,871,259 B2 | 3/2005 | Hagiwara et al. | |
| 6,895,464 B2 | 5/2005 | Chow et al. | |
| 6,898,662 B2 | 5/2005 | Gorobets | |
| 7,032,065 B2 | 4/2006 | Gonzalez et al. | 711/103 |
| 2001/0042882 A1 | 11/2001 | Chang et al. | |
| 2002/0099904 A1 | 7/2002 | Conley | |
| 2003/0053334 A1 | 3/2003 | Chen | |
| 2003/0065899 A1 | 4/2003 | Gorobets | |
| 2003/0076709 A1 | 4/2003 | Huang et al. | |
| 2003/0109093 A1 | 6/2003 | Harari et al. | 438/200 |
| 2003/0110343 A1 | 6/2003 | Hagiwara et al. | |
| 2004/0103241 A1 | 5/2004 | Chang et al. | |
| 2005/0141312 A1 | 6/2005 | Sinclair et al. | |
| 2005/0141313 A1 | 6/2005 | Gorobets et al. | |
| 2005/0144357 A1 | 6/2005 | Sinclair | |
| 2005/0144363 A1 | 6/2005 | Sinclair | |
| 2005/0144365 A1 | 6/2005 | Gorobets et al. | |
| 2005/0144636 A1 | 6/2005 | Sinclair | 711/103 |
| 2005/0166087 A1 | 7/2005 | Gorobets | |

FOREIGN PATENT DOCUMENTS

| | | |
|---|---|---|
| EP | 0 977 121 A2 | 2/2000 |
| EP | 1424631 A | 6/2004 |
| JP | 5314019 | 11/1993 |
| WO | WO 00/49488 | 8/2000 |
| WO | WO 01/18640 A1 | 3/2001 |
| WO | WO 02/058074 | 7/2002 |
| WO | WO 03/029951 | 4/2003 |
| WO | WO 03/027828 | 5/2003 |
| WO | WO 2004/040457 | 5/2004 |
| WO | WO 2004/040458 | 5/2004 |
| WO | WO 2004/040459 | 5/2004 |
| WO | WO 2004/040578 | 5/2004 |

OTHER PUBLICATIONS

Bennett et al., "Non-Volatile Memory and Method With Block Management System", U.S. Appl. No. 10/750,155, filed Dec. 30, 2003.

Bennett et al., "Scratch Pad Block", U.S. Appl. No. 11/016,285, filed Dec. 16, 2004.

Eitan et al., "NROM: A Novel Localized Trapping, 2-Bit Nonvolatile Memory Cell," IEEE Electron Device Letters, vol. 21, No. 1, Nov. 2000, pp. 543-545.

EPO/ISA, "Notification of Transmittal of the International Search Report and the Written Opinion of the International Searching Authority, or the Declaration", mailed in related PCT/US2004/043692 on May 4, 2005, 9 pages.

ISA/EPO, "Communication Relating to the Results of the Partial International Search," mailed in related PCT/US2004/043680 on Jul. 5, 2005, 3 pages.

Chang, Li-Pin et al., "An Adaptive Striping Architecture for Flash Memory Storage Systems of Embedded Systems", Proceedings of the Eighth IEEE Real-Time and Embedded Technology and Applications Symposium, Sep. 24, 2002, pp. 187-196.

EPO/ISA, "Notification of Transmittal of the International Search Report and the Written Opinion of the International Searching Authority, or the Declaration", mailed in related PCT/US2004/043597 on Aug. 8, 2005, 12 pages.

EPO/ISA, "Notification of Transmittal of the International Search Report and the Written Opinion of the International Searching Authority, or the Declaration", mailed in related PCT/US2004/043680 on Sep. 23, 2005, 18 pages.

EPO/ISA, "Invitation to Pay Additional Fees, Communication Relating to the Results of the Partial International Search Report", mailed in related International Application No. PCT/US2004/043762 on Dec. 8, 2005, 5 pages.

EPO/ISA, "Notification of the Transmittal of the International Search Report and the Written Opinion of the International Searching Authority, or the Declaration", mailed in related International Application No. PCT/US2004/043377 on Dec. 2, 2005, 10 pages.

EPO/ISA, "Notification of Transmittal of the International Search Report and the Written Opinion of the International Searching Authority, or the Declaration" mailed in related PCT/US2004/043762 (published as WO 2005/066793 A2) on Apr. 4, 2006, 14 pages.

Taiwanese Patent Office, "Preliminary Notice of Rejection of the IPO," mailed in related Taiwanese patent application No. 093141438 on Mar. 17, 2006, 2 pages.

USPTO, "Office Action," mailed in related U.S. Appl. No. 10/749,189 on Apr. 28, 2006, 13 pages.

USPTO, "Office Action," mailed in related U.S. Appl. No. 10/749,189 on Jul. 3, 2007, 11 pages.

USPTO, "Office Action," mailed in related U.S. Appl. No. 10/841,118 on Jun. 16, 2006, 29 pages.

USPTO, "Final Office Action," U.S. Appl. No. 10/841,118 on Feb. 6, 2007, 32 pages.

European Patent Office, Examiner's Report mailed in corresponding European Application No. 04 815 389.4 on Aug. 23, 2007, 5 pages.

Kim et al., "A Space-Efficient Flash Translation Layer for CompactFlash Systems," IEEE Transaction on Consumer Electronics, vol. 48, No. 2, May 2002, pp. 366-375.

USPTO, Office Action, mailed in related U.S. Appl. No. 10/841,118 on Oct. 19, 2007, 9 pages.

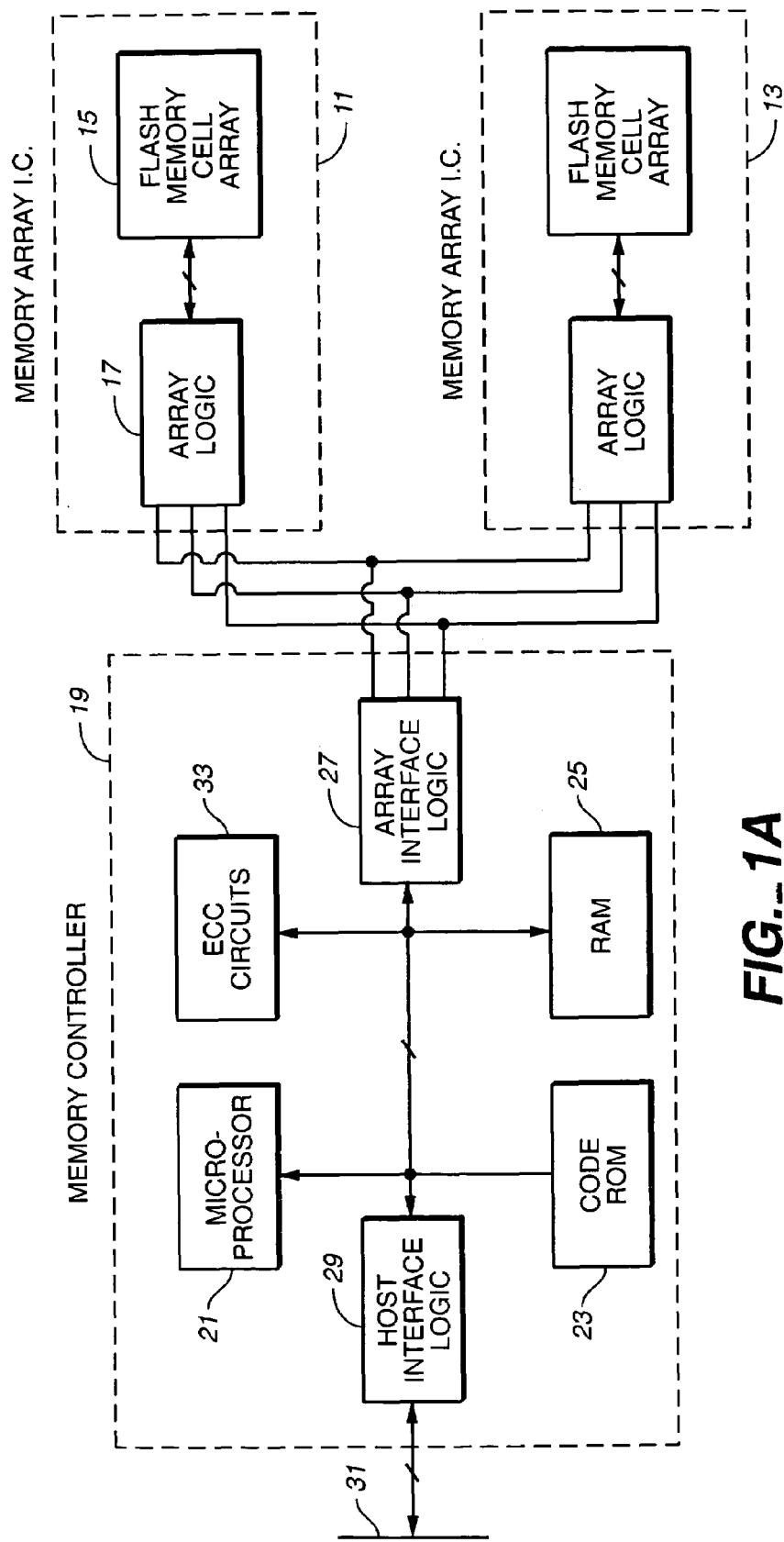
FIG._1A

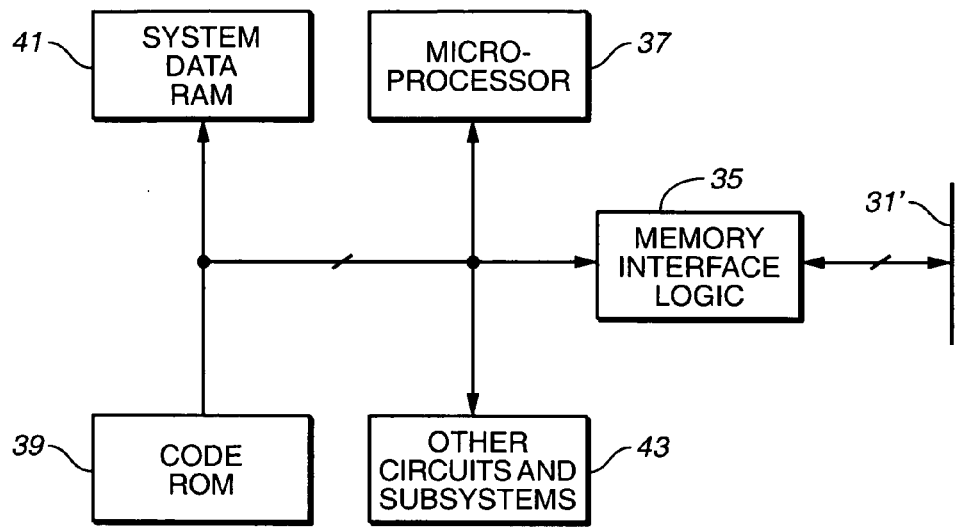
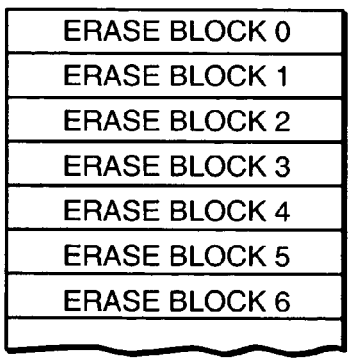
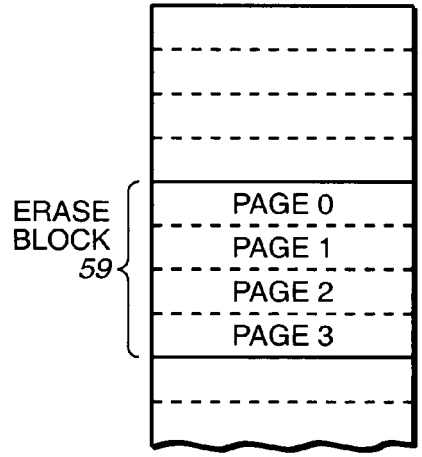
FIG._1B
FIG._2
FIG._4
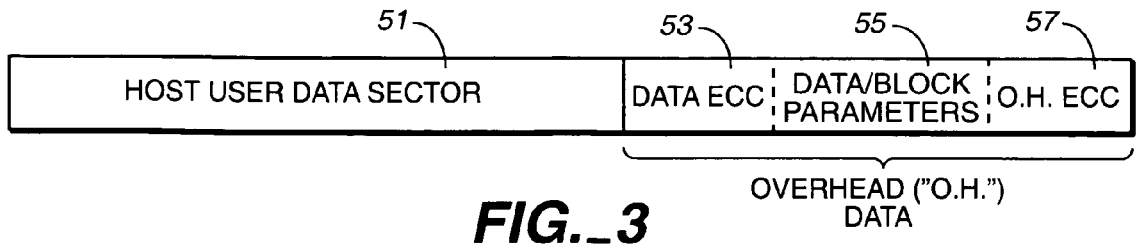
FIG._3

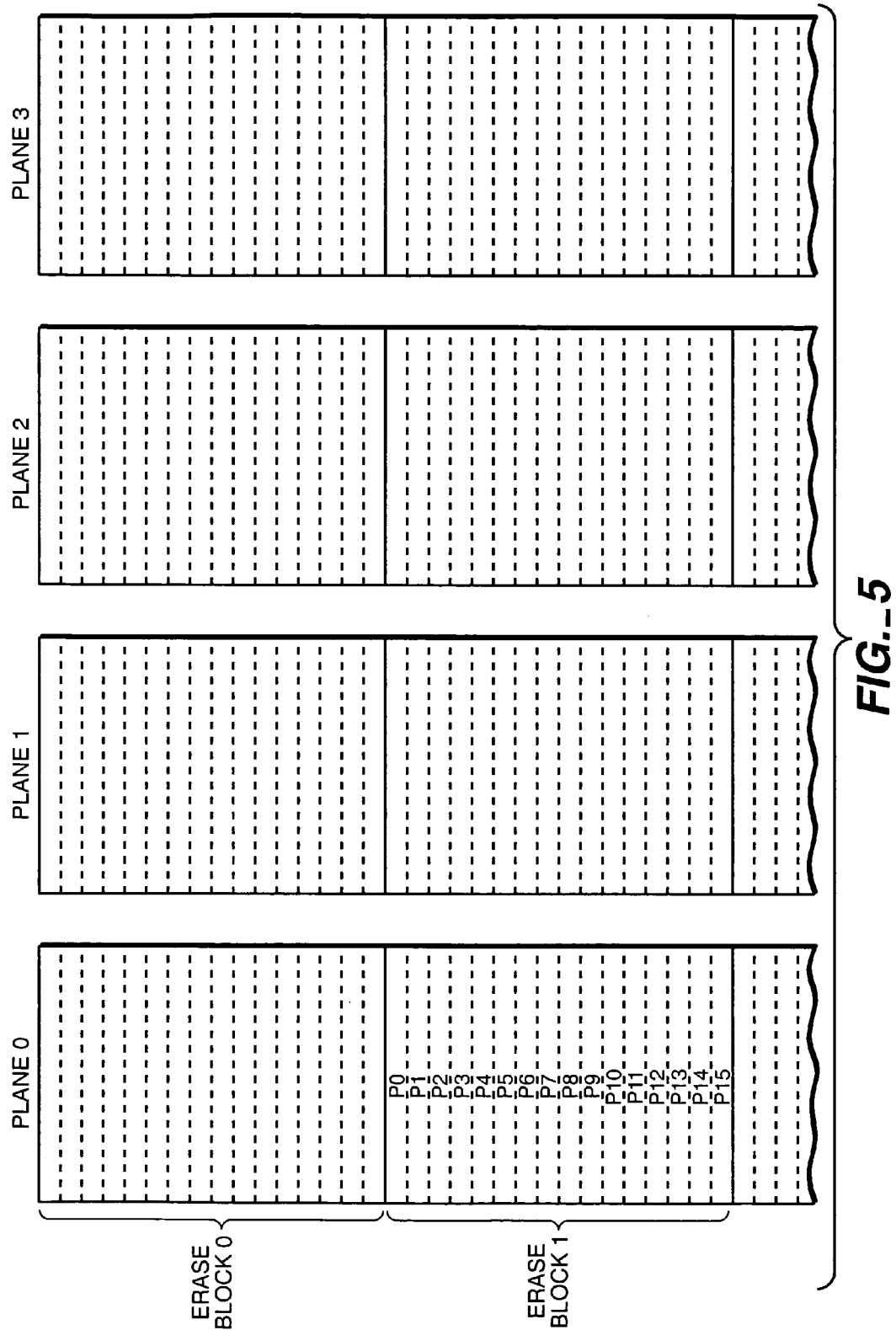
FIG._5

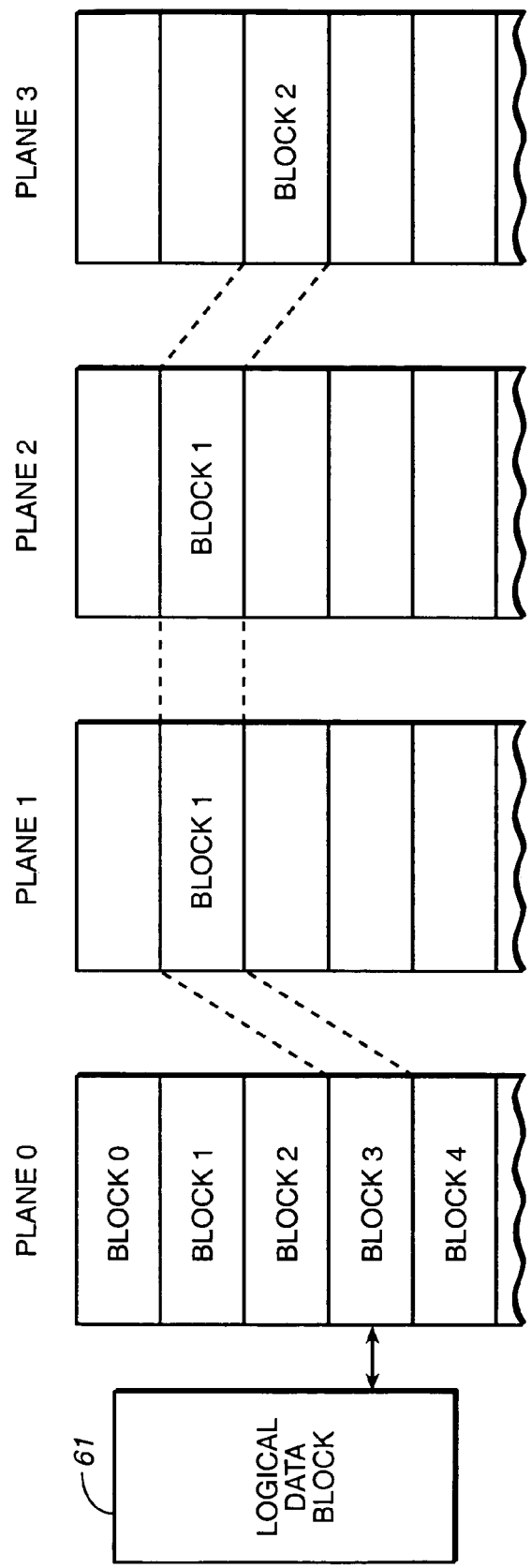
FIG._6

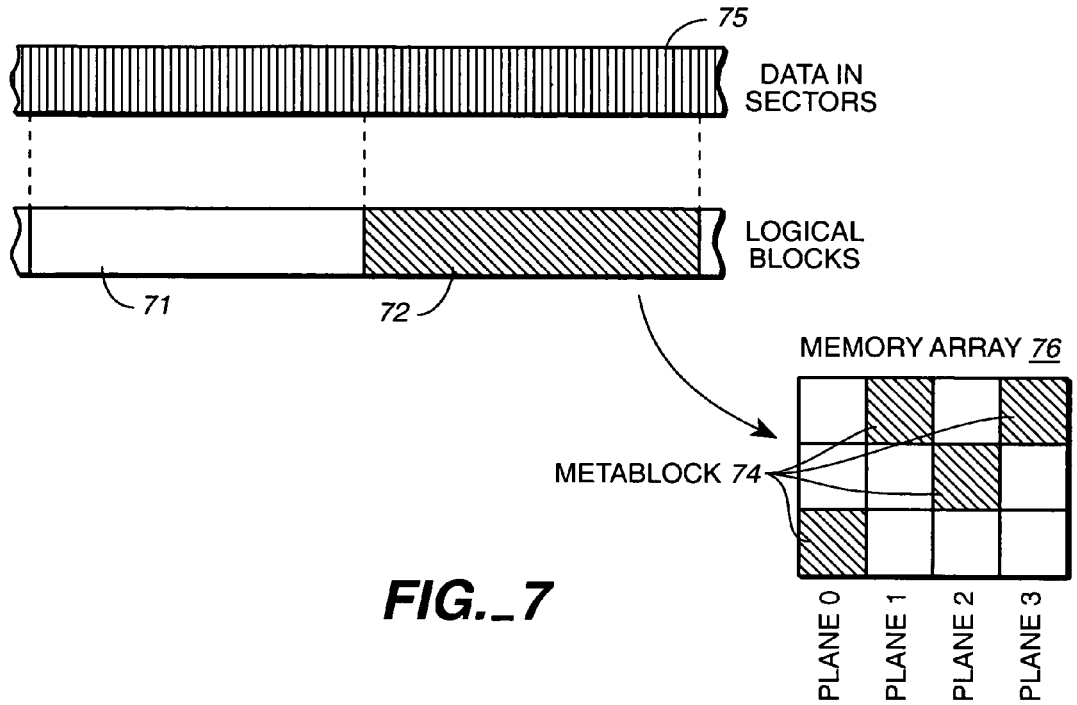
FIG._7
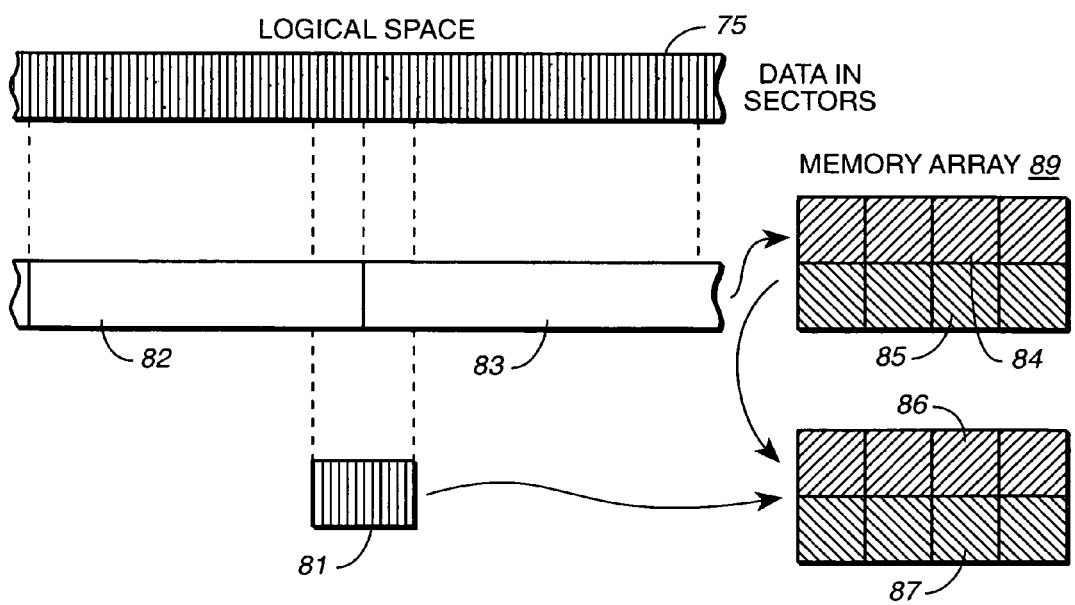
FIG._8

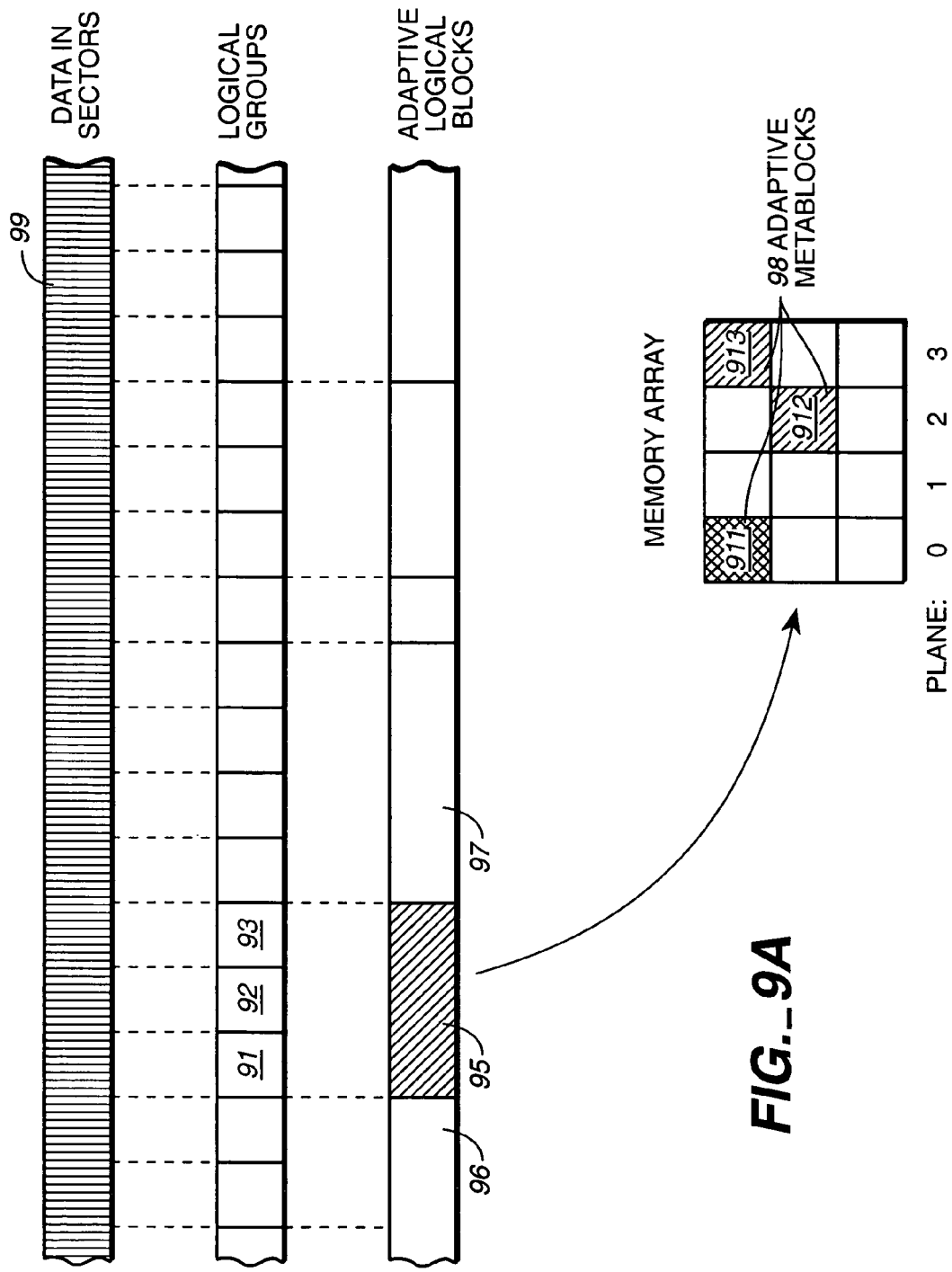
FIG._9A

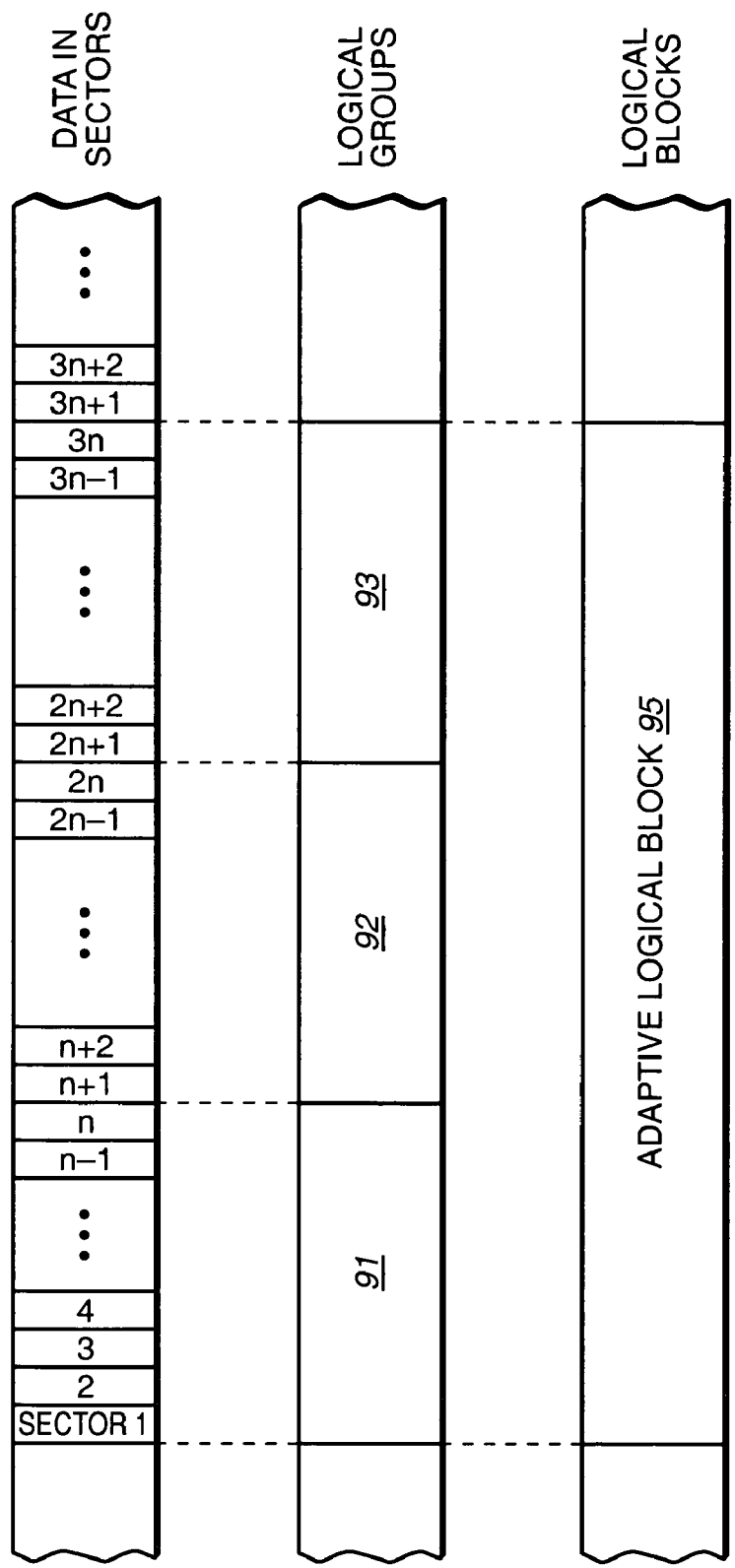
FIG._9B

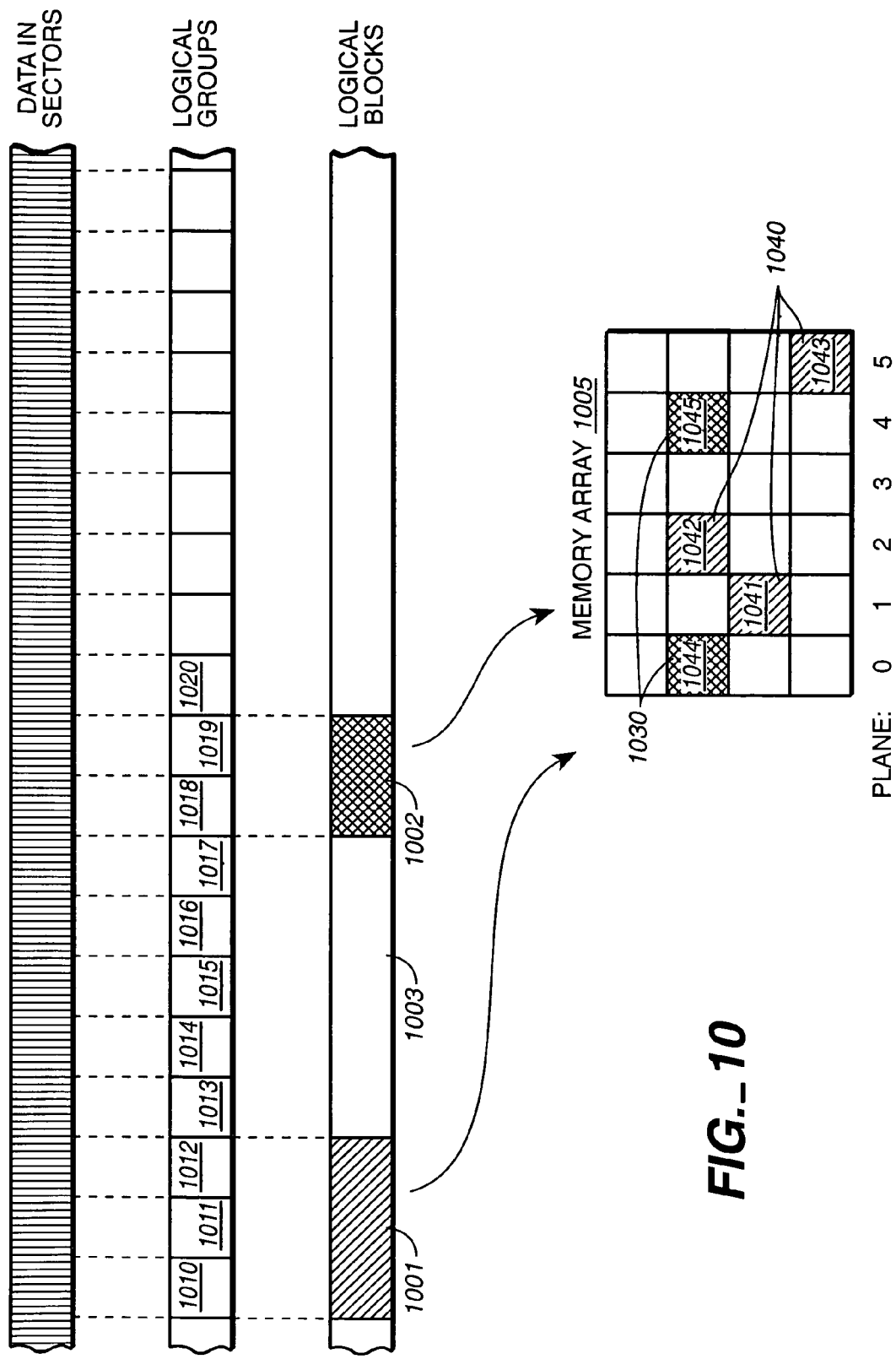
FIG._10

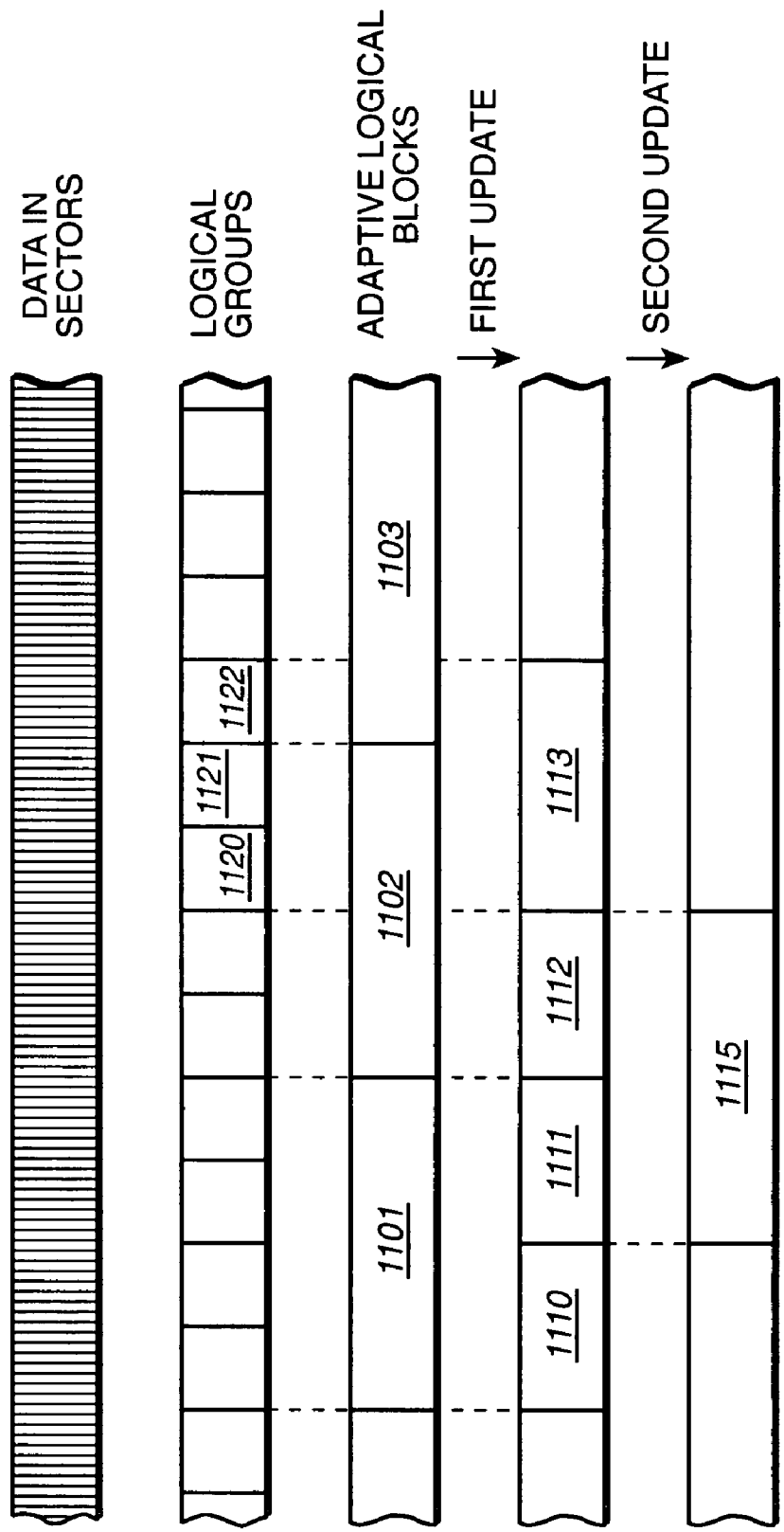
FIG._11

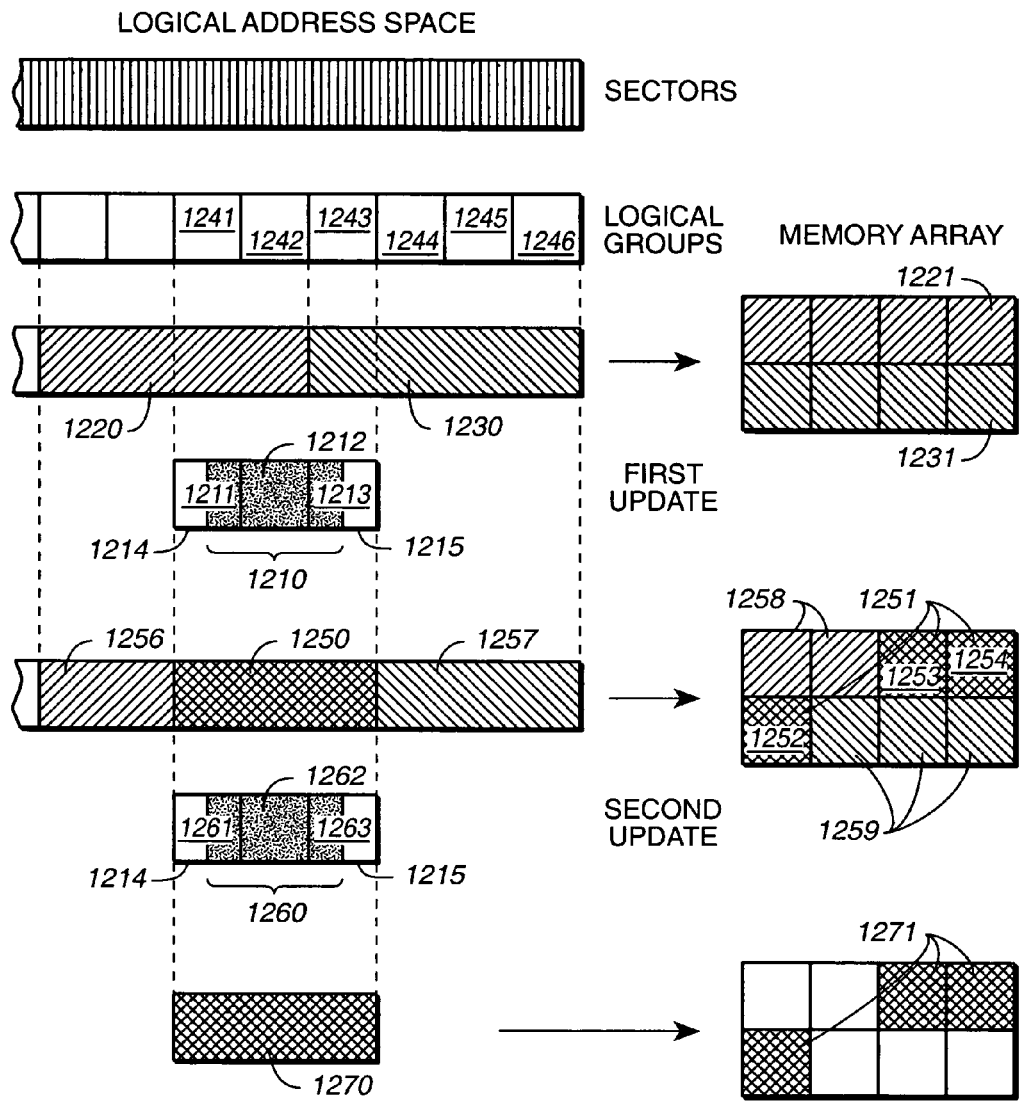
FIG._12A

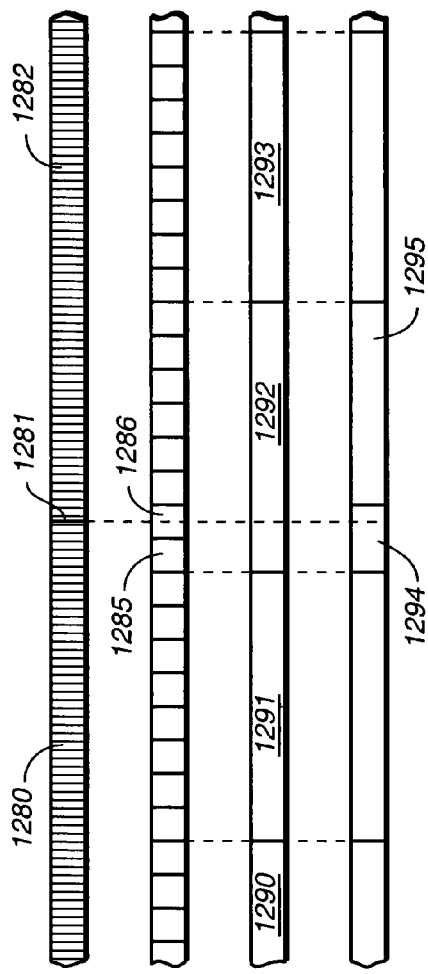
FIG._12B
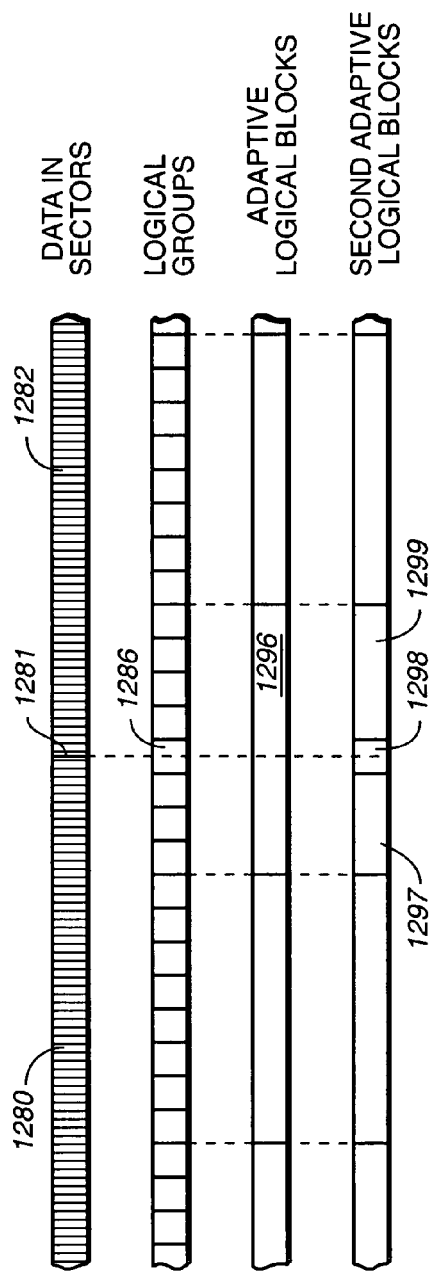
FIG._12C

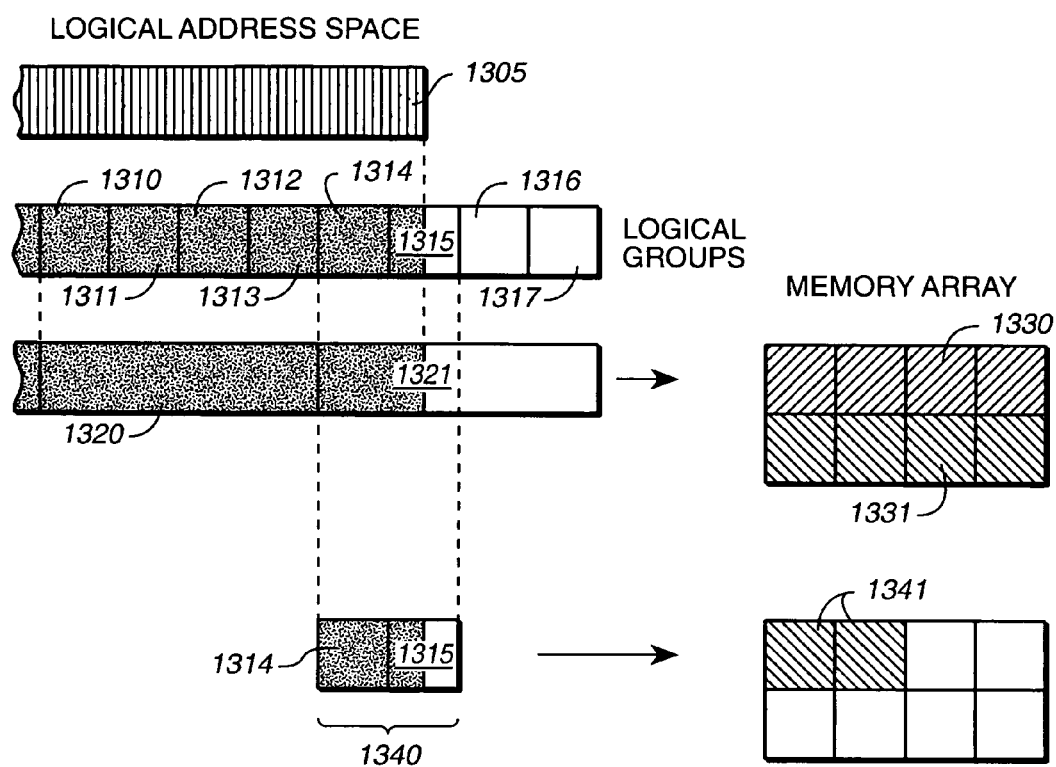
FIG._13

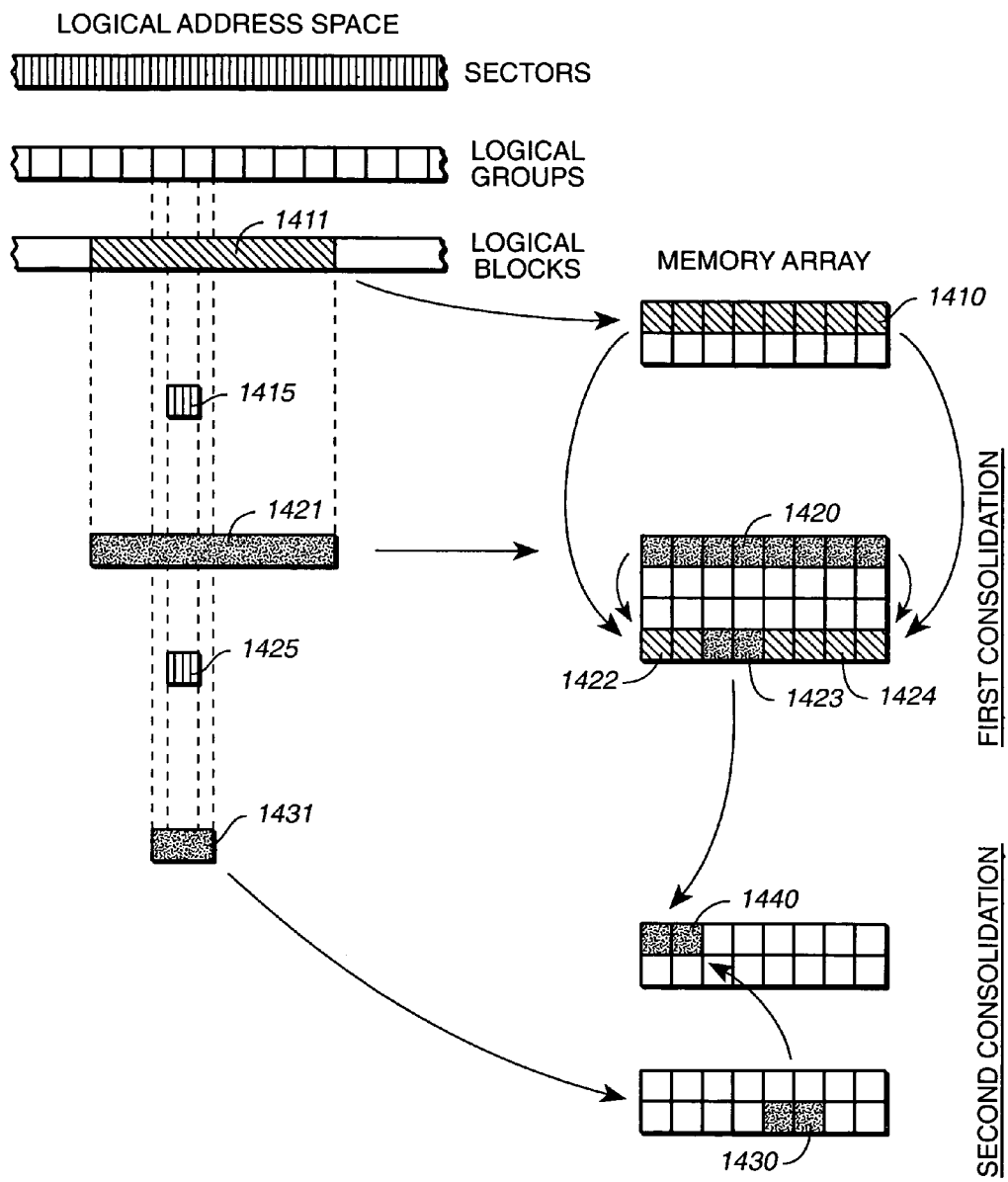
FIG._14

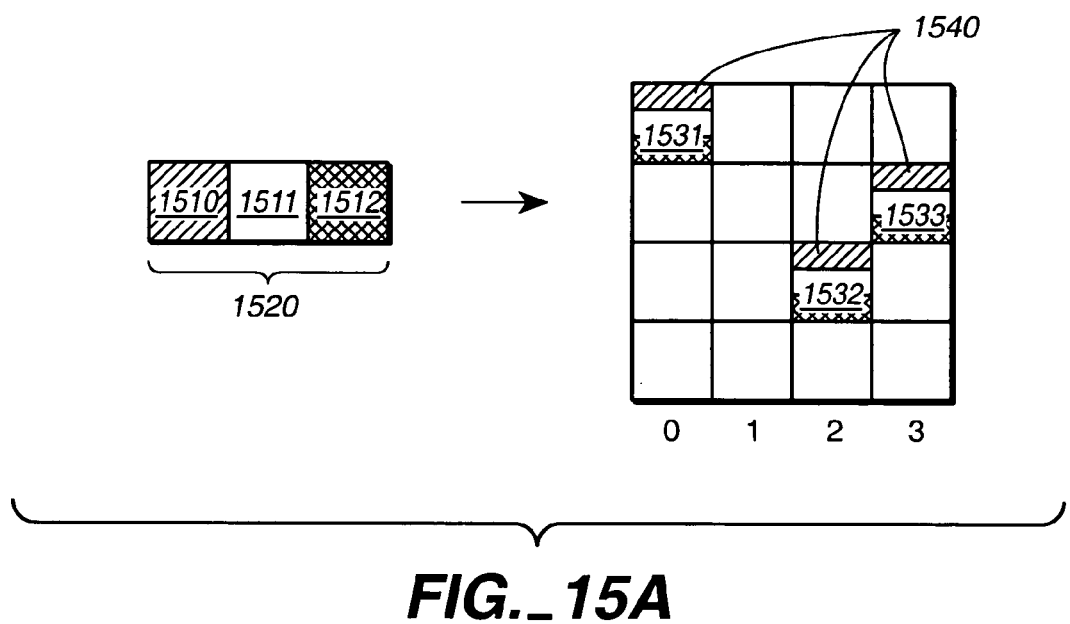
FIG._15A

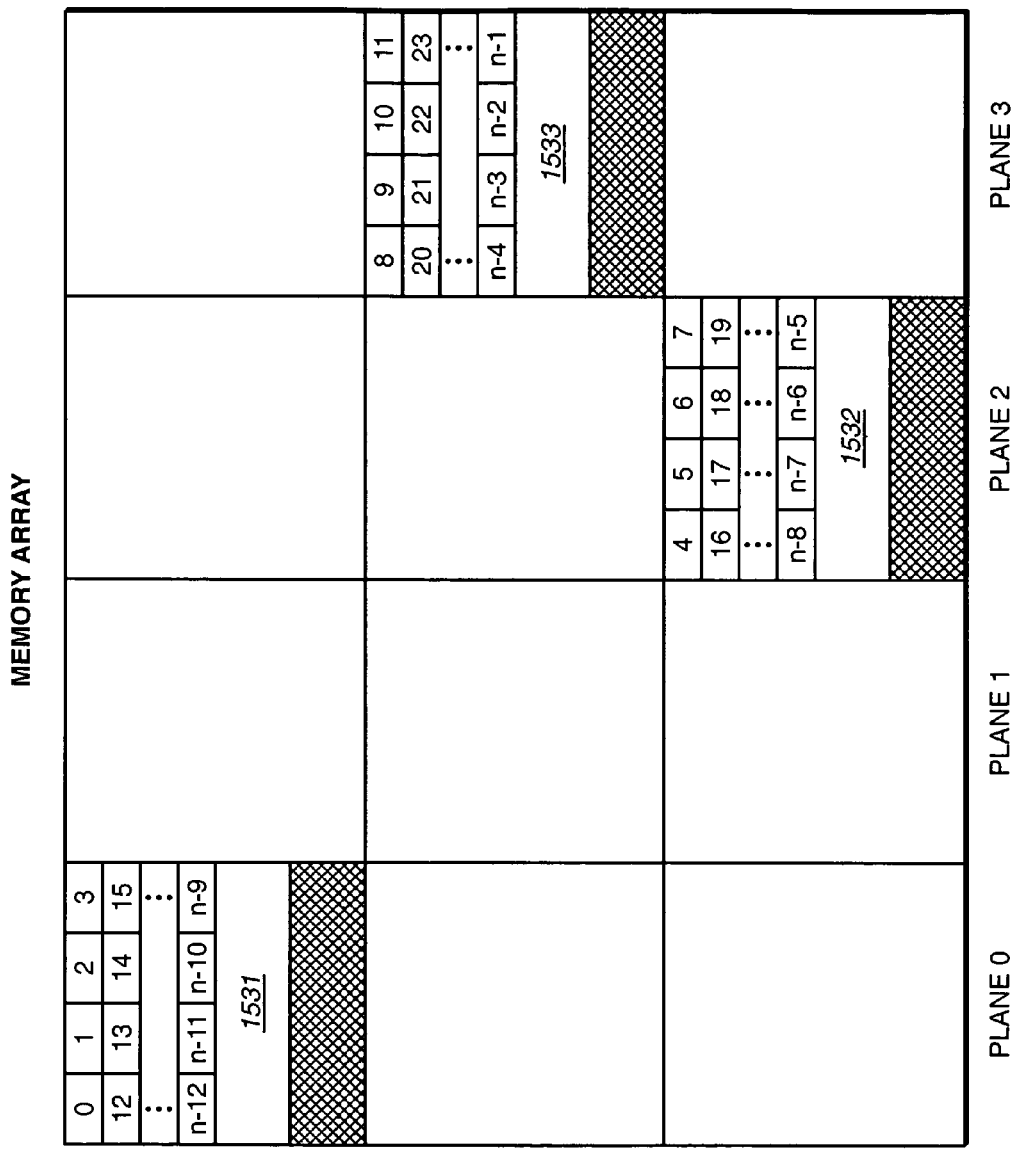
FIG._15B

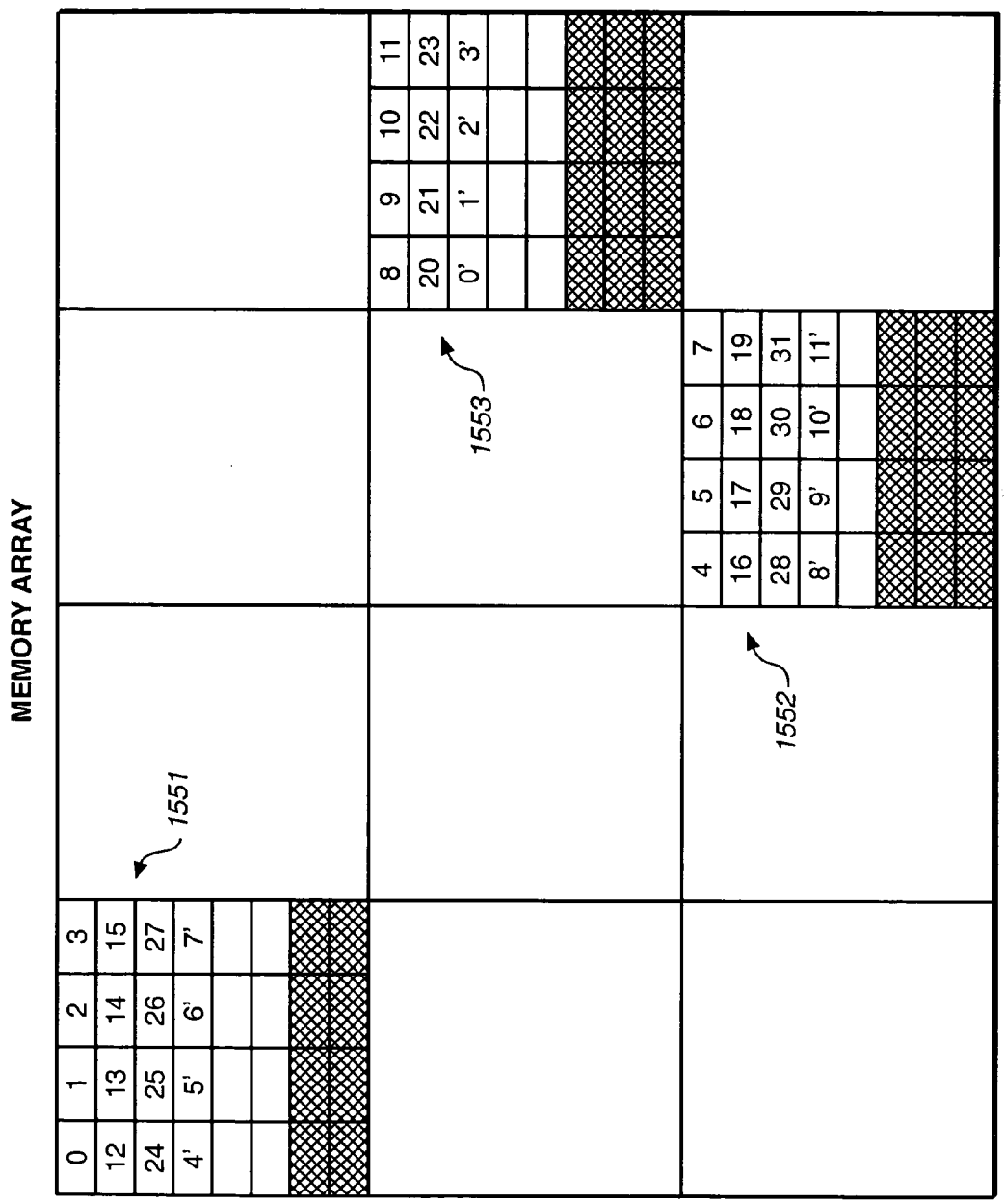
FIG._15C

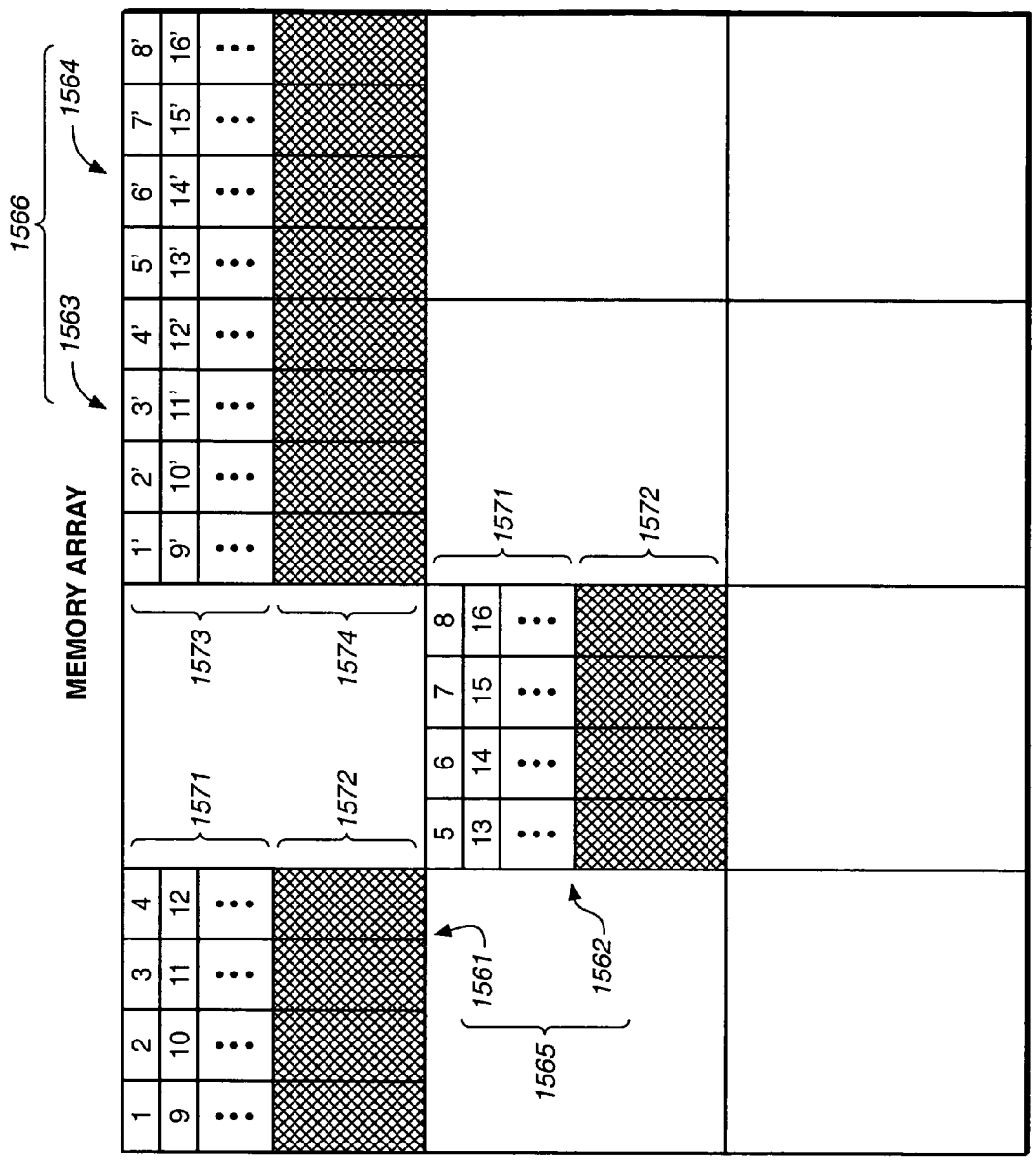
FIG._15D

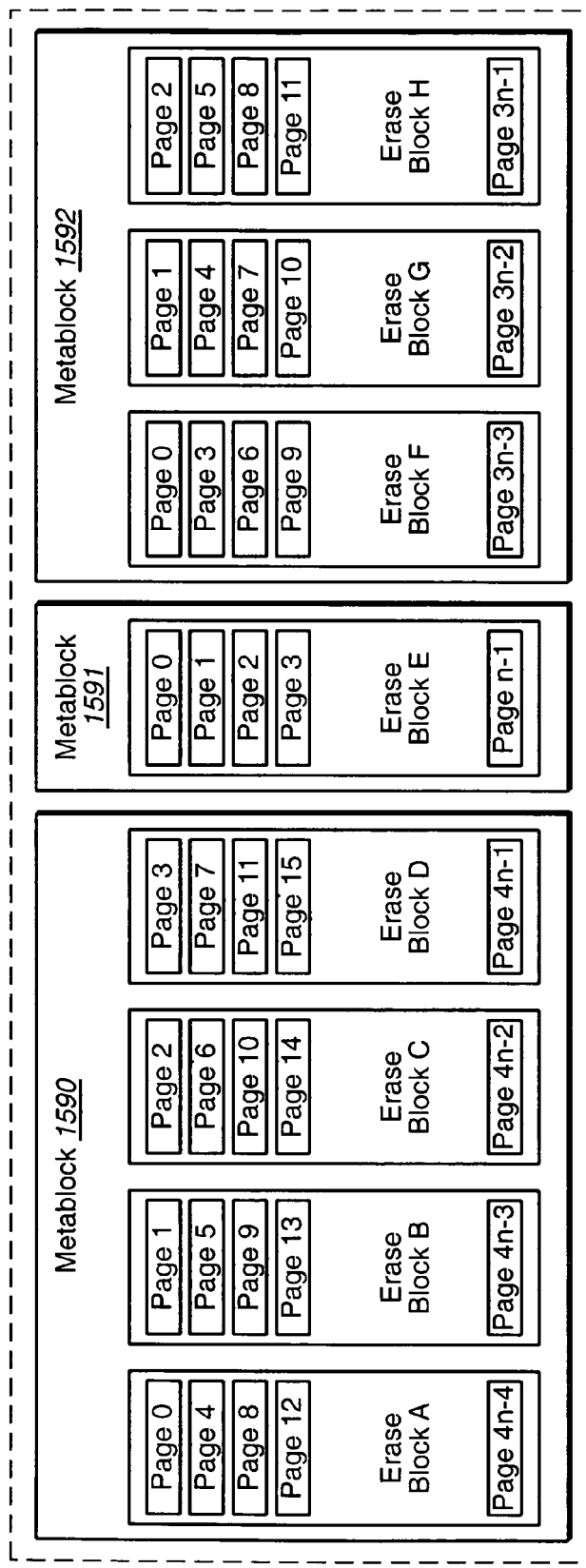
FIG._15E

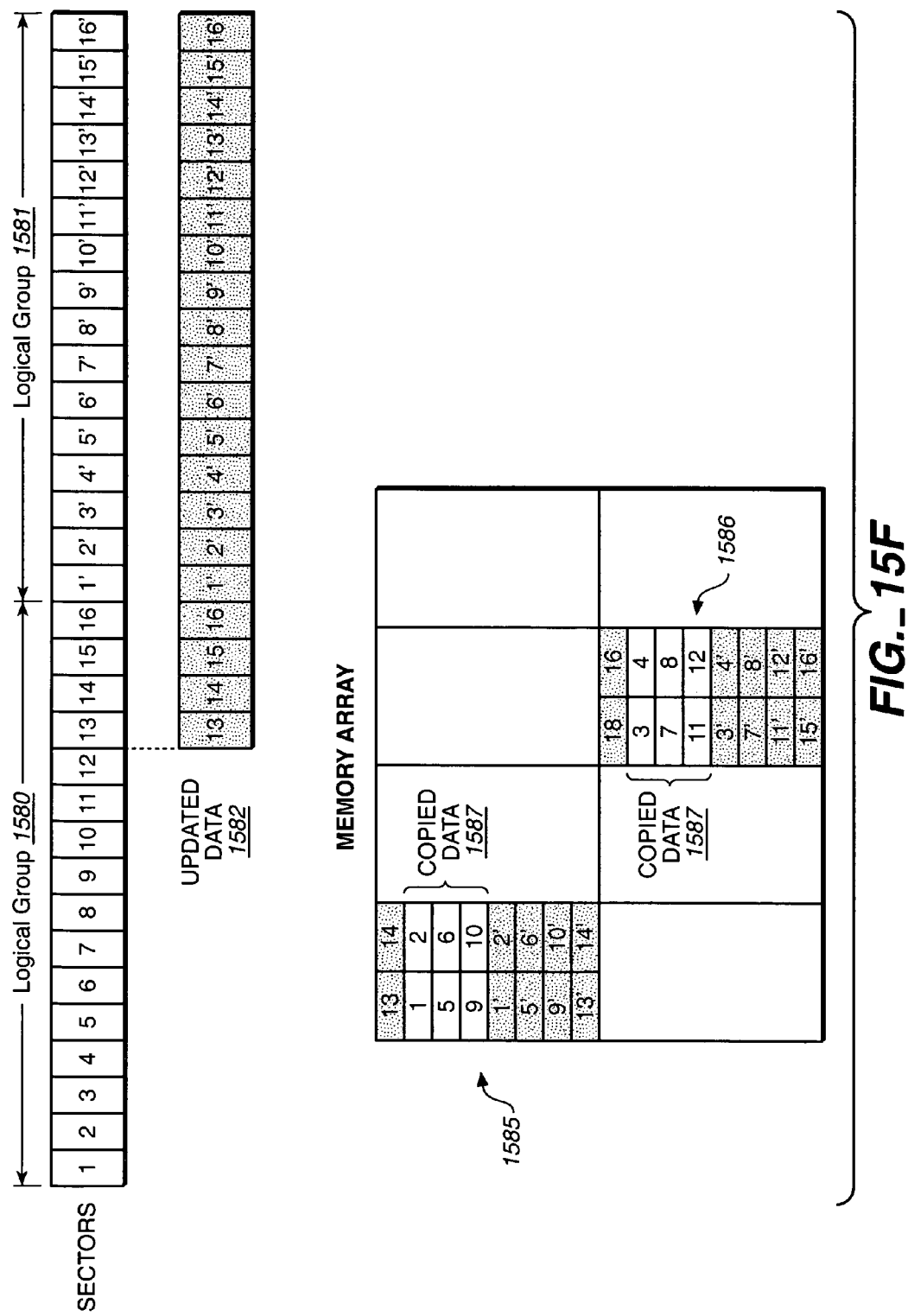
FIG._15F

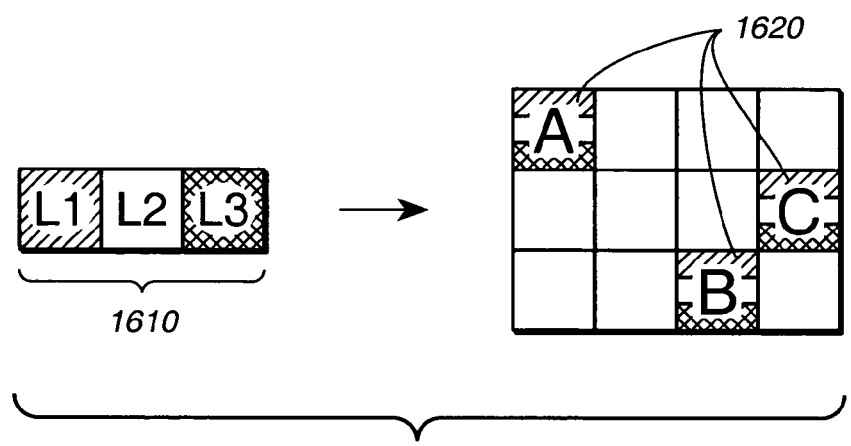
FIG._16

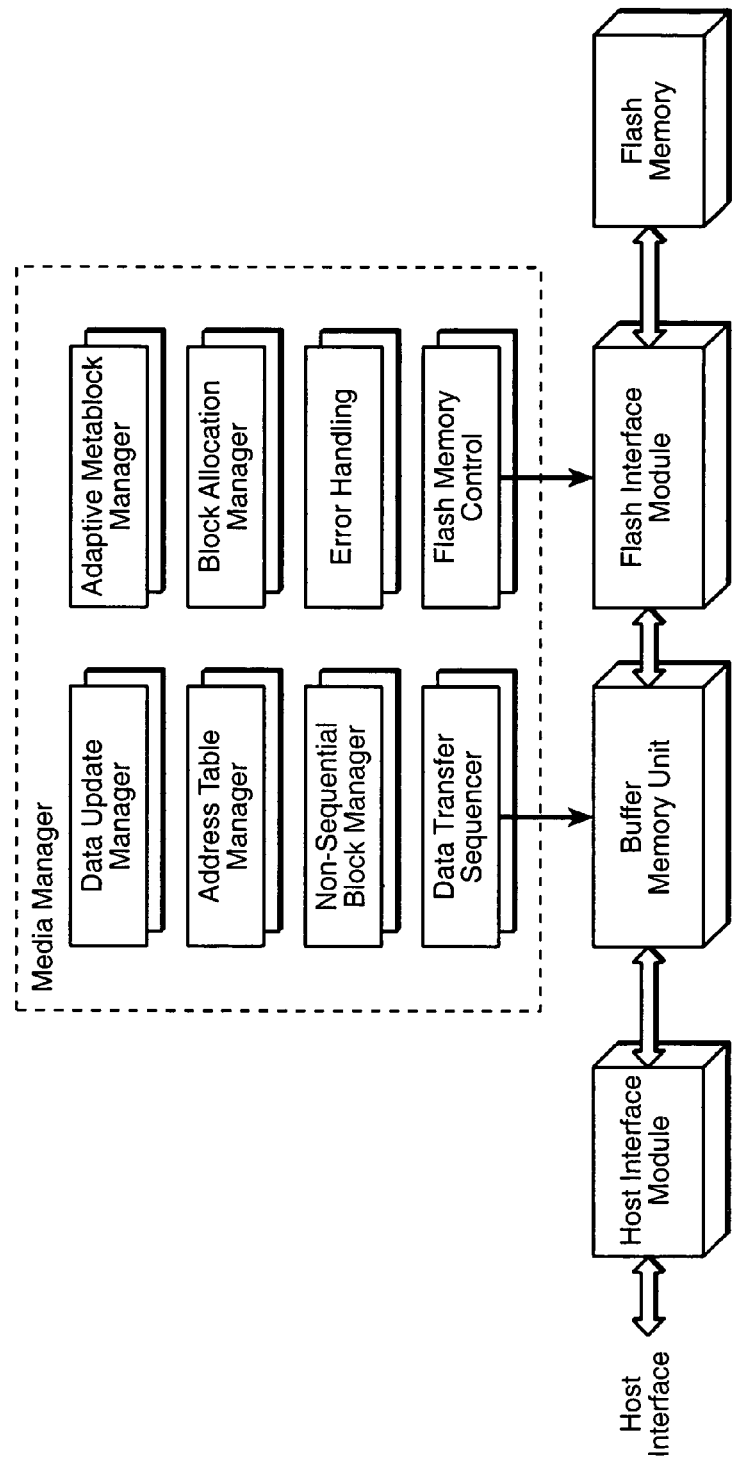
FIG._17

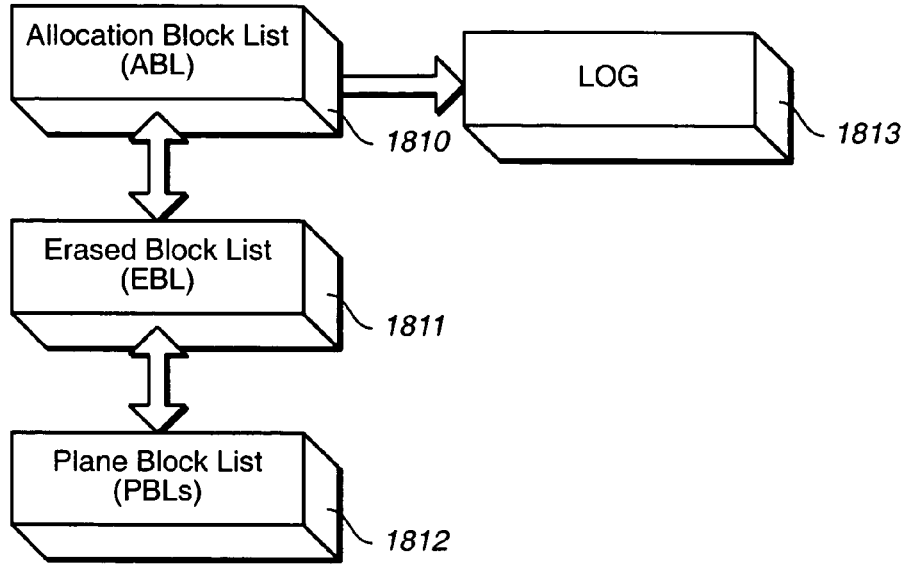
FIG._18A
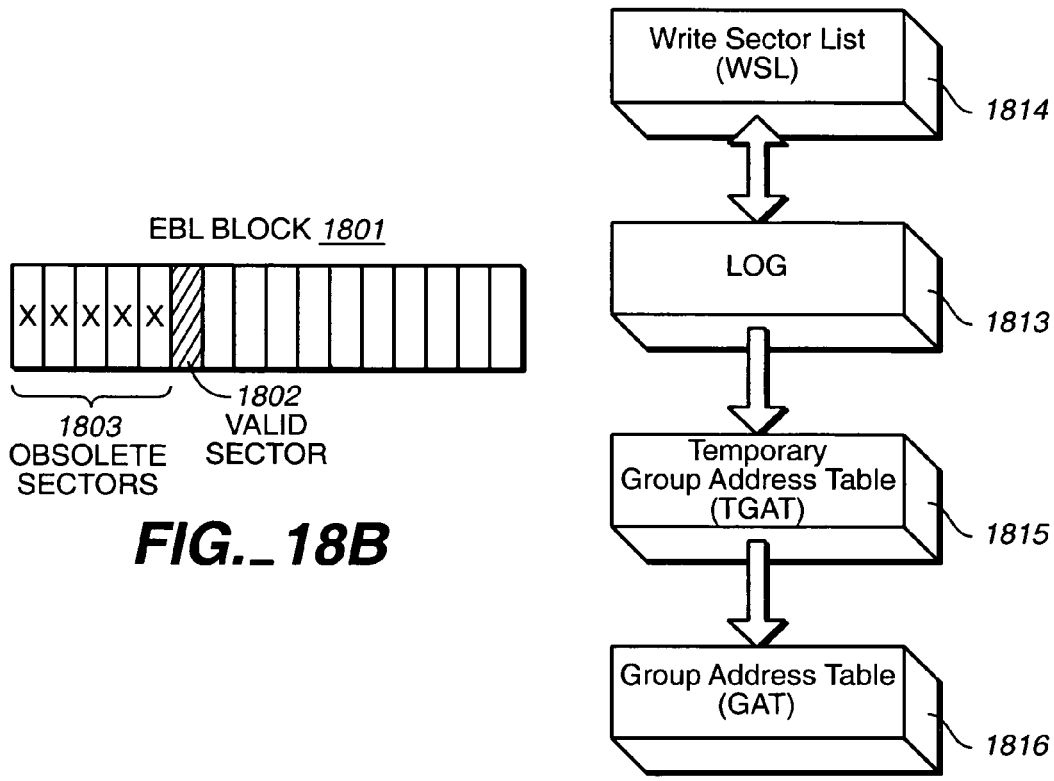
FIG._18B
FIG._18C

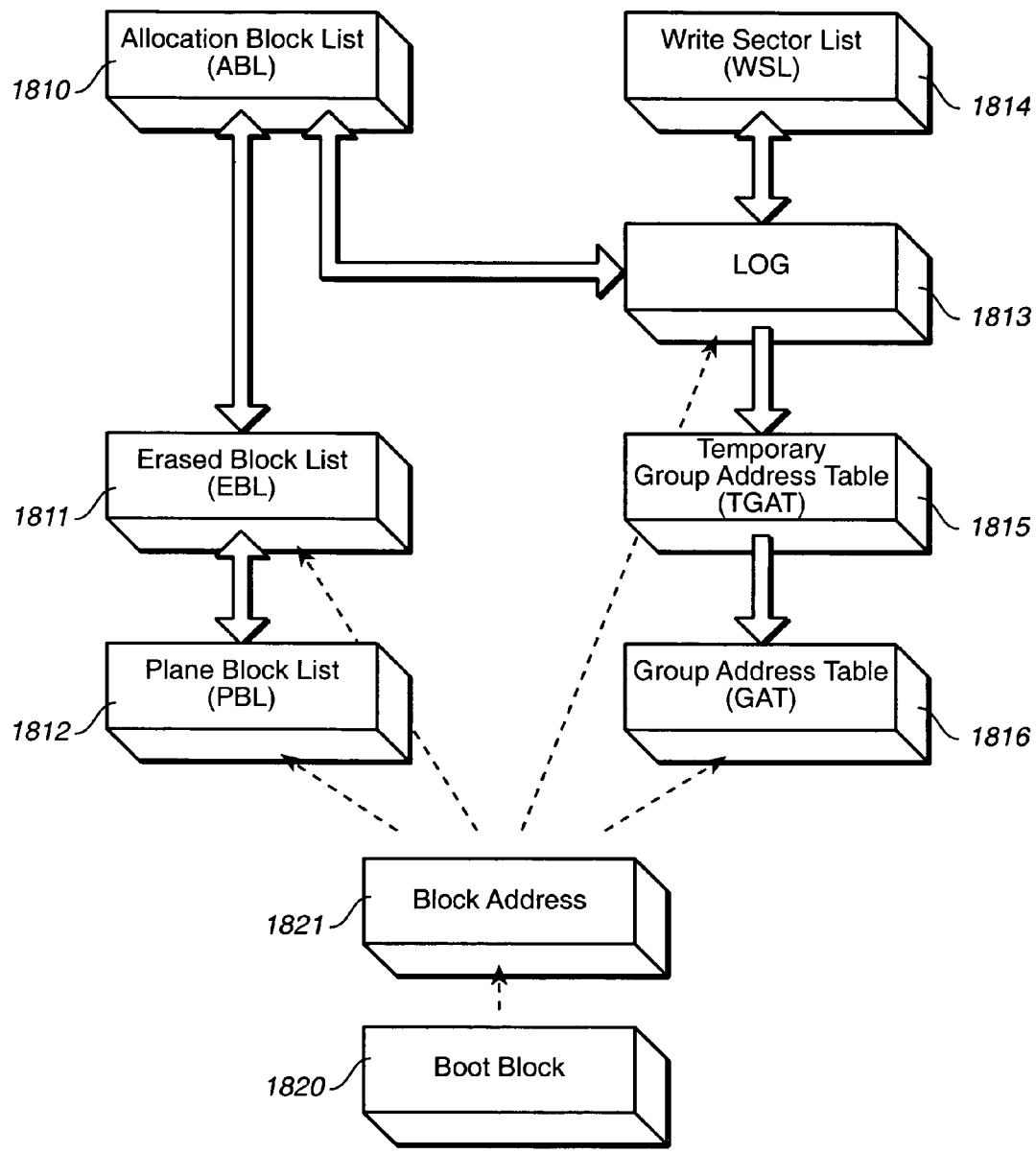
FIG._18D

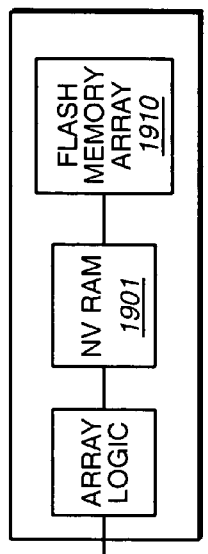
FIG._19
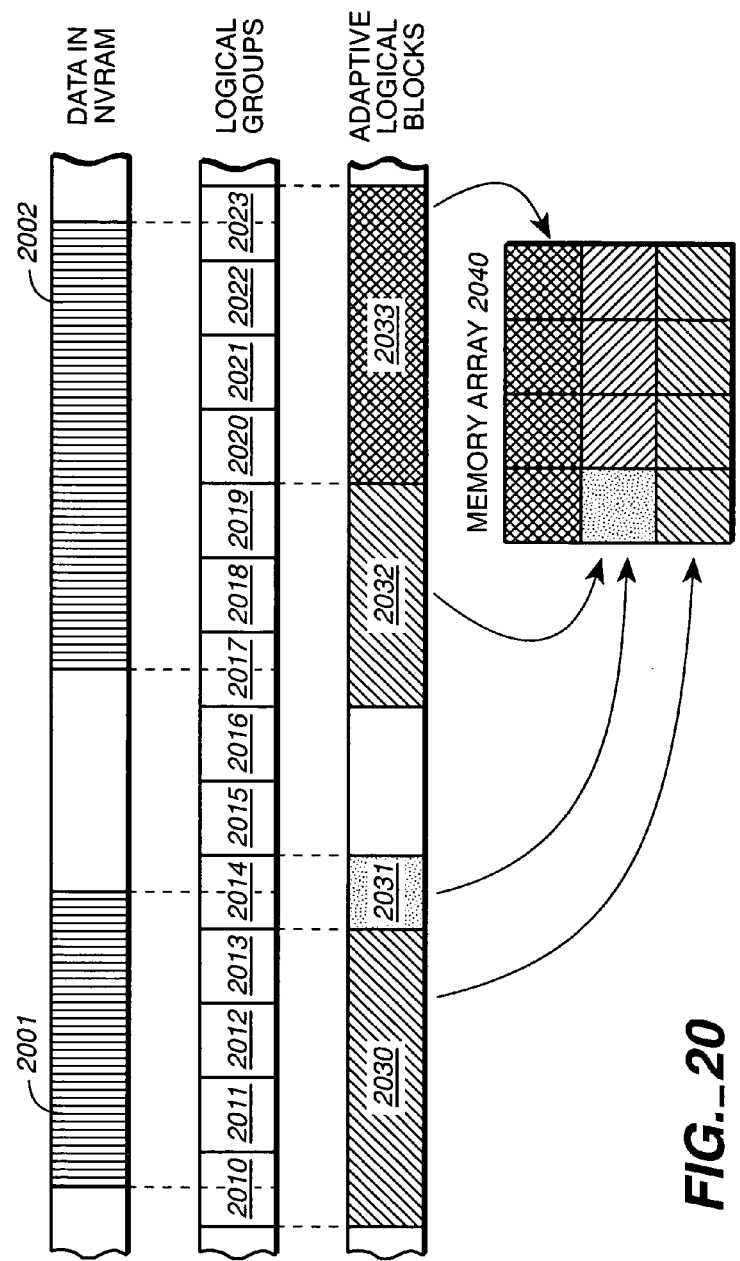
FIG._20

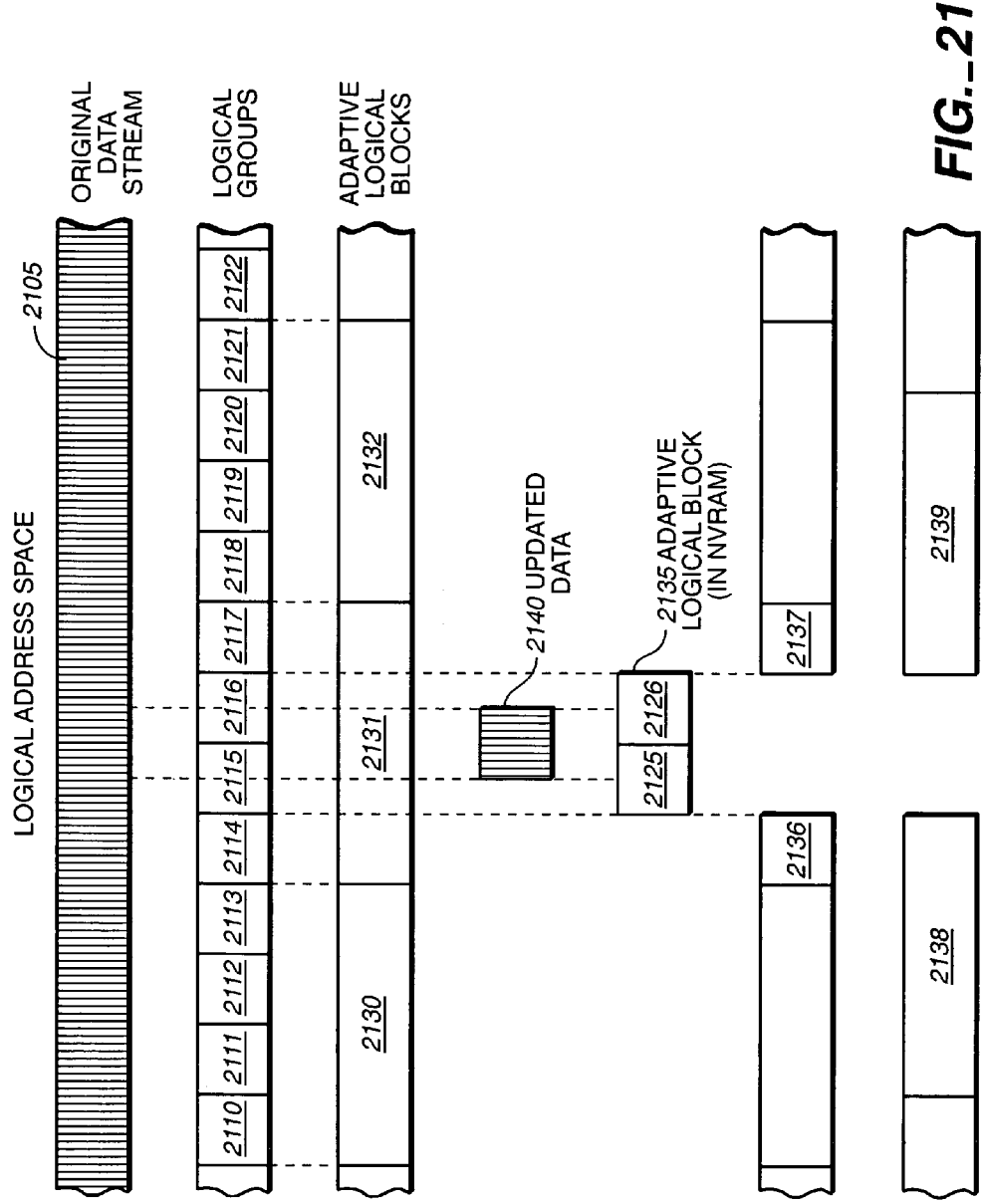
FIG._21

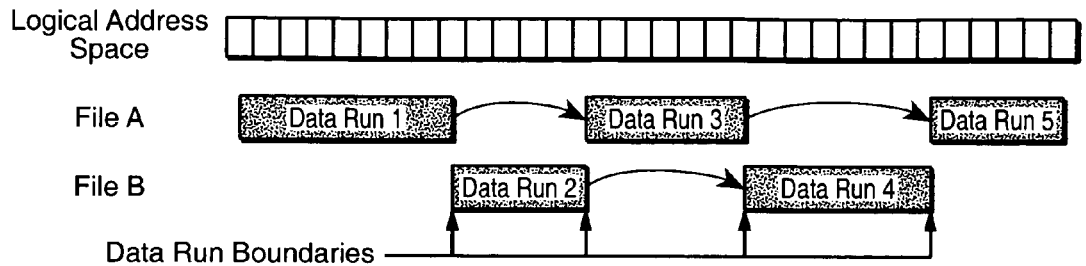
FIG._22
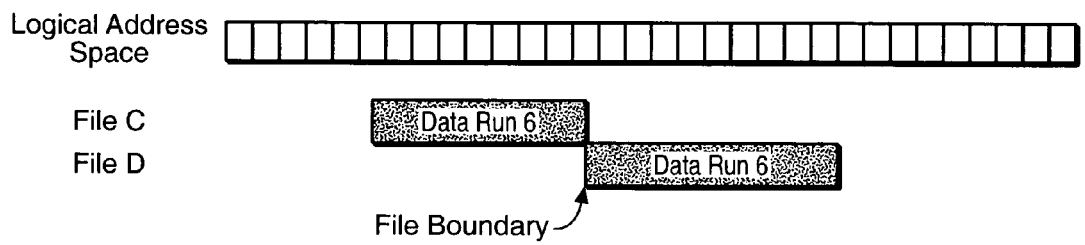
FIG._23
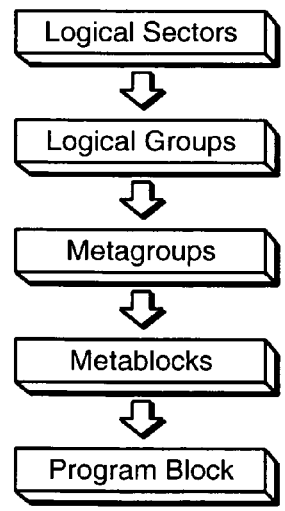
FIG._24

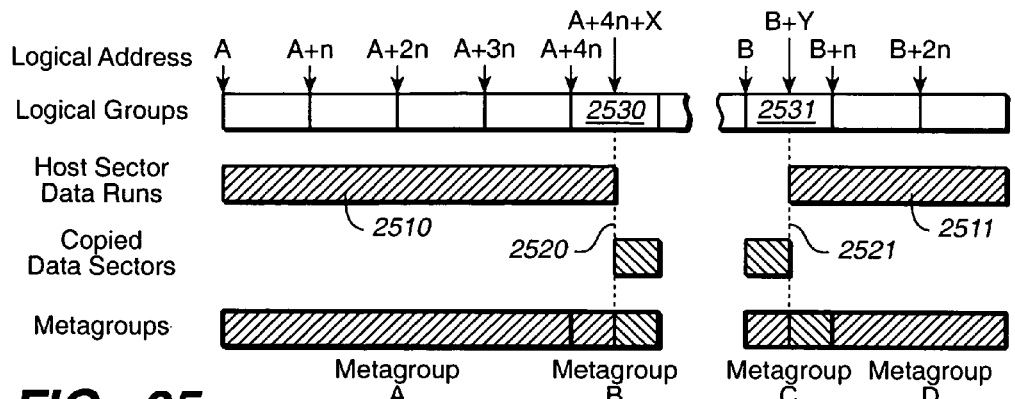
FIG._25
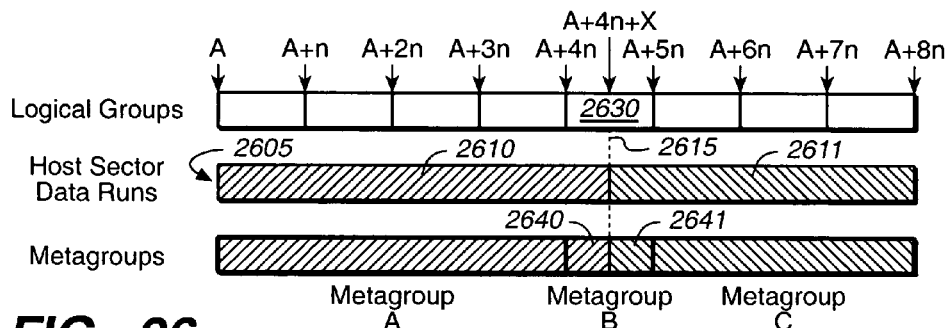
FIG._26
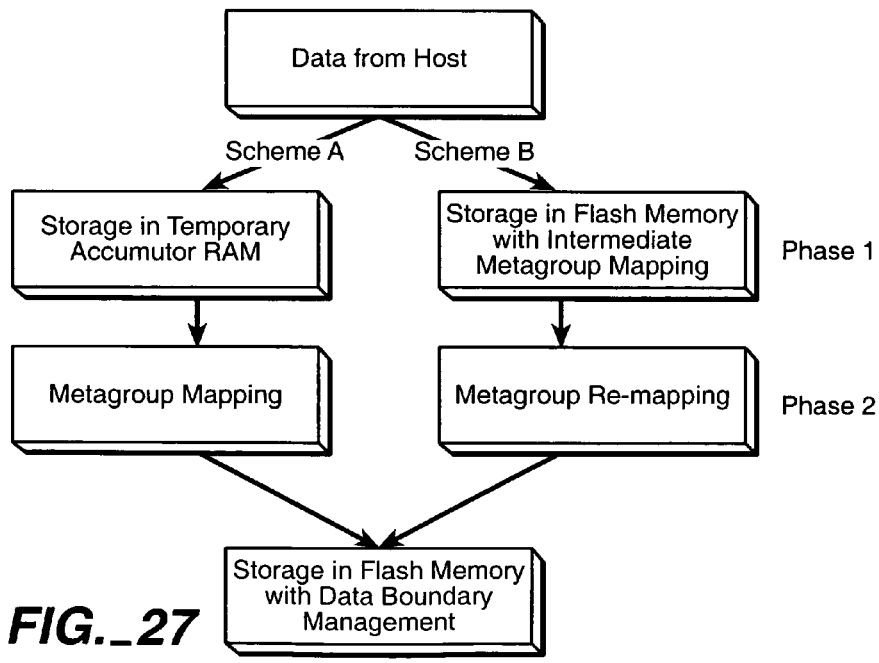
FIG._27

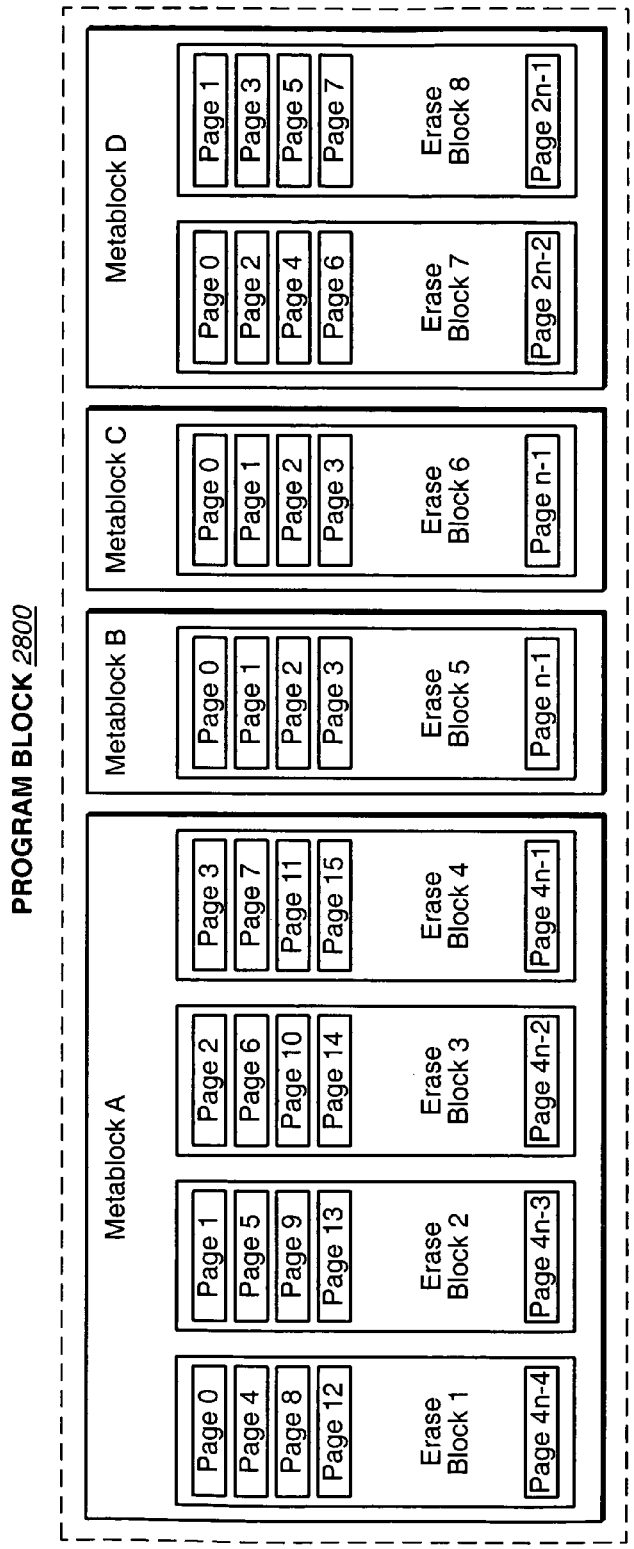
FIG._28A
FIG._28B

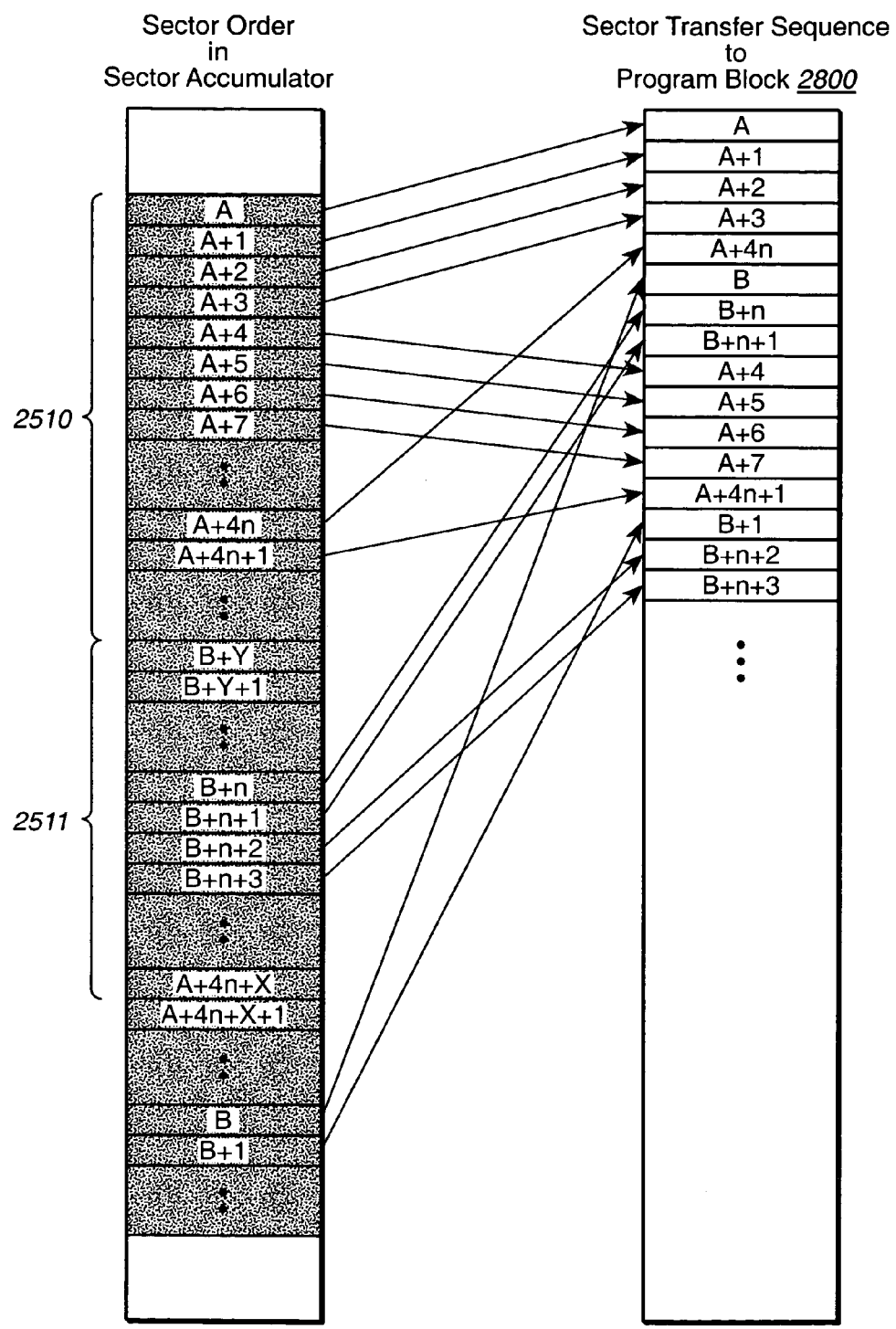
FIG._28C

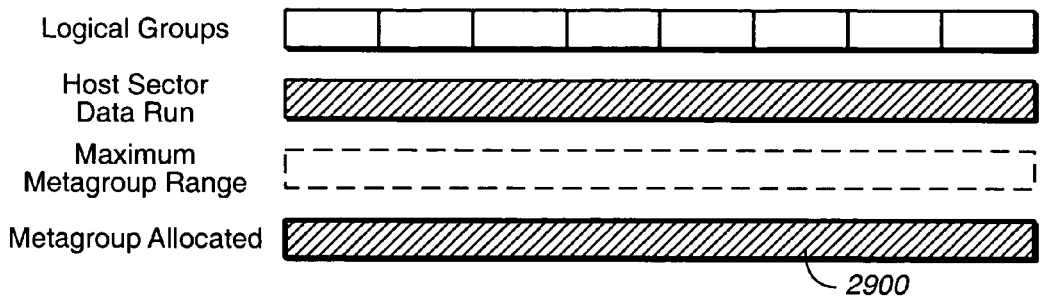
FIG._29A
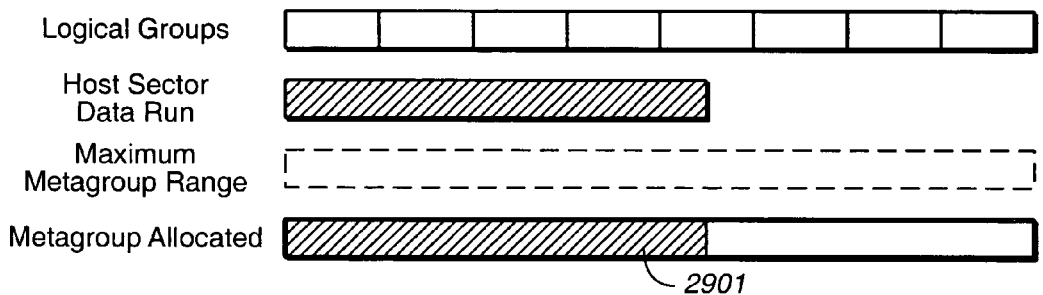
FIG._29B
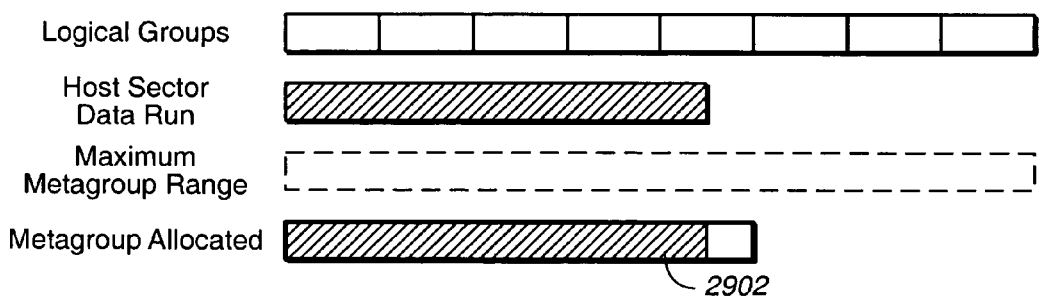
FIG._29C

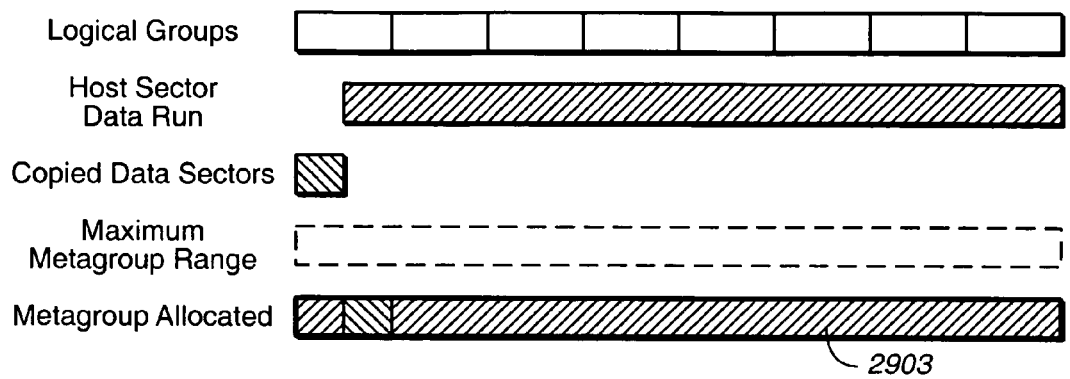
FIG._29D
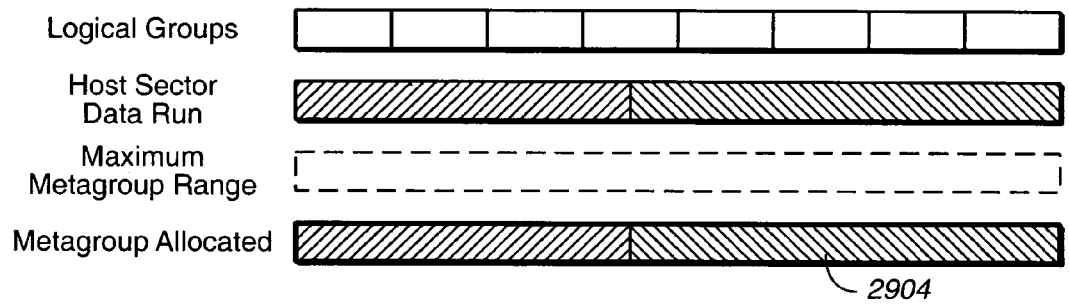
FIG._29E

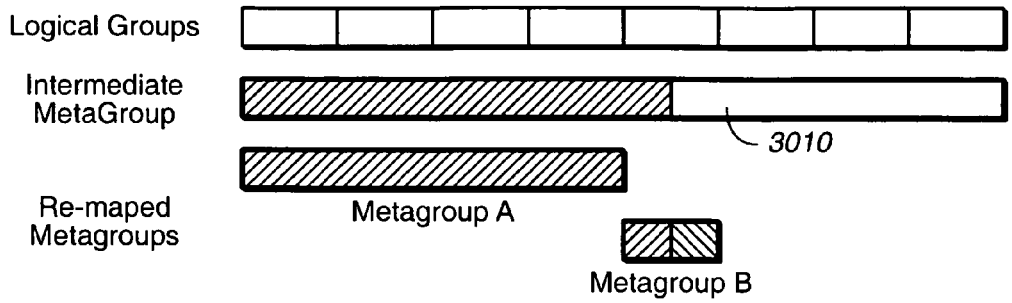
FIG._30A
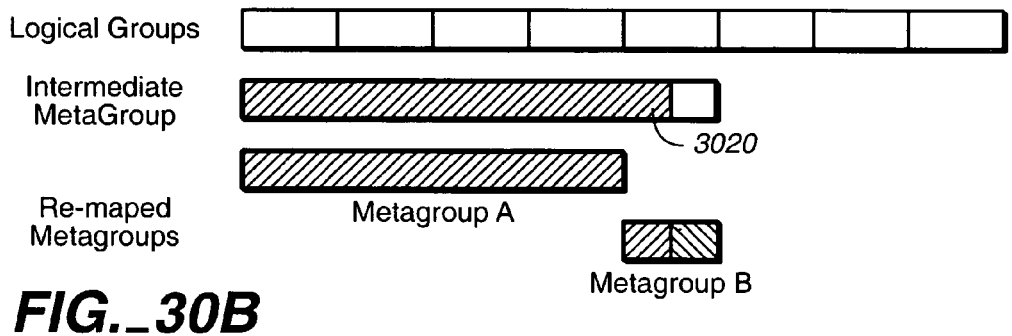
FIG._30B
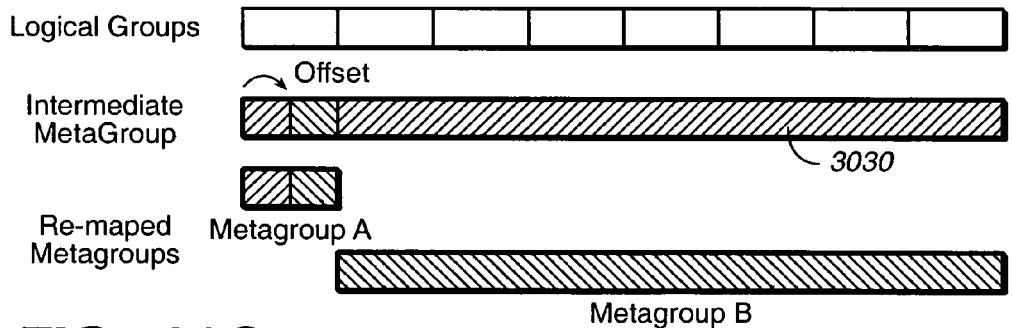
FIG._30C
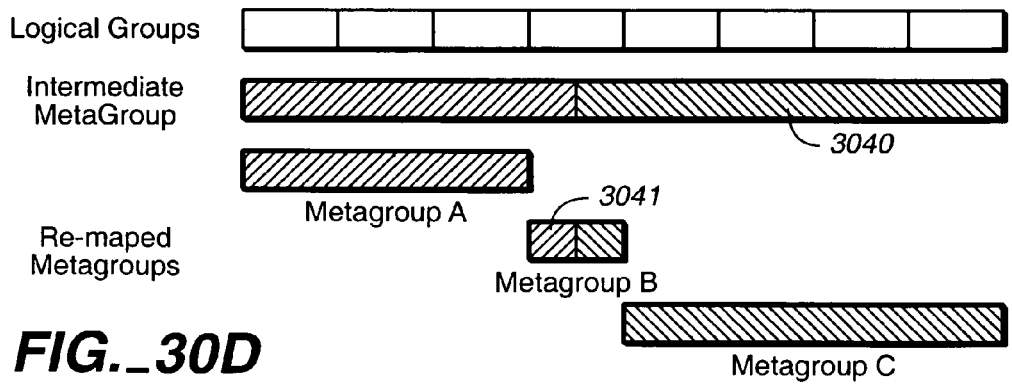
FIG._30D

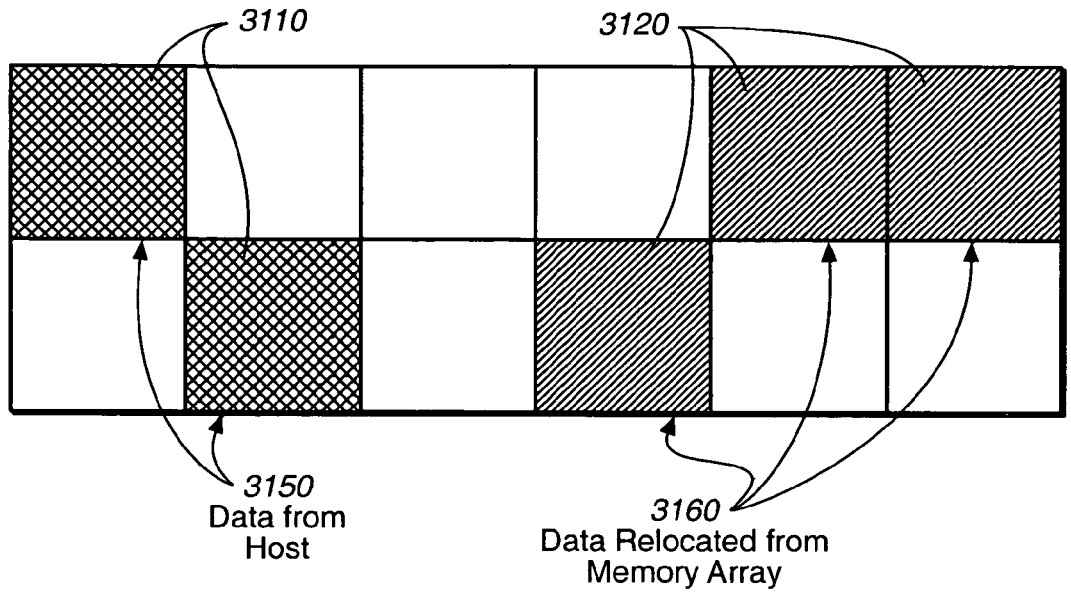
FIG._31
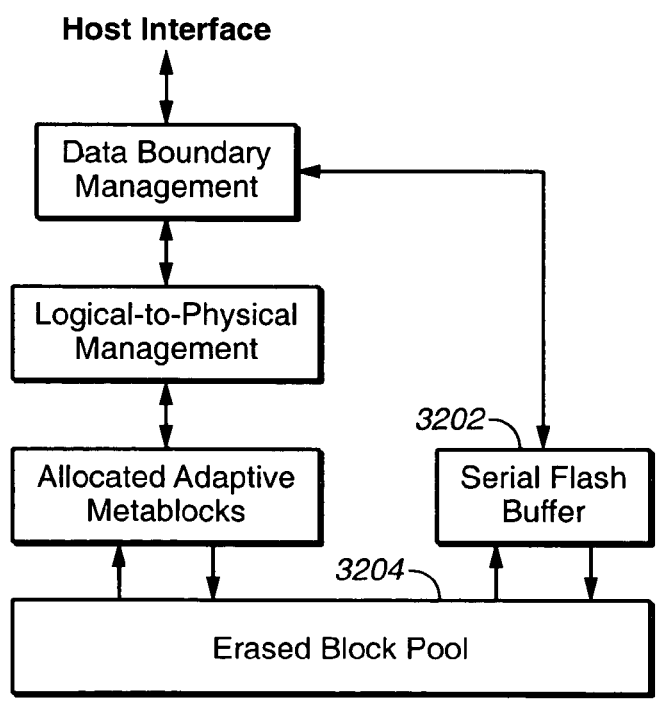
FIG._32

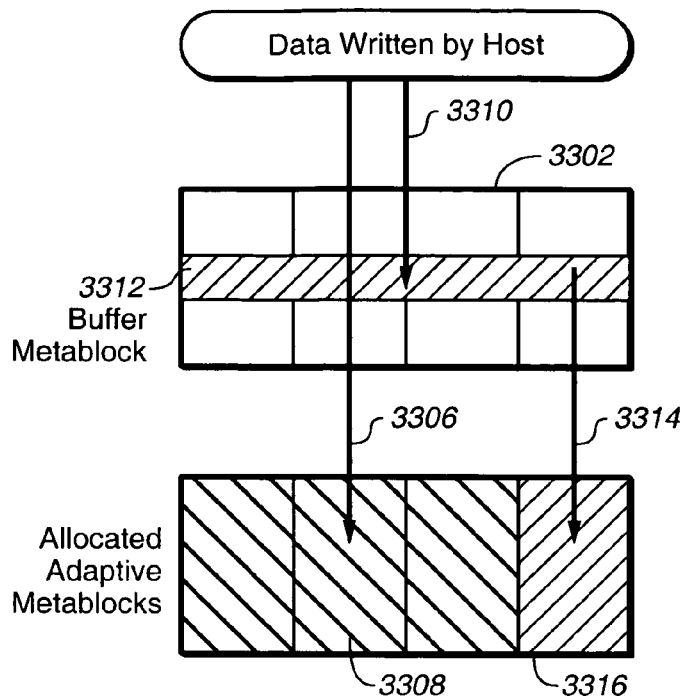
FIG._33A
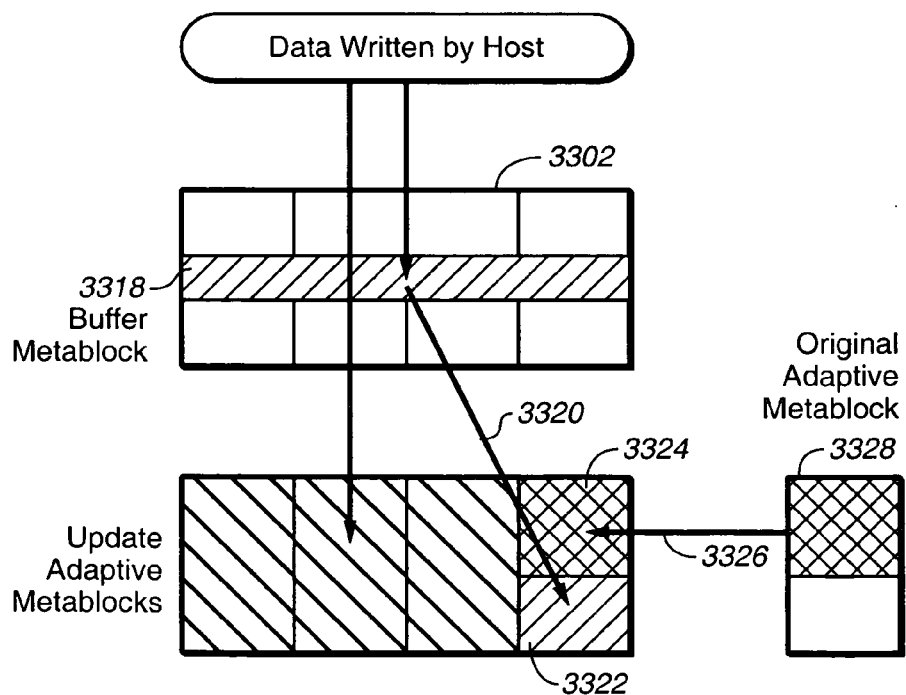
FIG._33B

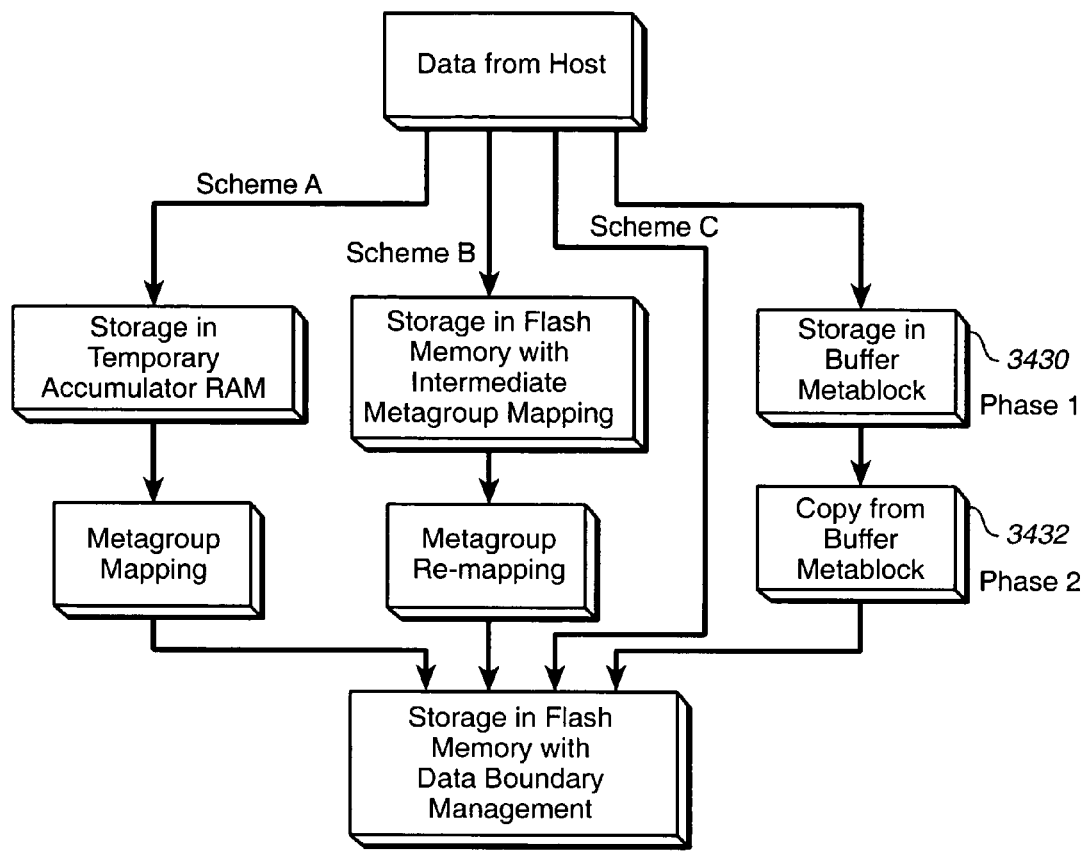
FIG._34

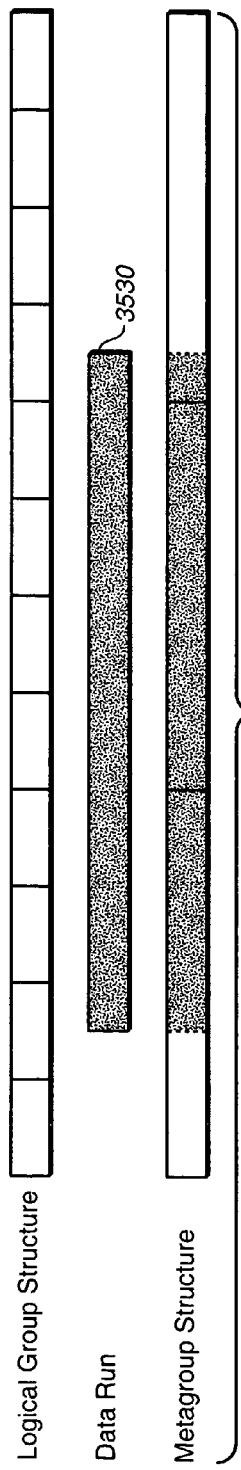
FIG._35A
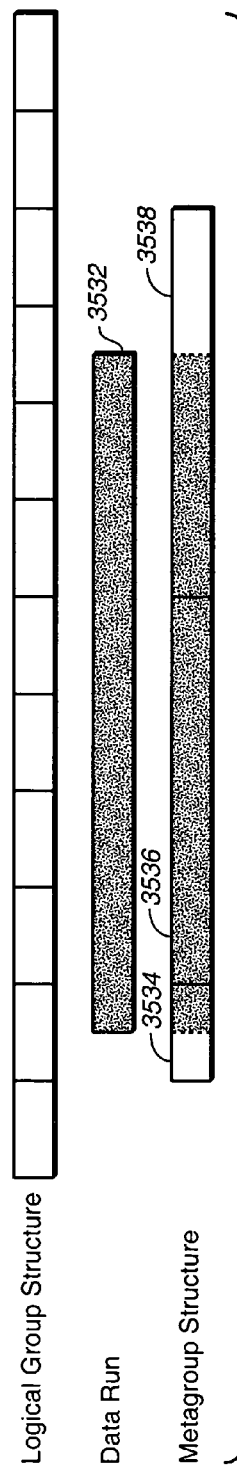
FIG._35B
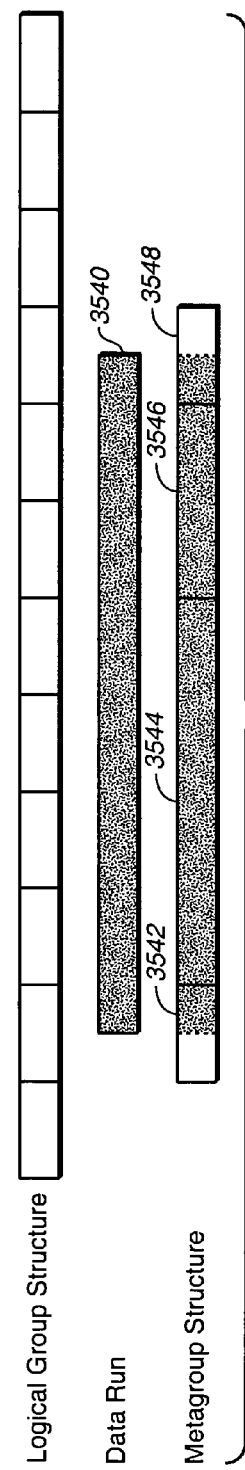
FIG._35C

Data Run Structure

| H | Full | Pad | T |

Head Block *3550*
Minimum sized
adaptive metablock

Full Block *3552*
Maximum sized
adaptive metablock
Repeated as required
by data run length Pad Block *3554*
Reduced sized
adaptive metablock
Used at end of data
run, as determined by
data run length Tail Block *3556*
Minimum sized
adaptive metablock

FIG._35D

|  |  | Updated Data Run |  |  |
|---|---|---|---|---|
|  |  | Full Alignment (F) | Partial Alignment (P) | Non-Alignment (N) |
| Original Data Run | Full Alignment (F) | F2F | | |
|  | Partial Alignment (P) | P2F | P2P | |
|  | Non-Alignment (N) | N2F | N2P | N2N |

FIG._36

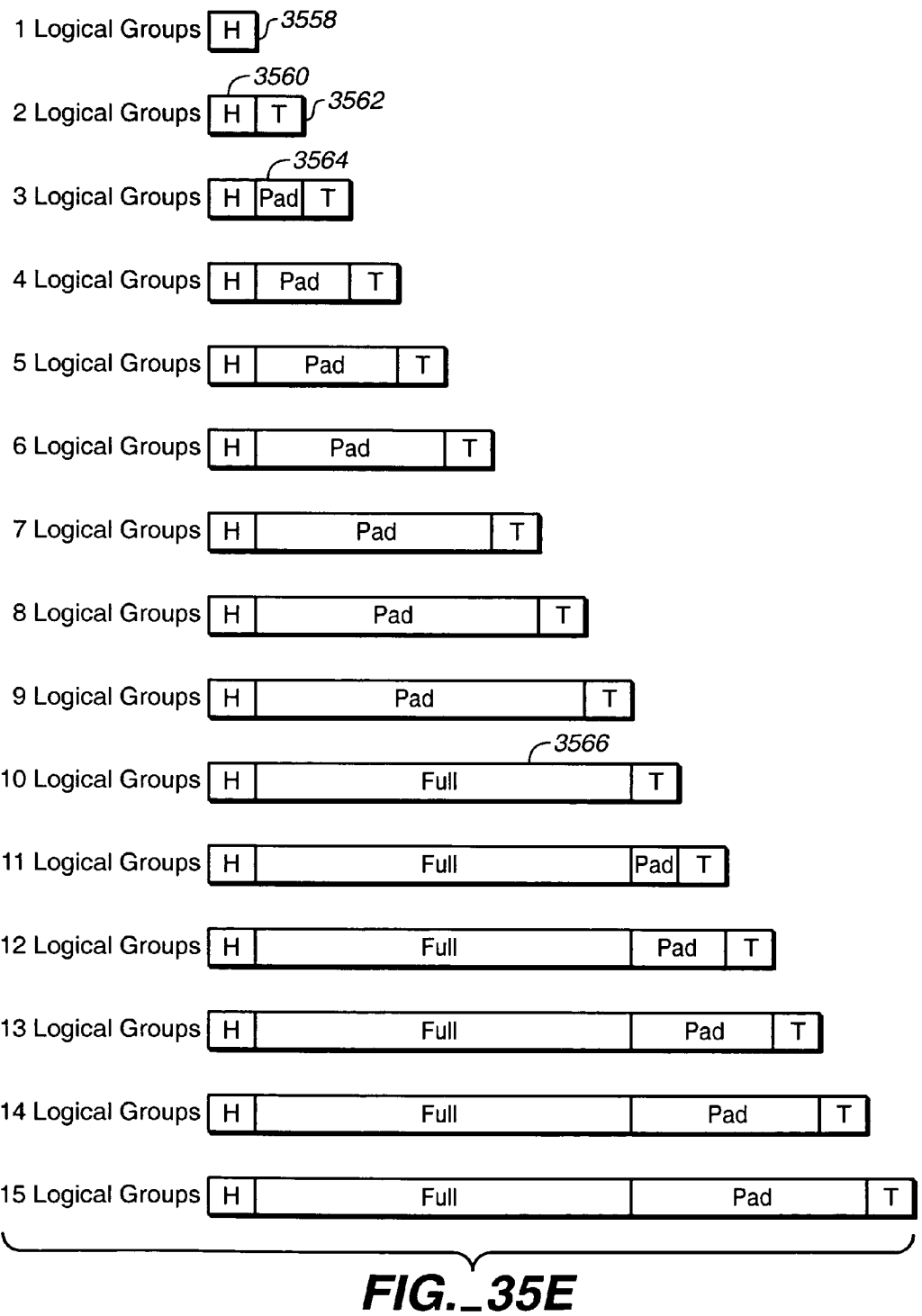
FIG._35E

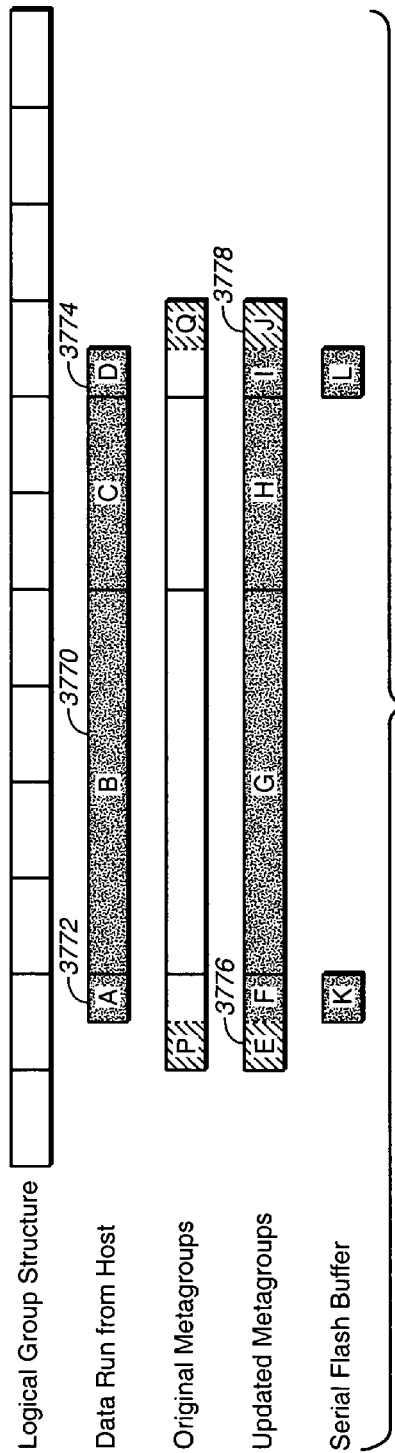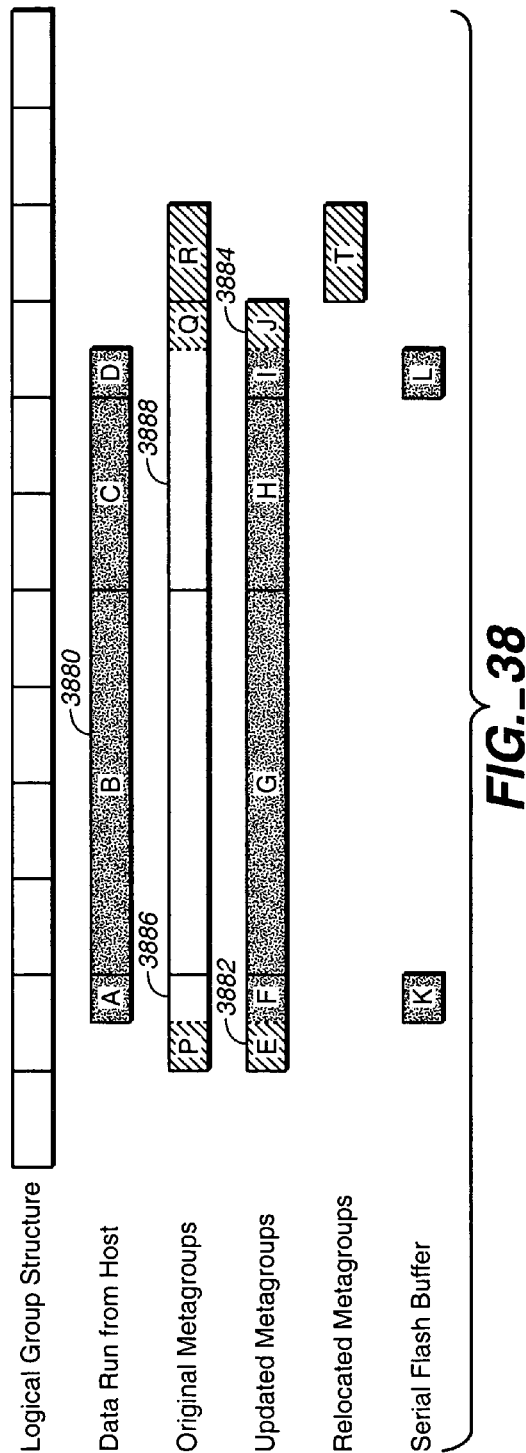

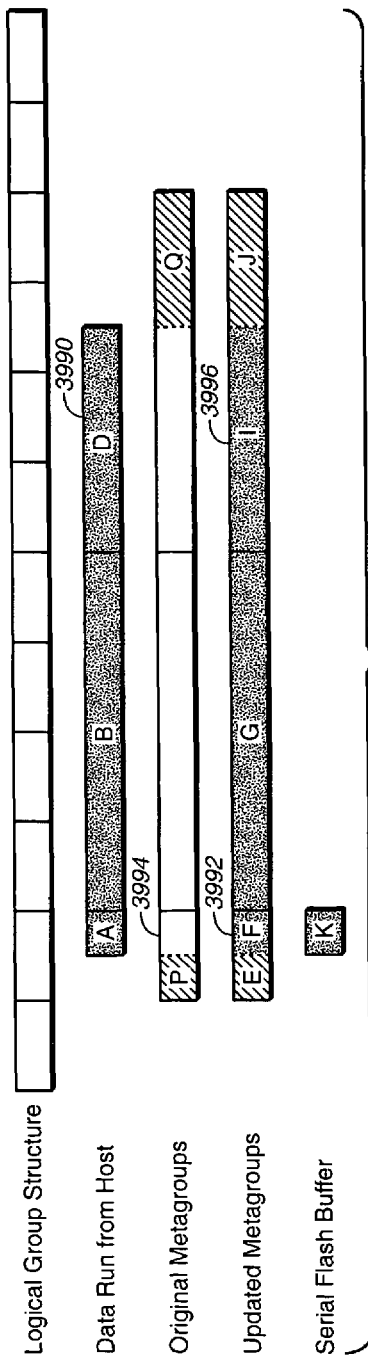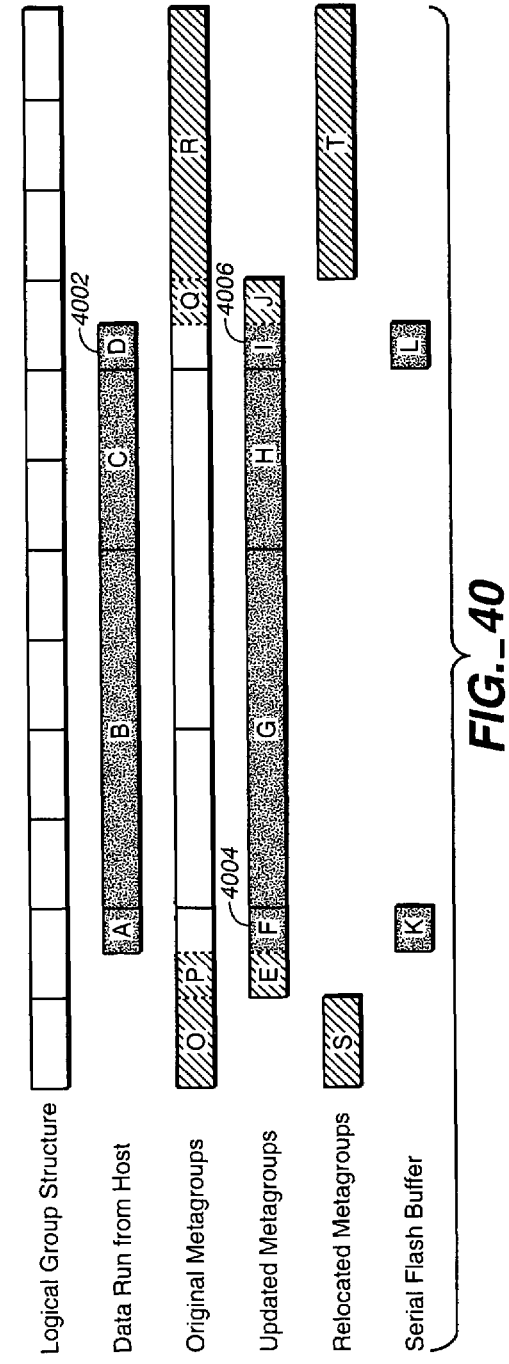
FIG._39
FIG._40

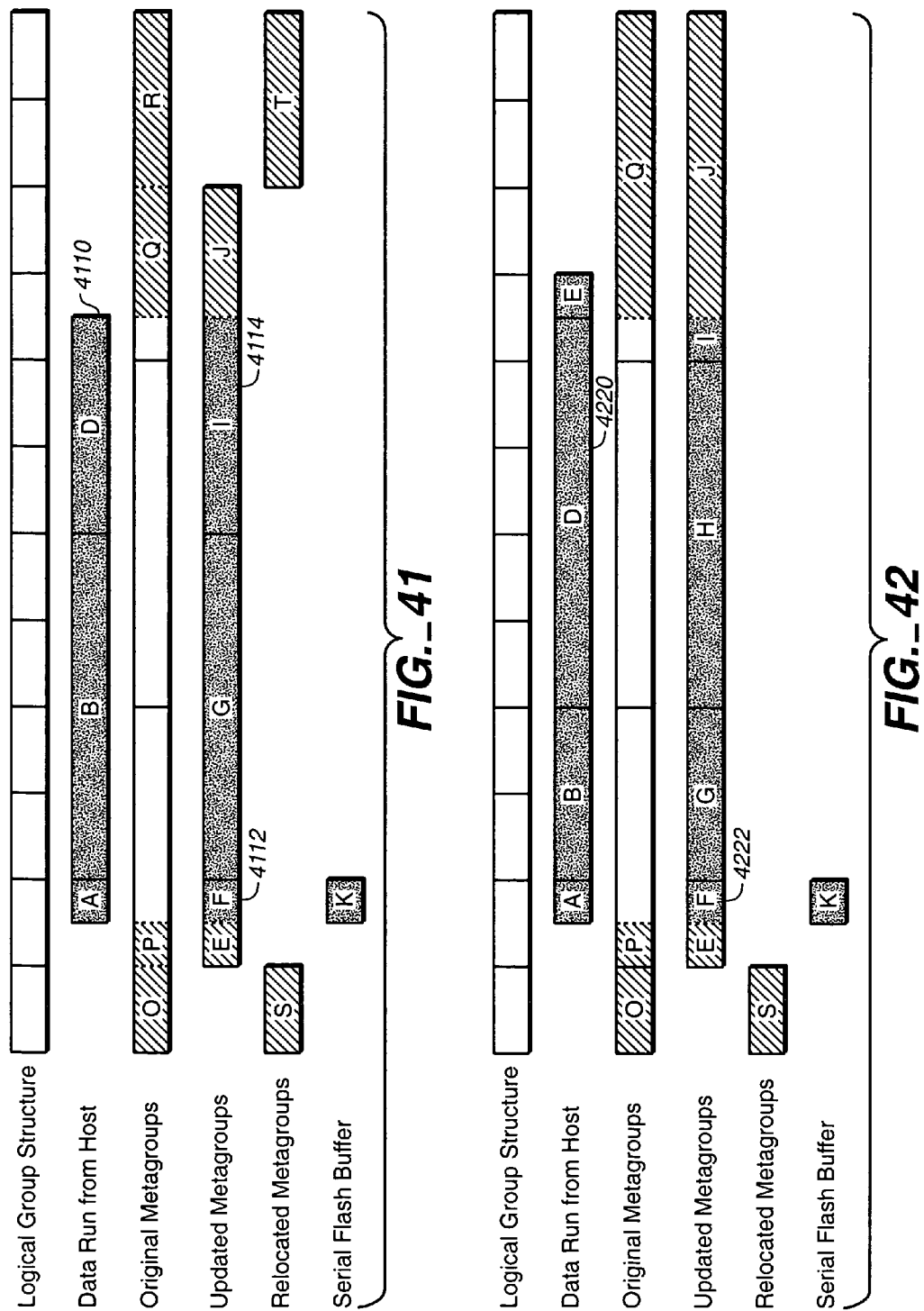
FIG._41
FIG._42

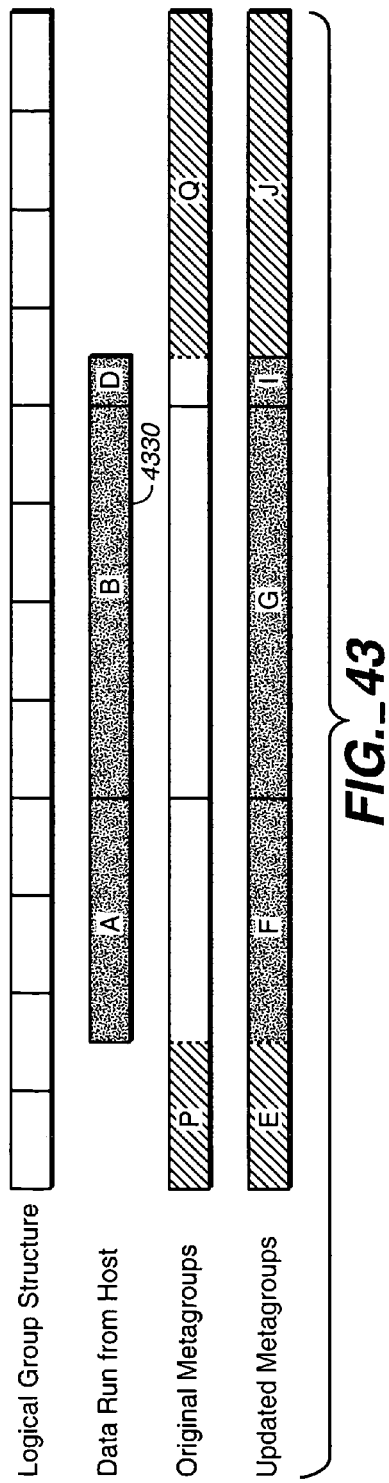

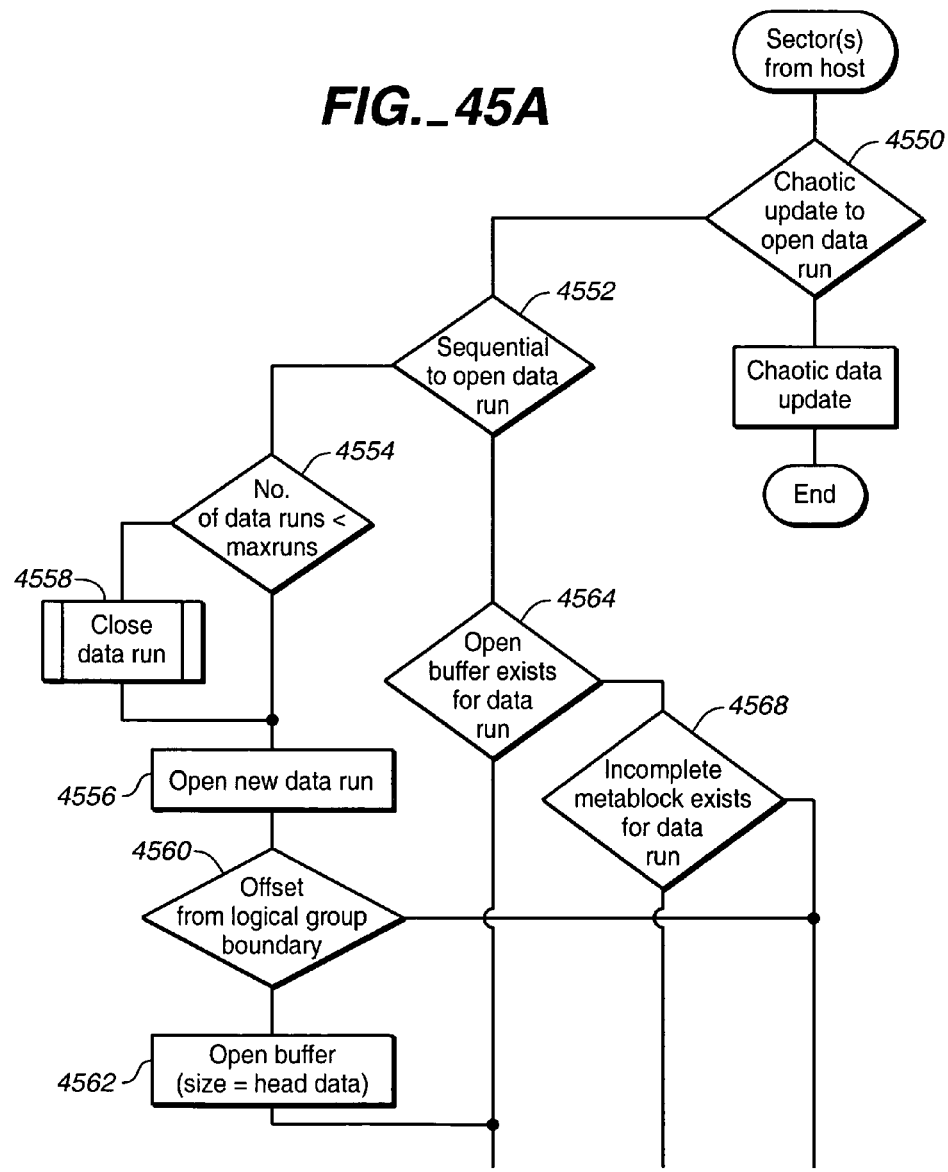

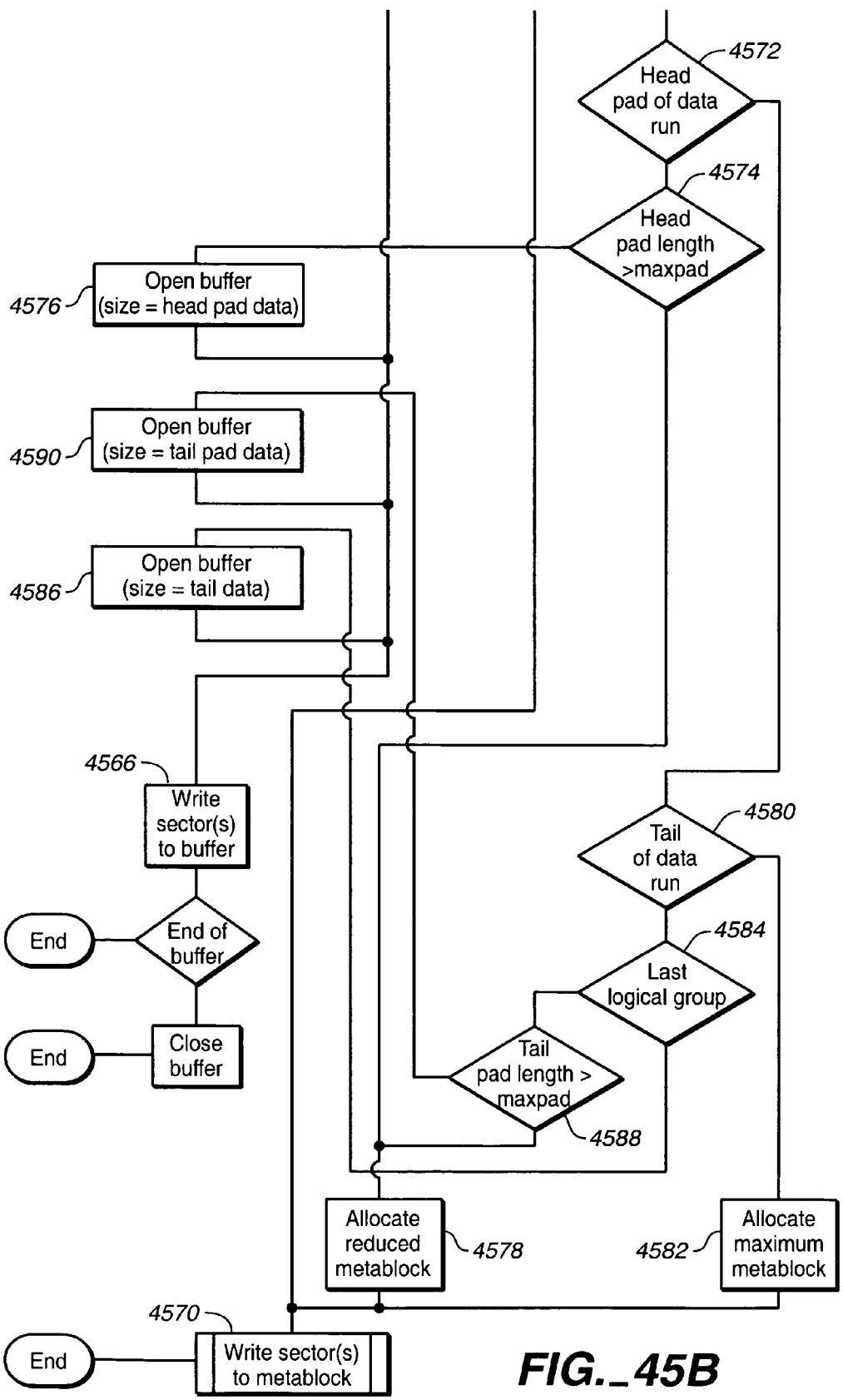
FIG._45B

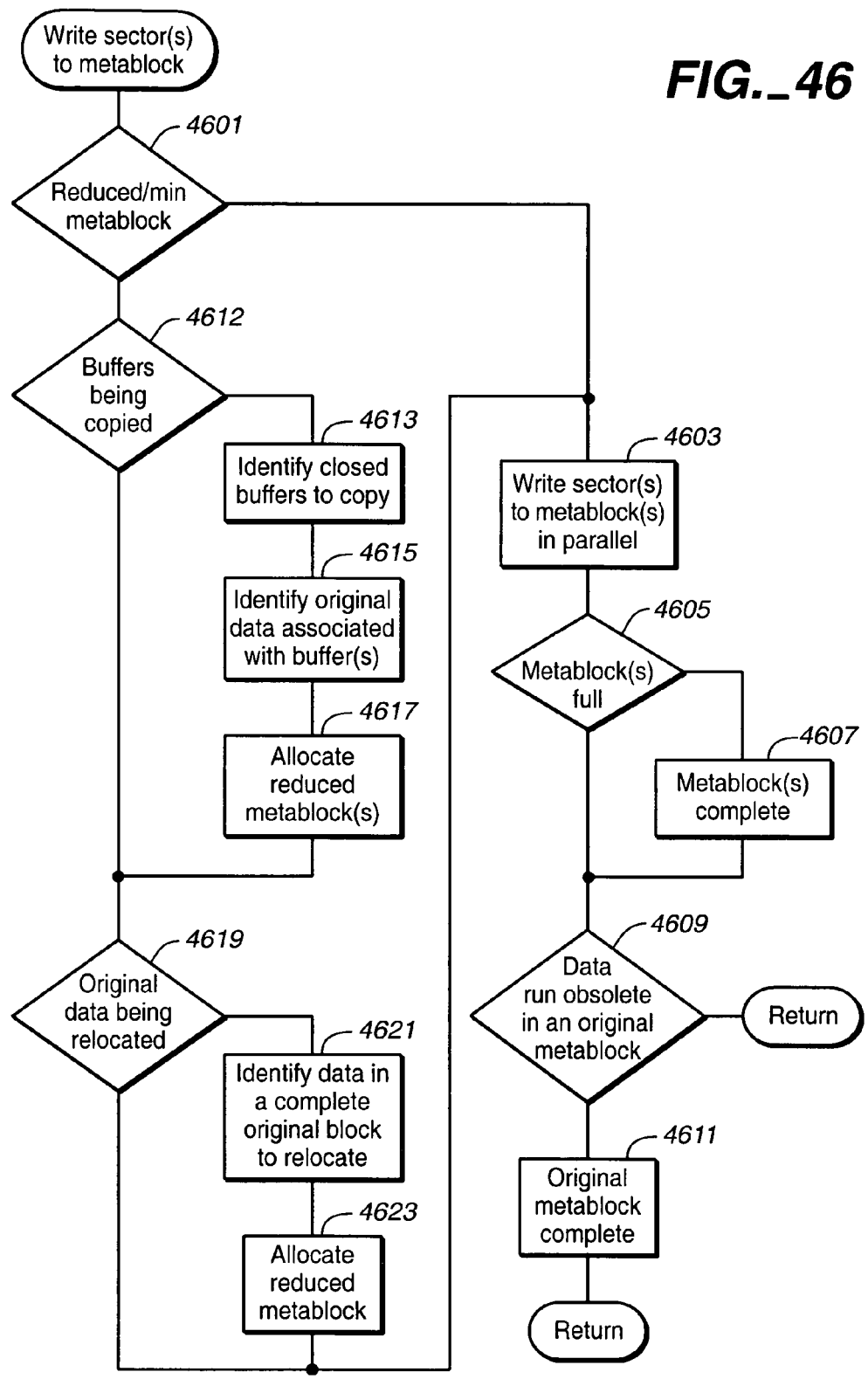
FIG._46

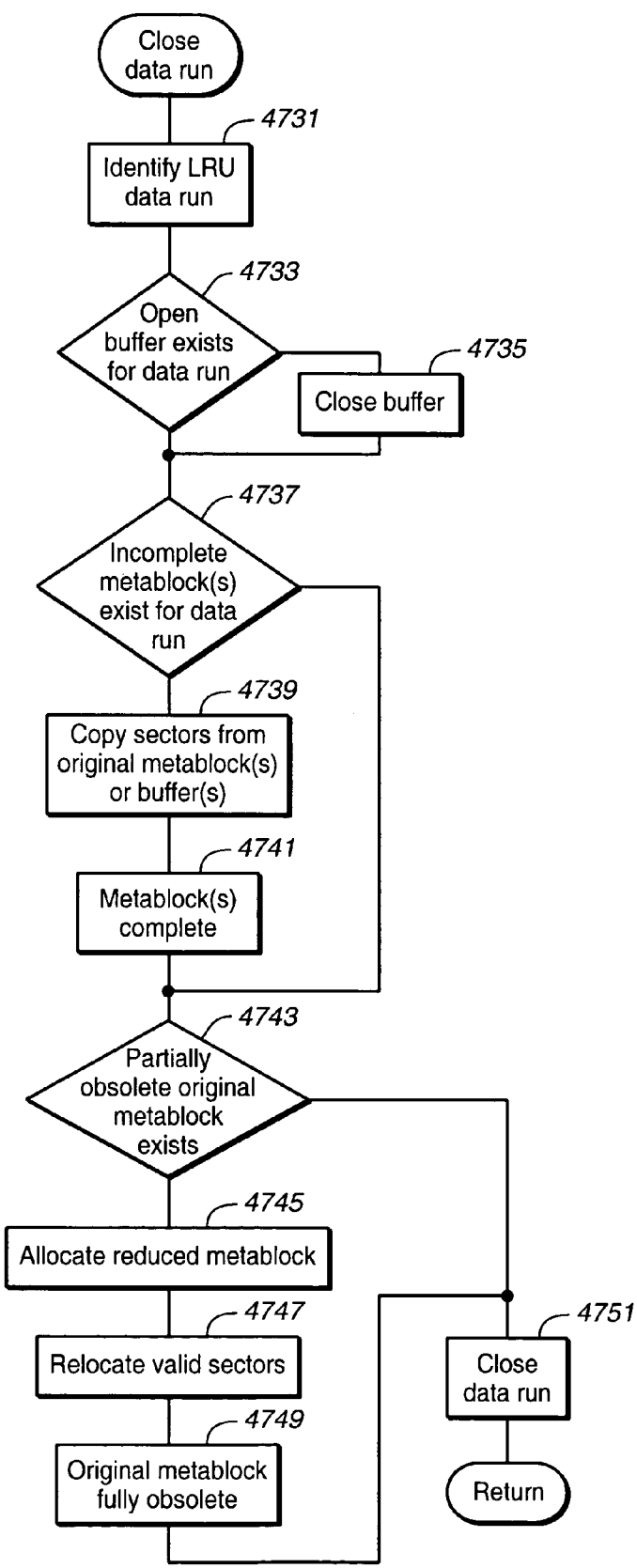
FIG._47

DATA RUN PROGRAMMING

CROSS-REFERENCE TO RELATED APPLICATION

This application is a continuation-in-part of application Ser. No. 10/841,118, by Alan Welsh Sinclair, filed on May 7, 2004, which is a continuation-in-part of application Ser. No. 10/749,189, by Alan Welsh Sinclair, filed on Dec. 30, 2003, which applications are hereby incorporated by reference in their entirety.

BACKGROUND.

This invention relates generally to the operation of non-volatile memory systems, and, more specifically, to the handling of data within such memory systems.

There are many commercially successful non-volatile memory products being used today, particularly in the form of small form factor cards, which employ an array of flash EEPROM (Electrically Erasable and Programmable Read Only Memory) cells formed on one or more integrated circuit chips. A memory controller, usually but not necessarily on a separate integrated circuit chip, interfaces with a host to which the card is removably connected and controls operation of the memory array within the card. Such a controller typically includes a microprocessor, some non-volatile read-only-memory (ROM), a volatile random-access-memory (RAM) and one or more special circuits such as one that calculates an error-correction-code (ECC) from data as they pass through the controller during the programming and reading of data. Some of the commercially available cards are CompactFlash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. Besides the memory card implementation, this type of memory can alternatively be embedded into various types of host systems.

Two general memory cell array architectures have found commercial application, NOR and NAND. In a typical NOR array, memory cells are connected between adjacent bit line source and drain diffusions that extend in a column direction with control gates connected to word lines extending along rows of cells. A memory cell includes at least one storage element positioned over at least a portion of the cell channel region between the source and drain. A programmed level of charge on the storage elements thus controls an operating characteristic of the cells, which can then be read by applying appropriate voltages to the addressed memory cells. Examples of such cells, their uses in memory systems and methods of manufacturing them are given in U.S. Pat. Nos. 5,070,032, 5,095,344, 5,313,421, 5,315,541, 5,343,063, 5,661,053 and 6,222,762 which patents, along with all patents and patent applications cited in this application are hereby incorporated by reference in their entirety.

The NAND array utilizes series strings of more than two memory cells, such as 16 or 32, connected along with one or more select transistors between individual bit lines and a reference potential to form columns of cells. Word lines extend across cells within a large number of these columns. An individual cell within a column is read and verified during programming by causing the remaining cells in the string to be turned on hard so that the current flowing through a string is dependent upon the level of charge stored in the addressed cell. Examples of NAND architecture arrays and their operation as part of a memory system are found in U.S. Pat. Nos. 5,570,315, 5,774,397, 6,046,935, and 6,522,580.

The charge storage elements of current flash EEPROM arrays, as discussed in the foregoing referenced patents, are most commonly electrically conductive floating gates, typically formed from conductively doped polysilicon material. An alternate type of memory cell useful in flash EEPROM systems utilizes a non-conductive dielectric material in place of the conductive floating gate to store charge in a non-volatile manner. A triple layer dielectric formed of silicon oxide, silicon nitride and silicon oxide (ONO) is sandwiched between a conductive control gate and a surface of a semi-conductive substrate above the memory cell channel. The cell is programmed by injecting electrons from the cell channel into the nitride, where they are trapped and stored in a limited region, and erased by injecting hot holes into the nitride. Several specific cell structures and arrays employing dielectric storage elements are described in United States patent application publication no. 2003/0109093 of Harari et al.

Individual flash EEPROM cells store an amount of charge in a charge storage element or unit that is representative of one or more bits of data. The charge level of a storage element controls the threshold voltage (commonly referenced as $V_T$) of its memory cell, which is used as a basis of reading the storage state of the cell. A threshold voltage window is commonly divided into a number of ranges, one for each of the two or more storage states of the memory cell. These ranges are separated by guardbands that include a nominal sensing level that allows determining the storage states of the individual cells. These storage levels do shift as a result of charge disturbing programming, reading or erasing operations performed in neighboring or other related memory cells, pages or blocks. Error correcting codes (ECCs) are therefore typically calculated by the controller and stored along with the host data being programmed and used during reading to verify the data and perform some level of data correction if necessary. Also, shifting charge levels can be restored back to the centers of their state ranges from time-to-time, before disturbing operations cause them to shift completely out of their defined ranges and thus cause erroneous data to be read. This process, termed data refresh or scrub, is described in U.S. Pat. Nos. 5,532,962 and 5,909,449.

As in most all integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, eight states stores three bits of data per storage element, and so on. Multiple state flash EEPROM structures using floating gates and their operation are described in U.S. Pat. Nos. 5,043,940 and 5,172,338, and for structures using dielectric floating gates in aforementioned U.S. patent application publication no. 2003/0109093. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete blocks of cells that are erased together. That is, the erase block is the erase unit, a minimum number of cells that are simultaneously erasable. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored. Such memories are typically configured with 16, 32 or more pages within each erase block, and each page stores one or just a few host sectors of data.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

In some memory systems, the physical memory cells are also grouped into two or more zones. A zone may be any partitioned subset of the physical memory or memory system into which a specified range of logical block addresses is mapped. For example, a memory system capable of storing 64 Megabytes of data may be partitioned into four zones that store 16 Megabytes of data per zone. The range of logical block addresses is then also divided into four groups, one group being assigned to the erase blocks of each of the four zones. Logical block addresses are constrained, in a typical implementation, such that the data of each are never written outside of a single physical zone into which the logical block addresses are mapped. In a memory cell array divided into planes (sub-arrays), which each have their own addressing, programming and reading circuits, each zone preferably includes erase blocks from multiple planes, typically the same number of erase blocks from each of the planes. Zones are primarily used to simplify address management such as logical to physical translation, resulting in smaller translation tables, less RAM memory needed to hold these tables, and faster access times to address the currently active region of memory, but because of their restrictive nature can result in less than optimum wear leveling.

To further efficiently manage the memory, erase blocks may be linked together to form virtual blocks or metablocks. That is, each metablock is defined to include one erase block from each plane. Use of the metablock is described in U.S. Pat. No. 6,763,424. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page.

Data stored in a metablock are often updated, the likelihood of updates occurring in a metablock increases as the data capacity of the metablock increases. Updated sectors of one metablock are normally written to another metablock. The unchanged sectors are usually also copied from the original to the new metablock, as part of the same programming operation, to consolidate the data. Alternatively, the unchanged data may remain in the original metablock until later consolidation with the updated data into a single metablock again.

Copying unchanged sectors may add to the time required for copying and adds to the space occupied by the data in the memory array because the original metablock may not be used until an erase operation is performed. Copying of unchanged sectors is a result of logical fragmentation of host files into different metablocks. Where a metablock contains portions of two host files, updating one of the files also involves copying the portion of the other file that is stored in the same metablock. As metablocks become larger, the portions being copied also become larger. Thus, logical fragmentation becomes a greater problem as metablocks become larger.

It is common to operate large block or metablock systems with some extra erase blocks maintained in an erased block pool. When one or more pages of data less than the capacity of an erase block are being updated, it is typical to write the updated pages to an erase block from the pool and then copy data of the unchanged pages from the original erase block to erase pool block. Variations of this technique are described in aforementioned U.S. Pat. No. 6,763,424. Over time, as a result of host data files being re-written and updated, many erase blocks can end up with a relatively few number of its pages containing valid data and remaining pages containing data that is no longer current. In order to be able to efficiently use the data storage capacity of the array, logically related data pages of valid data are from time-to-time gathered together from fragments among multiple erase blocks and consolidated together into a fewer number of erase blocks. This process is commonly termed "garbage collection."

SUMMARY OF THE INVENTION

Data may be stored in a memory array in adaptive metablocks. The size of an adaptive metablock may be tailored to the data to be stored. Adaptive metablock size may be determined based on the nature of the data (control data, data from host) or may be determined based on boundaries within the data, such as boundaries between files. Configuring adaptive metablocks according to the data reduces the effects of logical fragmentation.

Logical groups that contain data equal to the data in one erase block of a memory array are formed from logically sequential sectors. Adaptive logical blocks are formed from logical groups. Adaptive logical blocks may contain different numbers of logical groups. Individual adaptive logical blocks are stored in individual adaptive metablocks in a memory array. The number of erase blocks in an adaptive metablock is equal to the number of logical groups in the corresponding adaptive logical block. Thus, an adaptive metablock has a variable number of erase blocks. The erase blocks of a metablock may be from fewer than all the planes of the memory array. More than one adaptive metablock may be programmed at one time. Adaptive metablocks may be formed according to the data to be stored. Large adaptive metablocks may be used to attain a high degree of parallelism during programming. Smaller adaptive metablocks may be used to allow efficient updating of stored data.

Adaptive logical blocks may be formed so that boundaries between adaptive logical blocks reflect boundaries in the data, for example boundaries between files or streams of data. By tailoring adaptive logical blocks in this way, copying of data within the memory array may be reduced. Where data is updated, a new adaptive logical block may be formed to hold the updated data with a small amount of old data. Thus, if the same data is updated again, there is only a small amount of old data that needs to be copied.

Where an adaptive logical block is partially filled, the data may be copied to a smaller adaptive logical block. This may be done before the partially filled adaptive logical block is programmed or it may be done after the partially filled adaptive logical block is programmed in an adaptive metablock, in which case the adaptive metablock containing the partially filled adaptive logical block is marked as obsolete. The smaller adaptive logical block is programmed to a smaller adaptive metablock in the memory array. Thus, there is a saving of space in the memory array.

In architectures that use non-sequentially updated metablocks (chaotic blocks) to hold update data, an adaptive metablock may be used instead. The size of the adaptive metablock may be selected according to the logical address range that is being updated. If the adaptive metablock is tailored to a particular logical address range, updates in that range may be performed more efficiently because there is less copying of data.

Formation of adaptive metablocks and recording the location of stored data is performed by a media manager. A media manager maintains records of available erase blocks. Records of locations of stored data are also maintained by the media manager. Records of locations of stored data are maintained in tables (or lists) have an entry for each logical group. The entry for each logical group indicates the size of the adaptive metablock (and corresponding adaptive logical block) containing the logical group, the position of the logical group within its adaptive logical block and the physical location of one of the erase blocks of the metablock.

Non-volatile random access memory (NVRAM) may be used in combination with a flash memory array that stores data in adaptive metablocks. An NVRAM may be used as a data buffer that holds data before it is programmed to flash memory. While the data is in NVRAM, a determination may be made on how it may be efficiently programmed. Several data streams may be held in NVRAM and programmed together in an efficient manner. NVRAM may also provide an alternative storage location for certain data in place of a portion of the flash memory array. In this application, the NVRAM may be configured to be used similarly to flash memory. The NVRAM may be divided into units that are the same size as erase blocks of the flash memory. The NVRAM may have a physical address range so that logical groups stored in NVRAM are assigned a physical address that is within the NVRAM physical address range. A logical group may be assigned to NVRAM if it is frequently updated. Thus, updating may take place without. copying and erasing in the flash memory array. Updating data in NVRAM is more efficient than in flash memory but the data is not lost if power is lost as it would be in volatile memory.

Data boundaries such as file boundaries occur in data that is to be stored in flash memory. Where data to be stored is addressed in units of logical groups, the boundaries between logical groups may not coincide with data boundaries. Thus, logical groups and the metagroups (logical blocks) formed from logical groups may contain data boundaries. Where large metagroups and metablocks contain data boundaries, updating files may require copying large amounts of data. This uses system resources and reduces the speed of writing of new data to the memory array.

Adaptive metablocks may be formed to store data boundaries in adaptive metablocks of minimum size. By programming data boundaries in metablocks of minimum size, copying of data during subsequent updating of data in a file may be reduced. When an update of a file occurs, the original metablocks containing the file contain obsolete data. Some original metablocks contain data that are not part of the updated file. These data may not be obsolete and may therefore need to be copied to a new location before the original metablocks are erased and reused. By making such original metablocks smaller, the amount of data being copied may be reduced. Where an adaptive metablock consisting of one erase block is used, less than one logical group of data is copied. Such adaptive metablocks may be programmed in parallel so that reduced adaptive metablock size does not have to reduce the parallelism used during programming.

Some original metablocks may not be fully populated with data, for example, where a data boundary at the end of a file is in the original metablock and there is no data following the data boundary. The data in such original metablocks may be copied to metablocks that are sized to hold the data with a minimum of empty space. This may save space in the memory array. Smaller adaptive metablocks may be programmed in parallel. Adaptive metablocks programmed in parallel may include relocated data and host data so that relocation operations are carried out at the same time that host data is written to the memory array.

In some memory systems, a host may provide information to a memory controller regarding the locations of logical boundaries (e.g. file boundaries and data run boundaries) in data sent by the host to the memory system. Based on the logical boundary locations provided by the host (or otherwise obtained), data may be directly stored in an aligned format in the memory array without first being stored in an intermediate format in the memory array or NVRAM. Portions of data that do not contain logical boundaries may be directly written to the memory array in metablocks of maximum size.

A portion of data that includes a logical boundary is ultimately stored in a minimum size metablock. However, because writing such a metablock by itself would be slow, such a portion of data may first be buffered. A serial flash buffer is provided to store a portion of data from a host that is later written in an aligned manner in the memory array. A serial flash buffer consists of metablocks of maximum size so that data are written with maximum parallelism. When data are copied from the serial flash buffer, they may be written with a high degree of parallelism by writing more than one adaptive metablock at a time. Thus, data that are assigned to minimum-size metablocks may first be written to the serial flash buffer with maximum parallelism and later copied to the minimum-size metablocks with a high degree of parallelism by writing to multiple minimum-size metablocks in parallel. In this way, a serial flash buffer helps to maintain a high degree of parallelism (and therefore high performance) even where small metablocks are used. For metablocks of intermediate size, data may be directly written to the memory array or may first be buffered according to the size of the metablock.

A portion of data stored in memory may be considered to be stored in a fully aligned manner when logical boundaries at each end of the portion are stored in metablocks of minimum size. A portion of data is stored in a partially aligned manner where a logical boundary at one end is stored in a metablock of minimum size and the logical boundary at the other end is not stored in a metablock of minimum size. A portion of data is stored in a non-aligned manner where neither logical boundary is stored in a metablock of minimum size. When a portion of data is updated, it may be stored with a higher degree of alignment than the data it updates.

BRIEF DESCRIPTION OF THE DRAWINGS

FIGS. 1A and 1B are block diagrams of a non-volatile memory and a host system, respectively, that operate together;

FIG. 2 illustrates a first example organization of the memory array of FIG. 1A;

FIG. 3 shows an example host data sector with overhead data as stored in the memory array of FIG. 1A;

FIG. 4 illustrates a second example organization of the memory array of FIG. 1A;

FIG. 5 illustrates a third example organization of the memory array of FIG. 1A;

FIG. 6 shows an example of a metablock in a memory array such as that of FIG. 5;

FIG. 7 shows an example of a logical block being stored in a metablock such as shown in FIG. 6;

FIG. 8 shows a data update where original data is stored in a metablocks in a memory array;

FIG. 9A shows an adaptive logical block being stored in an adaptive metablock in a memory array;

FIG. 9B shows logical mapping of sectors to logical groups and logical groups to adaptive logical blocks of 9A;

FIG. 10 shows parallel programming of two adaptive logical blocks to two adaptive metablocks;

FIG. 11 shows logical groups mapped to adaptive logical blocks in various configurations;

FIG. 12A shows data stored in adaptive logical blocks being updated and stored in new adaptive logical blocks.

FIG. 12B shows an example of adaptive logical blocks remapped to fit data streams;

FIG. 12C shows another example of adaptive logical blocks remapped to fit data streams;

FIG. 13 shows a partially filled adaptive logical block remapped to a smaller adaptive logical block;

FIG. 14 shows an adaptive logical block used for updating data that is adapted to the logical address range being updated;

FIG. 15A shows an adaptive logical block stored in an adaptive metablock of a memory array;

FIG. 15B shows sectors of a logical group of the adaptive logical block of FIG. 15A stored in a memory array;

FIG. 15C shows another example of sectors of a logical group stored in a memory array;

FIG. 15D shows an example of the arrangement of sectors where two adaptive metablocks are programmed in parallel;

FIG. 15E shows an example of the programming of three metablocks in parallel and the resulting arrangement of pages within the metablocks;

FIG. 15F shows an example of updating data where the first updated sector is not the first sector in an adaptive metablock;

FIG. 16 shows a table recording the locations of logical groups stored in an adaptive metablock of a memory array;

FIG. 17 shows a media manager that may be used to manage adaptive metablock architecture;

FIG. 18A is a block diagram showing an example of erased block management hierarchy;

FIG. 18B shows an EBL block comprising multiple sectors including one valid sector and multiple obsolete sectors;

FIG. 18C is a block diagram showing an example of address table management hierarchy;

FIG. 18D shows data structure including boot addresses and boot block;

FIG. 19 shows a memory system including NVRAM;

FIG. 20 shows two data streams efficiently stored in a memory array using NVRAM;

FIG. 21 shows updated data stored in NVRAM;

FIG. 22 shows files comprised of data runs;

FIG. 23 shows a file boundary within a data run;

FIG. 24 shows a hierarchy of data units;

FIG. 25 shows two data runs being mapped to metagroups;

FIG. 26 shows a data run with a file boundary being mapped to metagroups;

FIG. 27 shows two schemes for storing data in flash memory with data boundary management;

FIG. 28A shows a program block comprised of metablocks A-D storing metagroups A-D of FIG. 25;

FIG. 28B shows the configuration of sectors in metablocks A-D of FIG. 28A;

FIG. 28C shows sectors in an accumulator being transferred to a program block;

FIG. 29A shows a full metagroup;

FIG. 29B shows a partial metagroup;

FIG. 29C shows a short metagroup;

FIG. 29D shows a start metagroup;

FIG. 29E shows a multifile metagroup;

FIG. 30A shows remapping of a partial metagroup;

FIG. 30B shows remapping of a short metagroup;

FIG. 30C shows remapping of a start metagroup;

FIG. 30D shows remapping of a multifile metagroup;

FIG. 31 shows parallel programming of host data and relocated data.

FIG. 32 shows storage of host data using a serial flash buffer.

FIG. 33A shows alternative methods of storing data from a host.

FIG. 33B shows the alternative methods of FIG. 33A with original data copied with writing of data from a host.

FIG. 34 shows alternative schemes for storing data from a host.

FIG. 35A shows a data run stored with non-alignment.

FIG. 35B shows a data run stored with partial alignment.

FIG. 35C shows a data run stored with full alignment.

FIG. 35D shows an exemplary structure of a data run.

FIG. 35E shows exemplary structures of data runs of different lengths.

FIG. 36 shows examples of transitions that may occur during updating of data in a data run.

FIG. 37 shows an example of a full-to-fill transition.

FIG. 38 shows an example of a partial-to-full transition.

FIG. 39 shows an example of a partial-to-partial transition.

FIG. 40 shows an example of a transition from non-alignment to full alignment.

FIG. 41 shows an example of a transition from non-alignment to partial alignment.

FIG. 42 shows a second example of transition from non-alignment to partial alignment.

FIG. 43 shows an example of non-alignment to non-alignment.

FIG. 44 lists certain data structures and operations that may be carried out involving the data structures.

FIG. 45 is a flowchart that shows storing sectors according to an embodiment of the present invention.

FIG. 46 is a flowchart that shows writing of sectors of FIG. 45.

FIG. 47 is a flowchart that shows closing a data run according to an embodiment of the present invention.

DESCRIPTION OF EXEMPLARY EMBODIMENTS

Memory Architectures and Their Operation

Referring initially to FIG. 1A, a flash memory includes a memory cell array and a controller. In the example shown, two integrated circuit devices (chips) 11 and 13 include an array 15 of memory cells and various logic circuits 17. The logic circuits 17 interface with a controller 19 on a separate chip through data, command and status circuits, and also provide addressing, data transfer and sensing, and other support to the array 13. A number of memory array chips can be from one to many, depending upon the storage capacity provided. A memory cell array may be located on a single chip or may be comprised of memory cells on multiple chips. The controller and part or the entire array can alternatively be combined onto a single integrated circuit chip but this is currently not an economical alternative.

A typical controller 19 includes a microprocessor 21, a read-only-memory (ROM) 23 primarily to store firmware and a buffer memory (RAM) 25 primarily for the temporary storage of user data either being written to or read from the memory chips 11 and 13. Buffer memory 25 may be either volatile or non-volatile memory. Circuits 27 interface with the memory array chip(s) and circuits 29 interface with a host though connections 31. The integrity of data is in this example determined by calculating an ECC with circuits 33 dedicated to calculating the code. As user data is being transferred from the host to the flash memory array for storage, the circuit calculates an ECC from the data and the code is stored in the memory. When that user data are later read from the memory, they are again passed through the circuit 33, which calculates the ECC by the same algorithm and compares that code with the one calculated and stored with the data. If they compare, the integrity of the data is confirmed. If they differ, depending upon the specific ECC algorithm utilized, those bits in error, up to a number supported by the algorithm, can be identified and corrected.

The connections 31 of the memory of FIG. 1A mate with connections 31' of a host system, an example of which is given in FIG. 1B. Data transfers between the host and the memory of FIG. 1A are through interface circuits 35. A typical host also includes a microprocessor 37, a ROM 39 for storing firmware code and RAM 41. Other circuits and subsystems 43 often include a high capacity magnetic data storage disk drive, interface circuits for a keyboard, a monitor and the like, depending upon the particular host system. Some examples of such hosts include desktop computers, laptop computers, handheld computers, palmtop computers, personal digital assistants (PDAs), MP3 and other audio players, digital cameras, video cameras, electronic game machines, wireless and wired telephony devices, answering machines, voice recorders, network routers and others.

The memory of FIG. 1A may be implemented as a small enclosed card containing the controller and all its memory array circuit devices in a form that is removably connectable with the host of FIG. 1B. That is, mating connections 31 and 31' allow a card to be disconnected and moved to another host, or replaced by connecting another card to the host. Alternatively, the memory array devices may be enclosed in a separate card that is electrically and mechanically connectable with a card containing the controller and connections 31. As a further alternative, the memory of FIG. 1A may be embedded within the host of FIG. 1B, wherein the connections 31 and 31' are permanently made. In this case, the memory is usually contained within an enclosure of the host along with other components. As a further alternative, a memory chip such as memory chip 11 may connect directly to connections 31' of the host system without a memory controller between them. In this case, the functions of the memory controller are performed by microprocessor 37 of the host system.

FIG. 2 illustrates a portion of a memory array wherein memory cells are grouped into erase blocks, the cells in each erase block being erasable together as part of a single erase operation, usually simultaneously. An erase block is the minimum unit of erase.

The size of the individual memory cell erase blocks of FIG. 2 can vary but one commercially practiced form includes a single sector of data in an individual erase block. The contents of such a data sector are illustrated in FIG. 3. User data 51 are typically 512 bytes. In addition to the user data 51 are overhead data that includes an ECC 53 calculated from the user data, parameters 55 relating to the sector data and/or the erase block in which the sector is programmed and an ECC 57 calculated from the parameters 55 and any other overhead data that might be included. Alternatively, a single ECC may be calculated from both user data 51 and parameters 55.

The parameters 55 may include a quantity related to the number of program/erase cycles experienced by the erase block, this quantity being updated after each cycle or some number of cycles. When this experience quantity is used in a wear leveling algorithm, logical block addresses are regularly re-mapped to different physical block addresses in order to even out the usage (wear) of all the erase blocks. Another use of the experience quantity is to change voltages and other parameters of programming, reading and/or erasing as a function of the number of cycles experienced by different erase blocks.

The parameters 55 may also include an indication of the bit values assigned to each of the storage states of the memory cells, referred to as their "rotation". This also has a beneficial effect in wear leveling. One or more flags may also be included in the parameters 55 that indicate status or states. Indications of voltage levels to be used for programming and/or erasing the erase block can also be stored within the parameters 55, these voltages being updated as the number of cycles experienced by the erase block and other factors change. Other examples of the parameters 55 include an identification of any defective cells within the erase block, the logical address of the data that is mapped into this physical block and the address of-any substitute erase block in case the primary erase block is defective. The particular combination of parameters 55 that are used in any memory system will vary in accordance with the design. Also, some or all of the overhead data can be stored in erase blocks dedicated to such a function, rather than in the erase block containing the user data or to which the overhead data pertains.

Different from the single data sector erase block of FIG. 2 is a multi-sector erase block of FIG. 4. An example erase block 59, still the minimum unit of erase, contains four pages 0-3, each of which is the minimum unit of programming. One or more host sectors of data are stored in each page, usually along with overhead data including at least the ECC calculated from the sector's data and may be in the form of the data sector of FIG. 3.

Re-writing the data of an entire erase block usually involves programming the new data into an available erase block of an erase block pool, the original erase block then being erased and placed in the erase pool. When data of less than all the pages of an erase block are updated, the updated data are typically stored in a page of an erase block from the erased block pool and data in the remaining unchanged pages are copied from the original erase block into the new erase block. The original erase block is then erased. Variations of this large block management technique include writing the updated data into a page of another erase block without moving data from the original erase block or erasing it. This results in multiple pages having the same logical address. The most recent page of data is identified by some convenient technique such as the time of programming that is recorded as a field in sector or page overhead data.

A further multi-sector erase block arrangement is illustrated in FIG. 5. Here, the total memory cell array is physically divided into two or more planes, four planes 0-3 being illustrated. Each plane is a sub-array of memory cells that has its own data registers, sense amplifiers, addressing decoders and the like in order to be able to operate largely independently of the other planes. All the planes may be provided on a single integrated circuit device or on multiple devices, an example being to form each plane from one or more distinct integrated circuit devices. Each erase block in the example system of FIG. 5 contains 16 pages P0-P15, each page having a capacity of one, two or more host data sectors and some overhead data.

Metablocks

Yet another memory cell arrangement is illustrated in FIG. 6. Each plane contains a large number of erase blocks. In order to increase the degree of parallelism of operation, erase blocks within different planes are logically linked to form metablocks. One such metablock is illustrated in FIG. 6. Each metablock is logically addressable and the memory controller assigns and keeps track of the erase blocks that form the individual metablocks. The host system provides data in the form of a stream of sectors. This stream of sectors is divided into logical blocks. Here, a logical block is a logical unit of data that contains the same number of sectors of data as are contained in a metablock of the memory array. The memory controller maintains a record of the location where each logical block is stored. Such a logical block 61 of FIG. 6, for example, is identified by a logical block addresses (LBA) that is mapped by the controller into the physical block numbers (PBNs) of the blocks that make up the metablock. All blocks of the metablock are erased together, and pages from each block are generally programmed and read simultaneously.

FIG. 7 shows data being stored in a memory array. Data is sent by a host in the form of a stream of sectors of data 75. The sectors are formed into logical blocks 71, 72. Logical blocks are then programmed to metablocks. For example, logical block 72 is programmed to metablock 74. FIG. 7 shows a memory array 76 having four planes. Metablock 74 has one erase block from each of planes 0, 1, 2 and 3. Metablock 74 extends across all planes of the array so that all planes may be programmed in parallel. Thus, the size of a metablock is typically determined by the number of planes in the array. Also, the size of corresponding logical blocks is determined by this size.

FIG. 8 shows data being updated in a memory array where data is stored in metablocks. Updated data sectors 81 are received from a host to be stored in a memory array. Updated data sectors 81 correspond to original data sectors in logical blocks 82, 83. Original data in logical blocks 82, 83 are stored in metablocks 84, 85 in the memory array 89. Thus, some of the sectors in metablock 84 and some of the sectors in metablock 85 need to be updated while others do not. Updating may be done by combining updated data sectors 81 with original sectors in metablocks 84, 85 that do not need to be updated. These combined data are then written to replacement metablocks 86, 87 and original metablocks 84, 85 are marked as obsolete. Obsolete metablocks 84, 85 are eventually erased and made available again during garbage collection. Combining the updated data sectors 81 with the original sectors may be done when the data is received. Alternatively, sectors of updated data 81 may be written to another location and may be combined with original data at a later time as part of garbage collection. While large metablocks allow faster programming because of greater parallelism, updating data stored in large metablocks may involve copying large amounts of data even where only a small amount of new data is received. Consolidating new data and original data in a metablock may impose a significant overhead during garbage collection.

Adaptive Metablocks

FIG. 9A shows an example of an adaptive metablock 98 used to store data in a memory array. Data is received in the form of a stream of sectors of data 99. Sectors are formed into logical groups including logical groups 91, 92, 93. A logical group is a logical unit of data that is equal to the amount of data stored in one erase block of the memory array. A logical group is formed from logically sequential sectors received from the host. Each logical group is formed with a particular logical address range. Thus, a logical group is an intermediate logical unit of data that may contain many sectors but is generally smaller than an adaptive metablock Logical groups are formed into adaptive logical blocks. Adaptive logical blocks or logical blocks may also be referred to as "metagroups." The term "metagroup" is considered equivalent to the term "adaptive logical block." The term "adaptive logical block" is generally used in this application. An adaptive logical block contains a variable number of logical groups. Thus, in FIG. 9A adaptive logical block 95 contains 3 logical groups 91, 92, 93. Adaptive logical block 96 contains two logical groups and logical block 97 contains 4 logical groups. Adaptive logical block 95 is programmed to adaptive metablock 98. Adaptive logical block 95 contains three logical groups 91, 92, 93 and correspondingly, adaptive metablock 98 contains three erase blocks 911, 912, 913. Therefore, adaptive metablock 98 does not have erase blocks from each plane of the array, only from planes 0, 2 and 3. Adaptive metablock 98 has no erase block from plane 1. FIG. 9B shows in more detail how sectors are mapped to logical groups 91, 92, 93. Each logical group 91, 92, 93 contains n sectors of data. FIG. 9B also shows logical groups 91, 92, 93 mapped to adaptive logical block 95. An adaptive logical block is programmed to a corresponding sized adaptive metablock in the memory array.

In some examples of metablock architecture, metablock size is fixed. The number of planes in an array may determine the size of the metablock. In these examples, the size of logical blocks is also fixed and sectors are mapped to logical blocks in a predetermined fashion. Thus, the logical address space is divided into equal sized logical blocks having fixed logical address ranges and fixed boundary locations. In contrast, in architectures using adaptive metablocks, adaptive logical blocks do not have fixed sizes and adaptive logical blocks are not limited to predetermined ranges of logical address space. Instead, adaptive logical blocks may be of various sizes and may be formed to extend over different ranges of logical address space. The formation of logical groups facilitates adaptive metablock architecture by providing an intermediate data unit from which adaptive logical blocks of various sizes may be formed. Thus, an adaptive metablock is an example of a metablock that does not have fixed size and an adaptive logical block is an example of a logical block that does not have fixed size.

The planes used to form an adaptive metablock may be selected according to an algorithm that provides efficient use of the erase blocks of the array. Planes may be given different priority based on the number of available erase blocks in a plane and whether a particular plane is still busy from a previous operation. Also, consideration may be given to using the same planes for new material as is used for the material that is being updated so that a copy operation may be performed within the plane. Such copying of data within a plane (on-chip copy) may be more efficient in some architectures. Generally, the selection of particular erase blocks within the selected planes is not critical.

One result of having adaptive metablocks of different sizes is that some adaptive metablocks may not contain an erase block from every plane of the array. If such an adaptive metablock is programmed individually then programming does not use the maximum possible parallelism. For example, in FIG. 9A, plane 1 is not programmed in the operation shown. It is generally desirable to program with the maximum parallelism possible to increase programming speed. Programming to fewer planes results in inefficiency. This is especially true when adaptive metablocks are small but there are many planes in an array. However, maintaining high parallelism with smaller adaptive metablocks is possible by programming more than one adaptive metablock at a time.

FIG. 10 shows two adaptive metablocks 1030, 1040 being programmed in parallel. Data in metablocks 1030, 1040 may be updated data supplied by a host or data being relocated within flash memory. The memory array 1005 of FIG. 10 has 6 planes. Adaptive logical block 1001 contains three logical groups 1010-1012. Therefore, corresponding metablock 1040 requires three erase blocks 1041, 1042, 1043 from three planes of the memory array. If adaptive logical block 1001 was programmed on its own, only three planes would be used and the other three would be idle. However, adaptive logical block 1002 is programmed in parallel with adaptive logical block 1001 so that five out of six planes are used. Thus, a high degree of parallelism may be achieved even with adaptive metablocks containing much fewer erase blocks than the number of planes in the array.

An algorithm assigns planes according to various criteria so that adaptive logical block 1001 is programmed to erase blocks in planes 1, 2 and 5 while adaptive logical block 1002 is programmed to erase blocks in planes 0 and 4. No erase block in plane 3 is programmed in this operation. While maximum parallelism is desirable, all six planes may not be programmed together in every programming operation. A plane may not be programmed if there are no erase blocks available in the plane. If very few erase blocks are available in the plane then it is assigned a low priority when planes are being selected for programming. Here, only five erase blocks are needed to store adaptive logical blocks 1001 and 1002. Therefore, only five planes are selected and plane 3 is not selected. Plane 3 is the plane with the lowest priority in this operation. However, the priority may be reassessed when the next program operation takes place. Priorities may have changed for the next operation because one more erase block in each of planes 0,1,2,4,5 has been used. Thus, plane 3 may be used in a subsequent programming operation if there are erase blocks available in plane 3. This algorithm balances the number of erase blocks used in different planes so that a particular plane does not fill up more rapidly and become unavailable.

The planes used for an individual adaptive metablock do not have to be physically adjacent. For example, an adaptive metablock 1030 of FIG. 10 has erase blocks 1044, 1045 in planes 0 and 4, while adaptive metablock 1040 has erase blocks 1041-1043 in planes 1, 2 and 5. Adaptive logical blocks programmed in parallel do not have to be logically sequential. Logically separated adaptive logical blocks may be programmed in parallel. For example, adaptive logical block 1001 and 1002 are not logically sequential. They are separated by adaptive logical block 1003.

When all data in an adaptive metablock had been superseded by updated or relocated versions of the data, and has become obsolete, the erase blocks forming the adaptive metablock should be erased. However, the adaptive metablock may not contain an erase block from every plane of the array and, when such an adaptive metablock is erased individually, erasure does not use the maximum parallelism. Maximum speed is therefore not achieved for erasing data and the effective programming speed of the memory system is therefore reduced from the maximum possible, since programming of data may not be carried out during an erase operation in flash memory chips in common use. This may be overcome by delaying erasure of erase blocks forming an adaptive metablock until one erase block from each plane is available, to achieve maximum erase parallelism. Erase blocks available for erasure are held in a list, and sets of blocks are periodically scheduled for erasure to achieve maximum possible parallelism. Erasure of a smaller set of blocks may be performed when the list contains no blocks in some planes.

FIG. 11 shows some possible data storage arrangements using adaptive metablocks. FIG. 11 shows mapping of incoming data in sectors to logical groups and mapping of logical groups to adaptive logical blocks. While this mapping is logical only, it will be understood that adaptive logical blocks may be programmed to adaptive metablocks of a memory array. Typically, data is first received as a stream of sectors that is stored using maximum parallelism. Thus, the memory system may behave like the system described in FIG. 7 during an initial write. FIG. 11 shows adaptive logical blocks 1101-1103, each adaptive logical block 1101-1103 having four logical groups. Thus, adaptive logical blocks 1101-1103 are of maximum size for a memory array having four planes.

At a later time, original adaptive logical blocks may be replaced with new adaptive logical blocks by remapping logical groups. For example, in the first update of FIG. 11, adaptive logical block 1101 is replaced by two adaptive logical blocks 1110 and 1111. Thus, a single adaptive logical block is replaced by two smaller adaptive logical blocks and a boundary between logical blocks is formed where previously there was no boundary. Adaptive logical block 1113 is created during the first update. Adaptive logical block 1113 includes logical group 1122 that was previously part of adaptive logical block 1103 and logical groups 1120, 1121 that were previously part of adaptive logical block 1102. Thus, adaptive logical block 1113 extends over a logical address range that previously contained a boundary between adaptive logical blocks 1102 and 1103. Adaptive logical blocks may also be combined to form larger adaptive logical blocks. In the second update of FIG. 11, logical groups 1111 and 1112 are combined to form logical group 1115. Here, adaptive logical block 1115 extends over a logical address range that was previously occupied by adaptive logical blocks 1111 and 1112. Thus, adaptive logical blocks may be formed from different combinations of adaptive logical groups. An adaptive logical block may be of any size from one logical group to a maximum number of logical groups. The maximum number of logical groups may be the number of planes in the array. The changes in adaptive logical block configuration may occur when data in one or more adaptive logical blocks is updated or may occur for some other reason. For example, adaptive logical block configuration may be updated as part of garbage collection or as a scheduled routine to optimize data storage.

Applications

FIG. 12A shows updating programmed data with new data so that subsequent updates are performed more efficiently. Frequently, a portion of new data less than a programmed adaptive metablock is received and is used to update programmed data. FIG. 12A shows new data 1210 that corresponds to portions of two adaptive logical blocks 1220, 1230. The new data has an address range that extends over the boundary between adaptive logical block 1220 and adaptive logical block 1230. Thus, adaptive metablocks 1221, 1231 corresponding to adaptive logical blocks 1220 and 1230 require updating.

New data 1210 extends over a logical address range that is within the address range of three sequential logical groups 1241, 1242 and 1243. Each of logical groups 1241-1243 has at least some portion that is to be updated. FIG. 12A shows logical group 1241 and 1243 having both data to be replaced and data that is not to be replaced. Logical group 1242 has only data that is to be replaced. New logical groups 1211, 1212 and 1213 are formed from new data 1210 and portions of original data 1214 and 1215 from logical groups 1241 and 1243. A new adaptive logical block 1250 is formed by logical groups 1211-1213. An adaptive metablock 1251 corresponding to adaptive logical block 1250 is formed from three erase blocks 1252-1254 in the memory array. Adaptive logical blocks 1256 and 1257 are formed from logical groups in which there are no new data. For example, adaptive logical block 1257 is formed from logical groups 1244-1246. Logical groups 1244-1246 may be copied from adaptive metablock 1231 in the memory array. Adaptive logical block 1257 is programmed to adaptive metablock 1259. Adaptive logical block 1256 is programmed to adaptive metablock 1258. Thus, three adaptive logical blocks 1250, 1256 and 1257 are formed in a logical address range previously occupied by two adaptive logical blocks 1220, 1230. Three adaptive metablocks 1251, 1258, and 1259 are formed in a memory array to store this data.

FIG. 12A shows a second update of new data occurring after the first update. New data 1260 consist of a stream of sectors having a logical address range that is the same logical address range as that of new data 1210. This situation is frequently encountered in non-volatile memory systems. The same range of data may be updated repeatedly because of the nature of the data stored (e.g. tables such as FATs, directories and sub-directories, an index within an application file). The second update only replaces data in adaptive logical block 1250. Thus, only adaptive logical block 1250 and corresponding adaptive metablock 1251 are updated in the second update. Adaptive logical block 1250 includes only three logical groups 1211-1213. Adaptive logical blocks 1256 and 1257 do not require updating. New data 1260 does not extend across the entire logical address range of adaptive logical block 1250 so portions of original data 1214, 1215 are copied in order to fill logical groups 1261 and 1263. Logical groups 1261, 1262 and 1263 are formed from new data 1260 and original data 1214, 1215. Adaptive logical block 1270 is formed from logical groups 1261-1263. Adaptive logical block 1270 is programmed to adaptive metablock 1271 in the memory array. There is much less copying of original data than in the first update. Only original data 1214 and 1215 is copied, the data in the adaptive logical blocks 1256 and 1257 is not copied in the second update. Thus, by creating adaptive logical blocks having boundaries that more closely match the logical boundaries of updated data, subsequent updates may be made more efficient.

FIG. 12B shows adaptive logical blocks being remapped. Here, a stream of data includes two files 1280 and 1282. File 1280 is separated from file 1282 by a file boundary 1281. Generally, when new data is written to a memory system it is received as a stream of sectors of data. There may be file boundaries in such a stream. In some architectures, such boundaries may be identified when the data is received and adaptive logical blocks may be configured accordingly. In other architectures, the positions of the file boundaries may be shown by a range of data that is updated by the host. FIG. 12B shows file boundary 1281 positioned within the logical address range of logical group 1286. During an initial programming operation data is formed into adaptive logical blocks 1290-1293. Logical blocks 1290-1293 each comprise eight logical groups, the maximum size for the memory array used. File boundary 1281 is positioned within adaptive logical block 1292. Updating file 1280 requires updating metablocks 1290, 1291 and 1292, even though there are less than two logical groups of file 1280 stored in adaptive metablock 1292. The logical groups of adaptive logical block 1292 are remapped to new adaptive logical blocks 1294 and 1295. Logical block 1294 consists of only logical groups 1285 and 1286. Thus, the logical groups that contain part of file 1280 form adaptive logical block 1294, while the logical groups that do not contain part of file 1280 form adaptive logical block 1295. Updating file 1280 does not require updating adaptive logical block 1295. Thus, where a file boundary is known to exist, adaptive logical blocks may be formed having boundaries that are adjusted to fit file boundaries.

FIG. 12C shows an alternative remapping of data from data streams 1280, 1282. Here, file boundary 1281 occurs in logical group 1286. Logical group 1286 is initially incorporated into logical block 1296. Updating file 1280 requires updating logical block 1296 even though more than half the data in logical block 1296 is not from file 1280. During updating, a second set of adaptive logical blocks is formed. Adaptive logical block 1296 is replaced by new adaptive logical blocks 1297, 1298, 1299. Adaptive logical block 1298 contains just one logical group of data. Updating either data stream 1280 or data stream 1282 requires updating adaptive logical block 1298 because boundary 1281 occurs within adaptive logical block 1298. Thus, some copying of old data is always performed because file boundary 1281 is not aligned with a boundary between logical groups. However, because adaptive metablock 1298 contains only one logical group, there is only a small amount of data to be copied compared with the situation where a larger metablock such as metablock 1296 is used. Thus, by reducing the size of an adaptive logical block that contains a file boundary, copying of data during updates may be reduced.

FIG. 13 shows a partially filled adaptive metablock 1321 being rewritten to a smaller adaptive metablock 1340 with less empty space. A stream of data may be received and programmed using maximum parallelism. For example, in an array having four planes, adaptive logical blocks comprising four logical groups may be formed and the data stored in metablocks or adaptive metablocks having four erase blocks. However, at the end of such a stream of data, an adaptive metablock may be only partially filled. Such an adaptive metablock occupies more of the memory array than is necessary for the data stored. FIG. 13 shows a stream of sectors of data 1305 being received. The data is mapped to logical groups including logical groups 1310-1315. Logical groups 1310-1317 are formed into adaptive logical blocks 1320, 1321 having four logical groups each. The end of the stream of sectors of data 1305 occurs at a logical address that is in the logical address range of logical group 1315. Adaptive logical block 1321 is formed from logical blocks 1314-1317. Logical groups 13.14 and 1315 contain data from stream of sectors of data 1305. Logical groups 1316 and 1317 do not contain data. Thus, adaptive logical block 1321 contains empty logical groups 1316 and 1317 and partially filled logical group 1315. Adaptive logical block 1321 is programmed to adaptive metablock 1331. Adaptive metablock 1331 comprises four erase blocks of the memory array. Portions of adaptive metablock 1331 are not used because of the empty logical groups 1316 and 1317 and partially filled logical group 1315. This wastes space in the memory array. FIG. 13 shows adaptive logical block 1340 formed from logical groups 1314 and 1315. Adaptive logical block 1340 is programmed to adaptive metablock 1341 in the memory array. Thus, adaptive metablock 1341 contains the same data as in 1331 but occupies only half the space in the memory array (two erase blocks instead of four). Adaptive logical block 1340 and adaptive metablock 1341 may be formed by copying data from adaptive metablock 1331 in the memory array. When data in adaptive metablock 1331 is copied to adaptive metablock 1341, adaptive metablock 1331 may be marked as obsolete. Adaptive metablock 1331 may then be erased.

Copying of data from a partially full metablock to a smaller metablock may be triggered by an elapse of time from the receipt of the stream of sectors of data 1305. Copying may also be done as part of a garbage collection routine. A smaller adaptive metablock such as 1340 may be formed directly from received data if the end of the stream of sectors of data 1305 is detected while the stream of sectors of data 1305 is in a buffer. In this case, data is not first written to a larger adaptive metablock and then copied to a smaller metablock. Thus, there is no obsolete adaptive metablock to erase. In some architectures, a host may send a signal indicating where the end of the stream of data occurs. An adaptive logical block may then be formed to contain only logical groups that contain sectors from the stream of data.

In certain memory architectures, erase blocks or metablocks may be assigned for storing updated data. Examples of such erase blocks and metablocks are described in the patent application Ser. No. 10/749,831, entitled "Management of non-volatile memory systems having large erase blocks" by Conley et al, filed on Dec. 30, 2003 and hereby incorporated by reference in its entirety. Certain metablocks, designated as E1 and E2 may be used to store updated data for a plane of a memory array. Other erase blocks or metablocks, designated as dE1 may be assigned to receive updated data for a particular erase block or metablock. An adaptive metablock may be designated as E1, E2, or dE1. Such an adaptive metablock may be tailored to a logical address range that is updated frequently. By forming an adaptive metablock that has a size that is selected to fit the updated data, copying of original data may be reduced. E1 and dE1 receive update data and store them in a non-sequential manner. Update blocks (or metablocks, or adaptive metablocks) that store update data non-sequentially are considered chaotic blocks.

FIG. 14 shows the use of an adaptive metablock as a chaotic block having a size that is adapted to the logical address range of updated data. Data is stored in original adaptive metablocks including original adaptive metablock 1410. Typically, such original adaptive metablocks are of maximum size. An adaptive metablock 1420 is assigned to receive updated data corresponding to data in original adaptive metablock 1410. Adaptive logical blocks 1411 and 1421 correspond to original adaptive metablock 1410 and adaptive metablock 1420 respectively. Adaptive logical block 1421 has the same logical address range as adaptive logical block 1411. First update data 1415 have a logical address range within the logical address range of adaptive logical block 1411. Only a portion of the logical address range of original adaptive logical block 1411 is updated in the first update. First update data 1415 is non-sequential (chaotic). Thus, adaptive metablock 1420 becomes a chaotic block. Update data 1415 may comprise several streams of sectors within the logical address range shown. The same sectors may be updated several times. Eventually, metablock 1420 becomes full and must be consolidated.

During the first consolidation, only the most recent copy of each sector is copied to new adaptive metablocks 1422-1424. For updated data, the most recent copy comes from adaptive metablock 1420, for data that is not updated the most recent copy comes from adaptive metablock 1410. Consolidation combines data from adaptive metablock 1410 and adaptive metablock 1420 in logical sequence. The logical address range assigned to adaptive metablock 1423 includes the logical address range of first update data 1415. Adaptive metablocks 1422, 1424 contain only data that was not updated.

Second update data 1425 are received after the first consolidation. Second update data 1425 are within the same logical address range as first update data 1415. Second update data 1425 are assigned to a new adaptive logical block 1431 that is stored in adaptive metablock 1430. Adaptive logical block 1431 has the same logical address range as data stored in adaptive metablock 1423. Adaptive metablock 1430 may be updated chaotically and so become a chaotic block. When adaptive metablock 1430 is filled, the data in adaptive metablock 1430 and adaptive metablock 1423 are consolidated to adaptive metablock 1440. Adaptive metablock 1440 then replaces adaptive metablock 1423 and adaptive metablock 1423 may be marked as obsolete. Adaptive metablocks 1422 and 1424 remain unchanged. A smaller logical address range is consolidated in the second consolidation than in the first so that there is less copying of unchanged data. Also, less space is required in the memory array because the adaptive metablock used for updates is smaller after the first consolidation. Further updates may be made within the same logical address range and may be consolidated as in the second consolidation.

Media Management

FIG. 15A shows how logical groups 1510, 1511, and 1512 of an adaptive logical block 1520 are mapped to the erase blocks 1531, 1532, and 1533 of an adaptive metablock 1540. Although the number of logical groups in an adaptive logical block 1520 is equal to the number of erase blocks in adaptive metablock 1540, an individual logical group is not directly mapped to an individual erase block in this example. Instead, data is stored so that a portion of each logical group 1510-1512 is stored in each erase block 1531-1533 of adaptive metablock 1541.

FIG. 15B shows the mapping of adaptive logical block 1520 to the memory array in more detail. FIG. 15B1 shows how sectors from logical group 1510 are programmed in the memory array. Logical group 1510 contains n sectors of data. Planes 0-4 of the memory array are each four sectors wide. In certain memory architectures, the four sectors extending across a plane of an array are programmed in parallel. Thus, four sectors form a page, which is the minimum unit of programming of the array. Sectors typically arrive sequentially and may be stored in registers prior to writing to the array. Sectors in all erase blocks of the adaptive metablock may be programmed in parallel. Thus, for example, sectors 0- 11 may be programmed in parallel. Then, sectors 12-23 may be programmed in parallel. This continues until all the sectors in logical group 1510 have been programmed. Then, logical group 1511, 1512 are programmed in turn.

FIG. 15C shows an adaptive metablock formed by three erase blocks in a memory array. The arrangement of sectors within the memory is similar to that shown in FIG. 15B with the number n equal to 32. However, because 32 is not evenly divisible by 3, the sectors in a logical group are not evenly distributed between the erase blocks 1551-1553. The first logical group consists of sectors 0-31. These sectors are distributed with twelve sectors in erase block 1551, twelve sectors in erase block 1552 and eight sectors in erase block 1553. The first sector 0' of the second logical group is programmed in erase block 1553. Thus, logical groups may be programmed differently and may start in different erase blocks. Sectors from different logical groups may be programmed in parallel. For example, sectors 24-31 from the first logical group and sectors 0'-3' from a second logical group may be programmed in parallel.

FIG. 15D shows two metablocks being programmed in parallel. Erase blocks 1561 and 1562 form adaptive metablock 1565 and erase blocks 1563 and 1564 form adaptive metablock 1566. Adaptive metablocks 1565 and 1566 are each comprised of two erase blocks and therefore each adaptive metablock 1565, 1566 contains two logical groups of data. Adaptive metablock 1565 contains logical groups 1571 and 1572. Adaptive metablock 1566 contains logical groups 1573 and 1574. The programming of sectors of logical groups 1571 and 1573 is illustrated. Logical groups 1571 and 1573 are programmed in parallel. Thus, during a first write to the memory array, sectors 1-8 from logical group 1571 may be simultaneously programmed with sectors 1'-8' from logical group 1573. Subsequently, sectors 9-16 are simultaneously programmed with sectors 9'-16'. This continues until all the sectors in logical groups 1571 and 1573 are programmed. Then, logical groups 1572 and 1574 are similarly programmed.

FIG. 15E shows three adaptive metablocks programmed in parallel. Metablock 1590 comprises four erase blocks, metablock 1591 comprises one erase block and metablock 1592 comprises three erase blocks. Metablocks 1590-1592 are programmed in parallel. Because metablocks 1590-1592 comprise different numbers of erase blocks, the data are differently aligned in each of metablocks 1590-1592. FIG. 15E shows the alignment of pages within metablocks 1590-1592. A page may be a single sector, four sectors or some other number of sectors programmed as a unit of programming. Pages of data in different erase blocks that are on the same horizontal level in FIG. 15E are programmed in parallel. For example, pages 12-15 of metablock 1590, page 3 of metablock 1591 and pages 9-11 of metablock 1592 are programmed in parallel.

FIG. 15F shows an example of updating data where the first sector of updated data is not the first sector in a logical group. The first sector in updated data 1582 has logical address 13. Logical group 1580 is comprised of sectors having logical addresses 1-16. Updated data 1582 includes sectors from at least two logical groups and an adaptive metablock size of two erase blocks is selected to store the first two logical groups containing updated data 1582. Erase blocks 1585 and 1586 are selected to store the first two logical groups containing updated data 1582. The first sector of updated data 1582, having a logical address 13, is written to the first location in erase block 1585. The sector having a logical address 14 is written to the second location and so on until the last sector in the logical group, the sector with a logical address 16, is written. The data from logical group 1580 that is not updated is then copied into the memory array. Thus, there is an offset between the first sector in a logical group and the first sector stored in an adaptive metablock. The first sector of the next logical group may be written in the normal way so that within an adaptive metablock different logical groups may be written with different offsets. Thus, the sector with logical address 1' is the first sector written when updating logical group 1581.

FIG. 16 shows a table that is used to record the location of data within the memory array according to logical group where an adaptive logical block 1610 is stored in an adaptive metablock 1620. Column 1 indicates the identity of each individual logical group. This is a logical address that uniquely specifies a logical group. Logical groups are generally listed sequentially. Column 2 indicates the size of the adaptive metablock in which the logical group is stored. The size is simply the number of erase blocks in the adaptive metablock. Here, the metablock consists of three erase blocks so the size is three for all logical blocks. Column 3 gives the group number N of the logical group within the adaptive logical block. Logical groups are numbered sequentially according to logical address range. Thus, logical group L1 has N=1, L2 has N=2 and L3 has N=3. Column 4 gives the location of the Nth erase block in the adaptive metablock. This may be the physical block number (PBN) of the erase block. Because the number of logical groups in an adaptive logical block is equal to the number of erase blocks in an adaptive metablock, a complete record of the location of the erase blocks of an adaptive metablock may be formed by recording one erase block location for each logical group.

A table of the location of particular logical groups may be kept in volatile or non-volatile memory as part of media management of the memory system. A media management system may have various tables recording the location of available erase blocks and logical to physical mapping of data. A media manager manages the tables of the media management system. Typically, a media manager is implemented in firmware in a controller.

FIG. 17 shows an example of a media manager. The operation of media managers similar to that shown in FIG. 17 is described in U.S. patent application Ser. No. 10/750, 155, entitled "Non-volatile memory and method with block management system" by Bennett et al, filed on Dec. 30, 2003, which application is hereby incorporated by reference in its entirety. The media manager includes an adaptive metablock manager, a block allocation manager and an address table manager. These three managers and their associated tables are of particular relevance to the management of adaptive metablocks and will be described further.

An adaptive metablock manager determines the number of logical groups to assemble to form an adaptive logical block and thus the number of erase blocks in an adaptive metablock. Where data is received from a host this determination may be based on several factors. Command sequences from the host may be evaluated and adaptive metablock size may be determined based on the current command or on historical evaluation of host commands. Characteristics of the current command that may be evaluated include logical address, command sector count, alignment with file system cluster (such as DOS cluster), logical relationship to previous command and address relative to file system sectors. The address relative to that of a range being managed by a non-sequential type of update block can also be considered. Characteristics of historical operation can include host command sequences for streams of sequential data, host command structures for complete files, records of frequently updated logical address ranges and final addresses of recently written sequential data. The adaptive metablock manager may establish a dialogue with the host, under an appropriate host interface protocol, to gain access to information, which would allow an appropriate metablock size to be determined.

Where data is relocated, adaptive metablock size may be based on the number of logical groups that contain relocated data. Where control data is stored in adaptive metablocks the adaptive metablock size may be fixed according to the type of data to be stored. Adaptive metablock size may be determined based on balancing increased parallelism obtained with large adaptive metablocks with reduced garbage collection obtained with smaller adaptive metablocks. Once the number of erase blocks required is determined by the adaptive metablock manager, a request for that number of erase blocks is sent to the block allocation manager.

A block allocation manager selects erase blocks from separate planes of the memory array. The planes may be selected based on the number of available erase blocks in the plane. Where adaptive metablocks of various sizes are used, planes may be filled to different levels. Thus, some planes could become full while others still have available erase blocks. Should this happen, a plane of the array would be unavailable and parallelism would be limited accordingly. To prevent or defer this happening, a block allocation manager gives a low priority to planes containing a small number of available erase blocks and a high priority to planes containing a large number of available erase blocks when assigning erase blocks to form an adaptive metablock. Planes that are still busy from a previous operation may be given a low priority also. Planes having data for relocation may be given a high priority where data may be relocated within a plane in a more efficient manner than relocating from one plane to another. The block allocation manager selects available erase blocks from an allocation block list (ABL).

FIG. 18A shows the erased block management hierarchy used with adaptive metablocks. Upon receipt of a request from the adaptive metablock manager to allocate a metablock of a specific size, the block allocation manager selects erase blocks from separate planes and updates relevant control structures to link the blocks into a metablock. Planes from which erased blocks are used are selected by an algorithm according to predetermined criteria. Planes containing fewer erased blocks are given low priority. Planes that are still busy from a previous operation are given a low priority. Planes may be given a high priority where their selection would allow data to be copied within the plane instead of copying from another plane. In some architectures, such in-plane copying may be more efficient.

Erased blocks are managed separately for each plane of the array. When a plane is selected, any erase block from that plane may be chosen to form part of an adaptive metablock. Typically, erase blocks are chosen from the top of a list, while newly available erase blocks are added to the bottom of the list. Erase blocks are managed by a hierarchy of lists as shown in FIG. 18A. An individual erase block may only appear in one list at a time. Bad blocks do not appear in any list and are thus not used for data storage. By moving erased block addresses between lists, write/cycle counts may be distributed throughout the memory array. This provides wear leveling that reduces the risk of failure of individual erase blocks.

The Allocation Block List (ABL) 1810 is a short list of erased block addresses from which erased blocks are selected to form metablocks. Thus, ABL 1810 is at the top of the hierarchy of lists. Within ABL 1810, separate fields are maintained for each plane of the memory array. Typically, ABL 1810 is maintained in a non-volatile memory such as controller RAM. However, a copy is maintained in the non-volatile memory also.

A copy of ABL 1810 is written to a Log 1813 every time an adaptive metablock is formed and the erased blocks used to form it are removed from ABL 1810. Thus, the copy of ABL 1810 in Log 1813 is regularly updated. When an erased block becomes available through an erase operation, it is added to ABL 1810 in the field corresponding to the plane containing the erase block. ABL 1810 may be restored after a loss of power by copying from Log 1813. However, the Log copy may not be up-to-date because of the addition of erased blocks to ABL 1810 since the previous copying to Log 1813. Such erased blocks are easily identified from other data structures. Specifically, Log 1813 contains records of allocated metablocks. Allocated metablocks are metablocks, or adaptive metablocks, in which data are currently being updated by the host. Thus, when power is first applied, the first sector of each erase block of the original metablock may be scanned to determine if the erase blocks of the original metablock have been erased. If an erase block has been erased, its address is added to the ABL. Address data is maintained in Log 1813 as a starting logical group address concatenated with the format shown in FIG. 16 with entries for metablock size, group number and block address. Thus, a complete copy of ABL 1810 may be easily rebuilt after a loss of power. The Log may also contain a list of erase blocks with fully obsolete data that are available for erasure.

ABL 1810 may be initialized by moving a predefined number of block addresses from an Erased Block List (EBL) 1811. Each field of the ABL may be initialized by moving addresses from the corresponding EBL field. For example, ABL fields may be filled to half their capacity. When a block is required for allocation to a metablock, the first block in the relevant ABL field is used and its address is removed from the ABL. When a block is erased during garbage collection, it is added to the end of the relevant ABL field.

ABL 1810 may also be refilled with erased block addresses from EBL 1811. This may be necessary where ABL 1810 is empty. Erased block addresses may be exchanged between ABL 1810 and EBL 1811 when a field of ABL 1810 is full or empty. Exchange may be done for just one field (or plane of the array) or for all fields. The exchange may include topping up ABL 1810 or may include a full exchange of all the entries in ABL 1810. An exchange may be triggered by a field becoming full or empty or may be triggered by another event or done on a periodic basis.

EBL 1811 is generally maintained in a sector that is held in non-volatile memory. It contains a list of erased blocks with separate fields for each plane of the array. It is in the same format as ABL 1810 and thus, entries may easily be exchanged between EBL 1811 and ABL 1810. Because EBL 1811 is maintained as a single sector in non-volatile memory, it may be rapidly accessed and updated thus facilitating exchange between EBL 1811 and ABL 1810. The exchange of addresses between EBL and ABL may occur when the ABL is full or empty. Alternatively, the exchange may occur more frequently to avoid heavy usage of particular locations in the memory array. The addresses in EBL 1811 may be exchanged with ABL 1810 and also with Plane Block Lists.

An EBL sector may be maintained in an EBL block containing only EBL sectors. FIG. 18B shows EBL block 1801 having multiple EBL sectors. When EBL data is changed, a new EBL sector is written and the old EBL sector becomes obsolete. Thus, obsolete sectors 1803 contain prior copies of the EBL that are no longer valid. Only the last written EBL sector 1802 is valid. An EBL sector may also contain a count of erase blocks listed in each EBL field. These counts are used as one factor in selecting planes when forming adaptive metablocks. A copy of these counts may be maintained in Log 1813 also.

A Plane Block List (PBL) such as PBL 1812 is maintained in non-volatile memory for each plane of the array. PBL 1812 is a list of erase blocks in a particular plane of the memory array. Erase blocks that are listed in either ABL 1810 or EBL 1811 are not listed in PBL 1812. PBL 1812 may occupy one sector, though the sector need not be full. Typically, PBLs are grouped together in a PBL block or PBL blocks. A PBL block is a dedicated block containing only PBL sectors. When information in a PBL sector is changed an updated version is written to the next position in the PBL block. The old sector is marked as obsolete. Only one valid PBL sector exists in a particular PBL block for a particular plane. However, two or more valid PBL sectors may exist for a particular plane if the PBL sectors are in different PBL blocks. A PBL sector has two fields, a set of entries that define the locations of erase blocks and a sector index that lists the positions of all valid PBL sectors within the PBL block. The entries defining locations of erase blocks are not necessarily in any particular order. The order of entries may be the result of exchange with the corresponding EBL field. Only the index of the last written PBL sector is valid. In a partially written memory, there are a lot of erased blocks and thus a lot of PBL sectors requiring a lot of PBL blocks. However, as the memory is filled, the number of erased blocks diminishes and the number of PBL blocks needed diminishes. In a logically full memory system, there may be no PBL blocks. The exchange of addresses between PBL 1812 and EBL is similar to that between EBL and ABL. The exchange may be unidirectional or bi-directional. Where multiple PBL blocks are used, one PBL block may be the active block used for exchanges. The active PBL block may be periodically changed. A field in EBL 1811 may be updated from a single PBL sector as a background operation.

FIG. 18C shows an address table management hierarchy for address translation information in a memory system using adaptive metablocks. When data sectors are written to the memory array according to a data update algorithm, the Address Table Manager updates relevant control data structures in the address table management hierarchy to create a non-volatile record of logical-to-physical mapping and to allow fast translation of any sector in the memory array. Fast translation may be achieved by allowing the physical location of any sector to be determined by reading a single sector from non-volatile memory. Where the physical location is not yet updated in non-volatile memory, it may be rapidly determined from volatile RAM. Because the size and configuration of adaptive metablocks is variable, it would be hard to recover the locations of such erasable blocks in a metablock if they are not stored in non-volatile memory. Thus, the locations of erase blocks of a metablock are stored in non-volatile memory.

At the top of the hierarchy of FIG. 18C is a Write Sector List (WSL) 1814. WSL 1814 is generally kept in volatile memory such as controller RAM. WSL 1814 identifies sectors associated with a sequential write stream by a host or relocated from another location in non-volatile memory. A separate WSL exists for each host write stream. A WSL is opened when a metablock is allocated for a new write stream from a host. A WSL may have an abbreviated form such as a starting location and the number of sectors written.

Log 1813 is below WSL 1814. Log 1813 stores a cumulative list of adaptive metablocks allocated for storage of sectors listed in WSL 1814. Log 1813 also contains copies of all WSLs at the time it is updated. Log 1813 is updated whenever a metablock is allocated. Log 1813 may be contained in a Log sector within a Log block. When information in Log 1813 is changed, a new Log sector is written in the next available position in the Log block. The previous Log sector becomes obsolete and only the last written Log sector is valid. Below Log 1813 are the Temporary Group Address Table (TGAT) 1815 and Group Address Table (GAT) 1816. GAT 1816 is an address table stored in sectors in non-volatile memory containing a physical address for every logical group arranged sequentially in logical group address order. Thus, the nth entry in GAT relates to the logical group with logical group address n. The address data stored in GAT 1816 is in the format shown in FIG. 16 with entries for metablock size, group number and block address.

GAT sectors may be stored in a dedicated GAT block that has entries for a logically contiguous set of logical groups. A GAT block is divided into two partitions a GAT partition and a TGAT partition. The GAT partition contains an original entry for each logical group in the logical address range of the GAT block. The TGAT partition contains sectors having the same format as GAT sectors. TGAT sectors are used to update address data before updating the GAT. Periodically, the GAT partition in a block is rewritten to incorporate updates recorded in sectors in the TGAT partition. A TGAT sector temporarily replaces a corresponding sector in the GAT to update address information. TGAT sectors contain an index of valid TGAT sectors. This index is only valid in the last written TGAT sector. No such index is needed for GAT. A TGAT sector updates a GAT sector with address information from the Log associated with a WSL. The WSL and Log entries are then deleted.

The physical sector address of a sector of data having a particular logical address may be determined from lists 1814-1816. The WSLs are first read to determine if the sector has been recently written. If so, the physical sector address is found from the metablock address corresponding to the sector's position in the WSL. If the sector is not found in the WSLs, an index in a TGAT sector is read to determine if the sector has a TGAT entry. If so, the physical sector address is determined by reading the appropriate TGAT sector. If the sector is not listed in either WSLs or TGAT then the appropriate GAT sector is read to determine its physical location. Look-ahead caching of Log, TGAT and GAT entries in controller SRAM can be performed to reduce address translation time when data is written or read in sequential address order.

FIG. 18D shows the data structures used to manage erased blocks and address translation. In addition to the lists already described, Block Addresses 1821 and Boot Block 1820 are shown. Block addresses 1821 form a listing of the physical addresses of all erase blocks that store control data structures. A dedicated Block Address (BA) block may be used to store BA sectors that contain block addresses 1821. When the location of a control block is changed, a new BA sector is written. Prior BA sectors are marked as obsolete. Therefore, only the last written BA sector is valid.

Boot block 1820 is a dedicated block containing boot sectors. When information in the boot sector is changed, a new boot sector is written. Only the last written boot sector is valid. Boot block 1820 has a fixed physical location and is identified by scanning during system initialization. Scanning may be necessary because the location of the boot block is fixed within a range rather than at a precise location. This is to allow for the possibility of bad erase blocks. The location of the boot block may be fixed within a narrow range so the scanning may be rapidly completed. The boot sector contains the location of block addresses 1821 and any other system configuration information that: may be required. Thus, upon initialization, the data structures in FIG. 18D may be rapidly rebuilt. Boot block 1820 has a fixed location and indicates the location of block addresses 1821, which indicate the locations of the data structures shown.

Certain data structures described above use dedicated blocks such as the EBL block, PBL block and GAT block. Such dedicated blocks may be a single erase block of the memory array or may be an adaptive metablock comprising multiple erase blocks. One advantage of using an adaptive metablock is that the size of the adaptive metablock used may be adjusted to the amount of data to be held. For example, where a memory has a large number of erased blocks, there may be a lot of PBL sectors and so a large PBL block might be suitable. When the memory array fills with data, the number of erased blocks is less, thus the number of PBL sectors is less and a smaller PBL block might be suitable.

Where adaptive metablocks of less than the maximum size are used for control data, the control data may be programmed in parallel with other data. Where data is sent. from a host to be programmed to a memory array, such parallel programming may allow control data to be updated simultaneously with the programming of host data. Thus, there is no interruption to the programming of host data while the control data is updated, though there may be a reduction in programming speed because of reduced parallelism available for the host data programming. Thus, the examples of parallel programming shown in FIGS. 15D, 15E and 15F could apply to programming a combination of control data, copied data and host data in parallel. This may avoid latency observed in other memory systems where host data programming is delayed until control data has been programmed.

Non-Volatile RAM

Certain non-volatile memory structures allow data to be accessed in a random fashion. This is in contrast to flash memory, where data are written in minimum units of a page and are erased in minimum units of an erase block. Examples of non-volatile random access memory (NVRAM) include Magnetoresistive RAM (MRAM), Ferroelectric RAM (FeRAM) and phase change memory (also known as Ovonics Unified Memory or OUM). NVRAM may be used as part of a memory system that also uses flash memory. NVRAM may be located on a separate chip or it may be incorporated on a controller chip or a flash memory chip. NVRAM may be part of a flash memory card or an embedded flash memory system. NVRAM may be used for many of the same applications as volatile RAM, with the advantage that the data stored in NVRAM is not lost if power is lost. For example, media management tables may be kept in NVRAM.

FIG. 19 shows an NVRAM 1901 located on the memory system 1900. Memory system 1900 may be implemented in a removable memory card. NVRAM 1901 may be used as a buffer for data that is being received from a host 1905. By buffering the data prior to programming it to a flash memory array 1910, the adaptive metablocks of memory array 1910 may be configured to better fit the received data. In prior examples shown in FIGS. 12A, 12B and 12C, data stored in metablocks of a memory array were later copied to metablocks that were better configured for that data. By using an NVRAM buffer, such copying from one portion of flash memory to another may be avoided or minimized.

FIG. 20 shows an example of how adaptive logical blocks may be configured to reflect the boundaries of streams of data that are initially stored in NVRAM. Data streams 2001 and 2002 are stored in NVRAM, having,been received from a host. Data streams 2001 and 2002 are logically discontinuous. Thus, there is a gap in the logical address range between data stream 2001 and data stream 2002 indicating that they are separate streams and may be treated differently. Different streams may also be distinguished by a time delay between streams or some communication from the host indicating that a break between streams is present.

Data stream 2001 has a logical address range extending over five logical groups 2010-2014. Data stream 2002 has a logical address range that extends over seven logical groups 2017-2023. Adaptive logical blocks 2030 and 2031 are formed from logical groups 2010-2014. Adaptive logical blocks 2032 and 2033 are formed from logical groups 2017-2023. Adaptive logical blocks 2030-2033 are configured to allow maximum parallelism during the programming of the data streams 2001, 2002 to a flash memory array 2040. Flash memory array 2040 has four planes so adaptive logical blocks have a maximum size of four logical groups. Adaptive logical blocks 2030 and 2033 each consist of four logical groups and may be individually programmed with maximum parallelism. Adaptive logical blocks 2031, 2032 may be programmed together, in parallel, with maximum parallelism. If data stream 2001 corresponds to a particular host file and data stream 2002 corresponds to a different host file, it may be advantageous to keep the two files in different adaptive metablocks so that they may be separately updated with a minimal amount of copying of data. Therefore, the boundaries of the logical blocks used to contain a data stream are matched as closely as possible to the boundaries of the data stream. Data streams 2001 and 2002 may be separated in logical address space by other data streams. By maintaining several data streams in NVRAM, the characteristics of several data streams may be compared to determine the optimal way to program the data in the data streams to flash memory array 2040. The example of FIG. 20 may be implemented on the hardware shown in FIG. 19 where data streams 2001, 2002 are stored in NVRAM 1901 and memory array 2040 corresponds to flash memory cell array 1910.

FIG. 21 shows another application of NVRAM. A memory system may integrate NVRAM and flash memories so that data may be stored in either type of memory depending on the nature of the data. For example, data that is frequently updated may be stored in NVRAM. NVRAM may be configured to be used like flash memory. Where flash memory has a particular erase block size, the NVRAM may be configured to operate with units of data of the same size.

FIG. 21 shows updated data 2140 being stored in NVRAM. Adaptive logical blocks 2130-2132 are formed from logical groups 2110-2121 containing original data from a stream of original data 2105. Adaptive logical blocks 2130-2132 are programmed to a memory array (not shown). Updated data 2140 is received from a host. As described earlier, updated data may be stored in a new adaptive logical block during an update, so that one or more adaptive logical blocks contain the updated data and other adaptive logical blocks contain only original data. Logical groups 2125, 2126 are formed from updated data 2140 and some original data from original logical groups 2115, 2116. Adaptive logical block 2135 is formed from logical groups 2125, 2126. Adaptive logical blocks 2136, 2137 are formed from the remaining logical groups in adaptive logical block 2131. Thus, adaptive logical block 2131 is replaced by adaptive logical blocks 2136 and 2137 that contain only original data and by adaptive logical block 2135 that contains updated data.

Adaptive logical block 2135 is stored in NVRAM, not in the flash memory array. This allows adaptive logical block 2135 to be efficiently updated. Generally it is possible to write to NVRAM at higher speed than is possible with flash memory. Data may be written in non-sequential order and without garbage collection. The media manager may treat the NVRAM in a similar manner to the flash memory. The NVRAM is divided into addressable units that have the same size as an erase block of the flash memory. Addressable units may be programmed in parallel. Tables that record the location of logical groups 2125, 2126 simply record the addresses of the addressable units in the NVRAM. If there are subsequent updates of data having the same logical range as the updated data, these updates may be made rapidly, without copying data from one portion of flash memory to another. Adaptive logical block 2135 may be relocated from NVRAM to flash memory. For example, when insufficient capacity is available in NVRAM for use for another purpose, data from adaptive logical block 2135 may be moved from NVRAM to flash memory to create available NVRAM capacity.

Adaptive logical blocks 2136 and 2137 have only one logical group each. These logical groups may be reconfigured so that new adaptive logical blocks 2138, 2139 are formed. Adaptive logical blocks 2138, 2139 are larger than adaptive logical blocks 2136, 2137 and may allow more efficient data handling.

Data Boundaries

Data boundaries may exist in data that are received by a memory system. Examples of data boundaries (logical boundaries) include data run boundaries and file boundaries. Typically, a host file is stored as one or more data runs. A data run is a set of logically contiguous sectors allocated by a host for file storage. Data runs are assigned to portions of logical address space that do not already contain valid data. FIG. 22 shows two files, File A and File B. File A includes data run 1, data run 3 and data run 5. File B includes data run 2 and data run 4.

A file boundary is created where a host begins writing a file at an address immediately following the end of another file. Thus, a file boundary may lie within a data run. FIG. 23 shows a file boundary between File C and File D written within a single data run.

Typically, when data is received by a memory array that uses adaptive metablocks, the structure of the adaptive metablocks for storage of the data does not take account of the locations of data boundaries. This may be because the locations of data boundaries are not known or because of time constraints that force data to be written rapidly in large adaptive metablocks. When data stored in such a memory array is updated, some data must be copied from the original metablocks to new metablocks. Copying of such data reduces the capacity of the memory system to write new data. Typically, only one logical file is updated in a given operation. Where an adaptive metablock contains portions of more than one file, the additional file portions must be copied to the new adaptive metablock. Copying of such portions may occur during garbage collection and may use up significant resources. Thus, adaptive metablocks that contain data boundaries may cause an unwanted overhead when they are updated.

High performance may be achieved by maximizing parallelism during programming while minimizing copying of data within the memory array. These two goals may be achieved by programming adaptive metablocks in parallel to achieve a high degree of parallelism, and by forming adaptive logical blocks (metagroups) of minimum size to contain data boundaries. Adaptive metablocks may be formed into a "program block" that is programmed as a unit. A program block is a unit of maximum parallel programming. Thus, a program block is made up of adaptive metablocks that collectively extend across all planes of the memory array. FIG. 24 shows a hierarchy of data units used in such a memory system.

Examples of forming minimum sized metagroups to contain data boundaries are shown in FIGS. 25 and 26. FIG. 25 shows two data run boundaries each being stored in a metagroup that is the minimum sized metagroup. Host sector data run 2510 extends from logical address A to logical address A+4n+X. Thus, a data boundary 2520 exists at logical address A+4n+X. Logical address A+4n+X is within logical group 2530. Metagroup B is formed to contain the data boundary 2520. Metagroup B is a minimum sized metagroup that contains only a single logical group. The remainder of host sector data run 2510 is contained in metagroup A. Metagroup A is not a minimum sized metagroup but contains four logical groups. FIG. 25 also shows host sector data run 2511 extending from logical address B+Y. Thus, a data boundary is formed at logical address B+Y. Logical address B+Y is within logical group 2531. Metagroup C is formed to contain data boundary 2521. Metagroup C is a minimum sized metagroup that contains only a single logical group. The remainder of host sector data run 2511 is contained in metagroup D. Metagroup D has two logical groups and is not a minimum sized metagroup. When host sector data runs 2510 and 2511 are later updated, this may be done with little copying of additional data that is not in the updated data run because only metagroups B and C contain additional data and these each contain less than one logical group of additional data.

FIG. 26 shows a file boundary 2615 between file 2610 and file 2611 being mapped to an adaptive metagroup of minimum size. File boundary 2615 is shown at logical address A+4n+X. File boundary 2615 is within host sector data run 2605. The logical address A+4n+X occurs within logical group 2630. Metagroup B is formed from logical group 2630. Metagroup A is formed from the remainder of file 2610. Metagroup C is formed from the remainder of file 2611. File 2610 may be updated by updating metagroups A and B. Thus, only a portion 2641 of file 2611 contained in metagroup B would be copied during an update of file A. Similarly, file B may be updated by updating metagroups B and C. This involves copying only a portion 2640 of file 2610 that is stored in metagroup B.

Data boundary information may be determined by a memory system from the data supplied to the memory system or data boundary information may be supplied directly to a memory system. For example, a host may supply data boundary information regarding data that the host supplies to the memory system. Data boundary information may include the locations of data run boundaries or file boundaries within data being supplied by the host. Such data boundary information is typically provided ahead of the data containing the boundary. Where the maximum size of a metagroup is L logical groups, it is desirable to provide data boundary information at least L logical groups ahead of the data being provided.

The host may also provide notification of the end of a sequence of data runs to signify that no further data is available for immediate writing. This notification allows the memory system to schedule background operations. Notification of a power-down operation may also be provided by the host. Such a notification may be part of a handshake operation. The power-down operation may not occur until the memory system responds to the host indicating that it is in a condition suitable for a power-down. A dialogue between a host and a memory system may take place after power-on so that the memory system can inform the host of its capabilities and vice versa. Such capabilities may include the capability to accept and use data boundary information as described above.

In addition to receiving data boundary information from the host, data boundaries may also be determined by a memory system from other sources. This may include deriving data boundary locations from a range of data that is updated. The start of a data run may be identified directly from the data address provided by the host. The end of a data run may be assumed from an address transition to another data run. A file boundary may be assumed from a pattern of directory and FAT accesses by the host. Metagroup mappings for original data may also be used to deduce data and file boundaries.

Data Boundary Management Operations

In scheme A, storing data in a configuration that is responsive to data boundary locations may be done by first storing such data in a temporary location, then mapping the data to metagroups for storage in flash memory. A temporary location may be provided by an accumulator RAM. Alternatively, a temporary location may be provided by a portion of a flash memory array. FIG. 27 shows these two alternatives for configuring data using data boundary management information. Scheme A shows data stored in a temporary accumulator RAM that is then subjected to metagroup mapping prior to storage in flash memory with data boundary management. Scheme B shows data stored in flash memory with intermediate metagroup mapping prior to metagroup re-mapping and then storage in flash memory with data boundary management.

A temporary accumulator RAM receives sectors of data from a host that are subsequently transferred for parallel programming in flash memory in a way that may be determined by the locations of data boundaries. The accumulator RAM may have sufficient capacity to allow at least one program block of data to be stored. Thus, the data in the accumulator RAM may be configured into metagroups that may then be programmed in parallel in a single program block. The accumulator RAM may be a non-volatile memory such as NVRAM 1901. Alternatively, accumulator RAM may be a volatile memory in which case there is a risk of loss of data in the accumulator RAM if power is removed by the host before the data is programmed to flash memory. This risk may be managed by having an appropriate protocol between the host and the memory system.

FIG. 28A shows a program block 2800 that is made up of metablocks A-D shown in FIG. 25. For maximum programming speed, it is desirable to program metablocks A-D together and thus use the maximum parallel programming capacity of the memory system. For efficiency in updating files, it is desirable to keep metablocks B and C as separate metablocks consisting of one erase block each. The configuration of data shown in FIG. 28A achieves both of these goals. Sectors of data are received from a host as two separate data runs, data run 2510 from A to A+4n+X and data run 2511 from B+Y to B+3n−1. FIG. 28B shows how the sectors of data from these data runs may be programmed into metablocks A-D. In this example, a page contains a single sector of data, though in other examples a page may contain multiple sectors. A program block extends across all planes of the memory array. Within a program block, sectors may be programmed in an order determined by the metablock configuration. Program block pages are indicated where one program block page is comprised of a page from each plane of the memory array that may be programmed in parallel. Thus, program block page 0 extends across all planes of the memory array and all the sectors in program block page 0 are programmed in the same programming step. When program block page 0 has been programmed, program block page 1 is programmed and so on. The sequence in which the sectors are programmed in FIG. 28B is not the order in which these sectors are received from a host as shown in FIG. 25. The change of order of these sectors in the accumulator RAM is shown in FIG. 28C. FIG. 28C shows data run 2510 and data run 2511 held in accumulator RAM being transferred for programming to program block 2800. Data that is to be copied to the program block may be written to the accumulator RAM as shown. Sectors A+4n+X to A+5n−1 and B to B+Y are copied to the accumulator RAM so that they are available for transfer to the program block. Alternatively, data that is to be copied may already be located in flash memory and may therefore be directly copied from one part of the flash memory array to another. FIG. 28C shows the mapping of sectors for program block page 0 and program block page 1 of FIG. 28B.

Where flash memory is used to provide a temporary storage location for data that is received from a host, as in scheme B in FIG. 27, the data may be stored in an intermediate format comprising various types of metagroups. The size of such metagroups is determined by the presence of a logical boundary such as a data run boundary or file boundary within the logical address range of a maximum sized metagroup and also by the requirement to transfer further data after any logical boundary. The following five metagroup types may be used to provide storage of data in an intermediate form, full metagroups, partial metagroups, short metagroups, start metagroups and multifile metagroups.

A full metagroup 2900 is shown in FIG. 29A. A full metagroup is allocated where there is no logical boundary in the data to be stored or where there is no information available regarding any logical boundaries present.

A partial metagroup 2901 is shown in FIG. 29B. A partial metagroup may be allocated where a logical boundary exists in the data to be stored but maximum parallelism is desired in programming the data in the intermediate format. The logical boundary may be known before programming (for example, from the host) or may be encountered during programming. A partial metagroup contains fewer logical groups of data than the maximum number possible in a metagroup. A partial metagroup is programmed to a metablock of maximum size so that it is programmed using all planes of the array in parallel and so is programmed as rapidly as possible.

A short metagroup 2902 is shown in FIG. 29C. A short metagroup may be allocated where a logical boundary exists in the data to be stored and maximum parallelism is not needed. A short metagroup has fewer logical groups than the maximum number of logical groups possible in a metagroup. A short metagroup is programmed to a metablock that contains fewer erase blocks than are contained in a metablock of maximum size. The data write bandwidth is reduced though relocated data may be programmed in parallel with a short metagroup. A short metagroup may be used when the host has signaled that further data will not immediately follow the data run boundary.

A start metagroup 2903 is shown in FIG. 29D. A start metagroup is allocated to store data at the start boundary of a data run. An alignment offset may be used where the first sector in the data run is not the first sector of a logical group. The data to complete the first logical group may be copied from another location. A start metagroup may also be a partial metagroup where a logical boundary is encountered during a write.

A multifile metagroup 2904 is shown in FIG. 29E. A multifile metagroup contains a file boundary and thus contains portions of at least two different files. A multifile metagroup may also be a partial, short or start metagroup.

Data in metagroups of an intermediate format as described above may be remapped to a more desirable configuration at a later time when a logical boundary is present. Because a full metagroup contains no logical boundary, no remapping is needed. However, partial, short, start and multifile metagroups may be remapped as shown in FIG. 30. FIG. 30A shows remapping of a partial metagroup 3010 into metagroup A and metagroup B. Metagroup B is a metagroup of minimum size (one logical group). Metablock B is completed with data copied from an original block. FIG. 30B shows remapping of a short metagroup 3020 into metagroup A and metagroup B. This is similar to remapping of a partial metagroup. FIG. 30C shows remapping of a start metagroup 3030 into metagroup A and metagroup B. Here, start metagroup 3030 has an alignment offset. This alignment offset is removed so that metagroup A is in sequential order. FIG. 30D shows a multifile metagroup 3040 remapped to metagroups A, B and C. Metagroup B contains logical boundary 3041. Metagroup B is a metagroup of minimum size (one logical group).

Data in an intermediate format may be analyzed for remapping immediately after receipt from a host. However, relocation of data may not take place immediately. Instead, a program operation may be scheduled for the data and information regarding the data and the planned remapping may be stored in a remap list. Data relocation may then be done in the background, at a more suitable time or may be triggered by an event such as receipt of updated data within the range of the stored data. The remap list may be stored in a suitable control information structure in flash memory, for example in the Log, or in a dedicated Remap sector.

The remap list has one entry for each recently written metagroup in intermediate format for which a remap operation is pending. Such metagroups generally contain a data boundary. An entry in the remap list may contain six fields as follows:
Type of metagroup (partial, short, start or multifile)
Logical address of the start of a data run in the metagroup
Metagroup size (number of logical groups in the metagroup)
Metablock size (number of erase blocks in metablock)
Offset of boundary within metagroup
Page tag An entry is added to the list when a metagroup in intermediate format is created. An entry is removed from the list when a metagroup in intermediate format is deleted from the list. When an entry is added or deleted the list may be updated by writing the new list to a new location, for example a new Log sector or a new Remap sector.

Metagroup mappings in the remap list are not used for any of the media management operations relating to the associated data. Media management control structures relate to the intermediate format metagroups that were allocated for temporary storage of the data. Therefore, entries may be removed from the remap list without affecting other media management functions. For example, if the backlog of pending operations becomes too large, entries may be deleted. This simply reduces the efficiency of the way that data is stored in the memory array.

Programming of data from an intermediate format may be scheduled so that write bandwidth available to the host for writing host data is not reduced. A remap operation may be performed as a background operation at a time when data is not being received from the host. All remapped metagroups for a single intermediate metagroup may be programmed in parallel. A handshake protocol with the host may be established to manage power-down of the memory system so that loss of power does not occur while the remap operation is being performed. A remap operation may be performed in parallel with programming of original host data. FIG. 31 shows data from host 3150 programmed to adaptive metablock 3110 while data relocated from memory array 3160 are programmed to adaptive metablock 3120 in parallel. Because such a parallel operation would reduce the write bandwidth available for writing original host data, such parallel programming may only be appropriate where the host notifies the memory system that no further original host data is available for immediate writing. A remap operation may be performed in response to a host update. Where data to be updated is in an intermediate format and is listed in a remap list, the updated data may be written in the remapped format along with data that is copied from the intermediate metagroups.

A remap operation may be suspended to allow prompt response to a new transaction at the host interface. A remap operation may be suspended after the completion of the current page program operation, in which case it is later resumed with the programming of the next page. Alternatively, if the chip architecture allows, a remap operation may be suspended in the course of programming a page, for a fast response to the host. To suspend a remap operation during page programming, its execution in flash memory may be terminated by issuing a reset command to the flash memory chip. The chip is then immediately available for access in response to the new host transaction. The remap operation may be subsequently resumed by re-transferring identical data for the suspended page to the flash chip, followed by a program command. Many flash chip archictures allow programming of a partially programmed page to be restarted, provided the data pattern remains unchanged.

Data Storage Where Host Provides Boundary Location Information

In one embodiment, a host provides additional information to a memory system that may be used to more efficiently store host data in the memory array. One example of such information is the location of a data boundary (logical boundary) in the host data being sent. Typically, the location of the data boundary should be provided before the host data containing the boundary are sent so that the host data may be stored in an efficient manner when they are received and do not have to be stored in an intermediate format first.

In order to store host data in a more efficient manner based on the data boundary locations, it may be advantageous to buffer certain data before storing the data in adaptive metablocks of the memory array. A serial flash buffer may be provided for this purpose. FIG. 32 shows a serial flash buffer 3202 that is made up of erase blocks from the erased block pool 3204. Erase blocks in the serial flash buffer 3202 may be configured as adaptive metablocks of maximum size like a conventional metablock. This allows data to be programmed to the serial flash buffer with the maximum parallelism of the memory array. Where the memory array is divided into planes, this generally means that the metablocks of the serial flash buffer contain an erase block from each plane of the memory array. Thus, the serial flash buffer 3202 is comprised of one or more buffer metablocks, which are generally, but not necessarily, metablocks allowing storage of data with maximum parallelism. An example of a structure that may be used as a serial flash buffer is provided in U.S. Patent application entitled, "Scratch Pad Block," attorney docket number SNDK.406US0, filed on the same date as the present application and hereby incorporated by reference in its entirety.

Host data may be sent to a serial flash buffer 3202 as an alternative to storing the data directly in the memory array in adaptive metablocks as previously described. A serial flash buffer may consist of one or more buffer metablocks in the memory array. A buffer metablock may contain multiple portions of data that are not logically related. The different metablocks within the serial flash buffer 3202 do not have any particular significance because there is no matching of logical boundaries to metablock boundaries of the buffer metablocks. Thus, a portion of sequential data may be stored in a single metablock or may be stored in multiple metablocks and is not generally aligned to the buffer metablocks. As data are copied from buffer metablocks, the data in a buffer metablock may become obsolete. When all the data in a buffer metablock is obsolete, the erase blocks comprising the buffer metablock may be returned to the erased block pool. Thus, buffer metablocks may be formed as needed from erase blocks from the erased block pool. Then, when they contain only obsolete data, the erase blocks are erased and returned to the erased block pool. The serial flash buffer 3202 forms a linear memory where new data to be stored in the serial flash buffer 3202 are written in a buffer metablock formed at the top of the buffer from linked blocks from the erased block pool 3204 (from an allocation block list or a similar structure) and data in buffer metablocks at the bottom of the buffer are copied to allocated adaptive metablocks so that the data in metablocks at the bottom of the buffer becomes obsolete. Erase blocks of buffer metablocks containing only obsolete data are returned to an erased block pool 3204 (to a plane block list or a similar structure). A buffer metablock may be a metablock of fixed size or may be an adaptive metablock of individually selected size. For some examples, a metablock of maximum size may be used as a buffer metablock to provide a high degree of parallelism.

FIG. 33A shows two alternative routes for host data being stored in allocated adaptive metablocks of a flash memory array. Data may be written directly 3306 to an allocated adaptive metablock 3308. Alternatively, data may be written 3310 to a buffer metablock 3312 of a serial flash buffer 3302 and then copied 3314 from the buffer metablock 3312 to an allocated adaptive metablock 3316. Which of these alternative routes is used for particular data may depend on the location of logical boundaries. In particular, where the locations of logical boundaries are provided by a host, a determination as to which route should be used may be made according to the locations provided. Where a portion of data is equal to or greater than a maximum sized metagroup and does not have any logical boundaries, the portion of data may be directly stored in allocated adaptive metablocks. Adaptive metablocks of maximum size are used where possible for maximum parallelism. Where a portion of data that is less than a maximum sized metagroup is to be stored, a determination on which route to use may be based on the size of the portion. Where a portion of data has a logical boundary, it is generally desirable to store it in minimum sized adaptive metablocks. Such portions of data may be stored in a buffer metablock and later copied to allocated adaptive metablocks. This allows such portions of data to be received from a host and initially stored rapidly, with maximum parallelism. Later, these portions of data may be copied to allocated adaptive metablocks in parallel with other data, as shown by 3306 and 3314 in FIG. 33A, so that a high degree of parallelism is used. Thus, writing data with a low degree of parallelism is generally avoided even where adaptive metablocks of minimum size are written.

FIG. 33B shows another example where data in a buffer metablock 3318 is copied 3320 to a minimum sized adaptive metablock 3322 where it is stored with data 3324 copied from an original adaptive metablock 3328. This example is typical of a minimum sized adaptive metablock containing a logical boundary. Because the logical boundary occurs somewhere within the logical address space of the adaptive metablock, when data on one side of the logical boundary are updated both the updated data and some original data are stored in the adaptive metablock.

FIG. 34 shows a scheme using a serial flash buffer, scheme C, in comparison with previously described schemes A and B. Schemes A and B store all received data in some intermediate form (either in RAM or in Flash), determine characteristics of the data (such as location of logical boundaries) and then store the data in Flash according to those characteristics. In contrast, in scheme C, characteristics of the data are received from the host. Receipt of these characteristics allows data to be stored directly in Flash memory according to the characteristics. However, some data are stored in buffer metablocks 3430 and later copied 3432 to be stored in Flash memory according to the characteristics, to allow high-speed operation. Thus, the purpose of the buffer metablocks is different to that of the RAM or intermediate metagroups of schemes A and B and much of the data being stored is directly written to allocated metablocks.

Data may be updated in data runs where a data run is a set of logically contiguous sectors allocated by a host, that were free immediately prior to allocation and that extend between allocated sectors. Thus, a data run is formed when a host allocates data to a continuous portion of free logical address space that is bounded by allocated portions of logical address space. In some systems, data runs are not aligned to the metagroup structure, which may cause inefficiency during updating of data. In certain systems described here, data runs may be better aligned with metagroups by adapting the size and boundary locations of metagroups (and thus the size of the corresponding adaptive metablock) to the data. In particular, minimum sized metagroups may be used to store portions of data that contain logical boundaries. The locations of data run boundaries may be determined by a memory controller. The data run boundary at the start of a data run may be identified when data is received from a host that is not sequential to the last data received. The data run boundary at the end of a data run may also be identified by a jump in logical address. The last sector prior to such a jump may be the last sector of a data run. However, there may be exceptions where a jump in logical address in sectors received from a host is because of updating of system information (such as FAT) or interleaving writes to different data runs. A host may write to more than one data run in an interleaved manner in some systems. A controller may maintain multiple open data runs to deal with this situation, so that if data is received that is sequential to an open data run, it is treated as part of that data run. If it is not sequential to an open data run, it may be considered to be the start of a new data run. Open data runs may be closed by the controller after a period of time, when the number of data runs reaches a limit or in response to a signal from the host.

FIG. 35A shows a data run 3530 stored with non-alignment (N). This is a data run that is stored without regard to the locations of logical boundaries. The metagroup structure shows all metagroups of maximum size. FIG. 35B shows a data run 3532 stored with partial alignment (P). A minimum-sized metagroup 3534 (one logical group) is used to store the data run boundary at the start of data run 3532. The remainder of data run 3532 is stored in maximum sized metagroups 3536, 3538, so that the end of the data run occurs in a maximum sized metagroup 3538. Thus, for a data run with a data boundary at each end, only one data boundary is allocated to a metagroup of minimum size. FIG. 35C shows a data run 3540 stored with full alignment (F). Data run boundaries at both ends of data run 3540 are allocated metagroups of minimum size 3542, 3548. Maximum-sized metagroups are used where possible (e.g. metagroup 3544) for high parallelism. However, a reduced-size metagroup 3546 is used for the penultimate metagroup in this example.

Typically, where a minimum-sized metagroup is allocated to each end of a data run, the portion of the data run between these metagroups does not form an integer number of maximum-sized metagroups. Therefore, at least one metagroup from the mid-portion of the data run is of less than maximum size. In the example shown in FIG. 35C, the penultimate metagroup 3546 is the reduced-size metagroup (or pad metagroup). However, the pad metagroup does not have to be in any particular location. FIG. 35 D shows a data run structure having a data run mapped to adaptive metablocks of different sizes. A head block 3550 and a tail block 3556 of minimum size are used for the logical groups containing the data run boundaries. Between the logical groups 3550, 3556, containing the data run boundaries, data are mapped to adaptive metablocks of maximum size where possible (e.g. metablock 3552). In other examples multiple full blocks are used for a data run. The remaining data are stored in a pad block 3554, which is an adaptive metablock of reduced size.

FIG. 35E shows data runs of different length stored with full alignment in a memory having a maximum metagroup size of eight logical groups. Where data run boundaries occur in a single logical group, this logical group forms a metagroup of minimum size 3558 and may be considered a head metagroup. Where the data run extends into two logical groups, each logical group forms a metagroup of minimum size 3560, 3562, and may be considered as head and tail metagroups. Where the data run extends into three logical groups, the middle logical group 3564 forms a metagroup of minimum size and may be considered a pad metagroup. For data runs extending into between three and nine logical groups, the head and tail metagroups remain the same with the pad metagroup increasing in size according to the size of the data run. Where the data run extends into ten logical groups, a full metagroup 3566 may be formed between the head and tail metagroups. Thus, no pad metagroup may be necessary. For data runs greater than ten logical groups, a full metagroup and a pad metagroup may be formed. For data runs larger than eighteen logical groups, two full metagroups may be formed. For larger data runs multiple full metagroups may be formed along with a pad metagroup of appropriate size when required.

When data are updated by a host, the data are generally received in data runs that extend between data run boundaries. The locations of such data run boundaries may be the same as those previously identified and used to store data. Thus, a data run may update data that are already stored in a manner aligned to data run boundaries of the update data. For example, where a data run updates data that was previously updated by a data run extending over the same logical address range, the data may be aligned to the same logical boundaries. If the stored data were stored with full alignment to the same data boundaries then updating the data involves a full-to-full transition. If the stored data were stored with partial alignment then updating may involve either a partial-to-full or partial-to-partial transition. If the stored data were stored with non-alignment then updating may involve a non-to-full, non-to-partial or non-to-non transition. FIG. 36 shows some of the transitions that may occur during updating of data. While certain other transitions (such as full-to-non) are possible they are not generally desirable and are not shown in FIG. 36.

FIG. 37 shows an example of a full-to-full (F2F) transition when a data run 3770 is received from a host. The data run 3770 may be received as a stream of logically sequential sectors of data. In addition, the host may send data boundary location information including the locations of data boundaries at the start and end of the data run. While the location of the start 3772 of the data run may be determined from the address of the first sector received in a data run 3770 and need not be known beforehand, the location of the end 3774 of the data run is known before the last sector of data run 3770 is received to allow full alignment in this example. In other examples, the location of the end of a data run may not be known with certainty but the location may be predicted from the location of the end of a previous data run. Such data boundary locations may be recorded by the host in a list. The data run boundaries of the data run 3770 from the host are the same as the data run boundaries of a previously received data run that was stored with full-alignment. Thus, updated metagroups may be allocated that have the same sizes as the original metagroups. Portions of data A and D of the data run 3770 are in logical groups that include a data run boundary and are therefore stored in minimum sized metagroups. They are therefore initially stored in the serial flash buffer (A→K, D→L). Data in buffers K and L are later copied to head metagroup 3776 and tail metagroup 3778 (K→F, L→I) along with original data (P→E, Q→J). Head and tail metagroups 3776, 3778 are stored as minimum-sized metablocks in the memory array. Portion B of the data run forms a maximum sized metagroup G and is therefore stored directly in an allocated metablock of maximum size without being stored in the serial flash buffer. Portion C of data run 3770 forms a metagroup H of less than maximum size. Metagroup H is written directly to an allocated adaptive metablock in the flash memory.

In certain examples, aportion of data such as portion C may be stored in the serial flash buffer prior to storage in an allocated adaptive metablock. However, depending on the size of portion C it may be more efficient to write it directly to Flash memory. For example, where portion C comprises an amount of data that is nearly that of a full metagroup, it may be more efficient to write the data directly to Flash than to write it to the serial buffer and later copy it to Flash in an aligned format. In general, the gain in efficiency from buffering data in the serial buffer is greatest for small amounts of data and is least for large amounts of data. A determination of whether to buffer data may be based on the size of a portion of data. Full metagroups of data may be written directly to maximum sized metablocks, data comprising one logical group or less may be written to the serial buffer and data of between one logical group and one full metagroup may be buffered if it is less than a threshold size. For example, the threshold may be half the number of logical groups in a full metagroup, or half the number of logical groups in a full metagroup minus 2 (N/2−2, where N is the number of logical groups in a full metagroup). N/2−2 is a threshold value calculated to allow efficient operation and have a convergent serial flash buffer. Thus, if there are sixteen logical groups in a metagroup a portion of data containing six logical groups or less may be buffered in the serial buffer, while portions of data containing more than six logical groups may be written directly to Flash.

FIG. 38 shows an example of a transition from partial alignment to full alignment (P2F). In this example a data run 3880 is received from a host and is stored with full alignment. A head metagroup 3882 and tail metagroup 3884 of minimum size are allocated. Data that are updated by data run 3880 were previously stored in a manner that is partially aligned to the data boundaries of the data run. Thus, an original metagroup 3886 of minimum size exists for the same logical address space as the head metagroup. However, there is no original minimum sized metagroup corresponding to the tail of the data run. The data at the start of the data run is handled similarly to that shown in FIG. 37. Data A are stored in serial flash buffer (A→K). Subsequently, data in buffer K is copied to an updated metagroup 3882 of minimum size (K→F) along with data in buffer E that are copied from an original metagroup (P→E). Data B and C are programmed to metagroups G and H as before. Metagroup G is shown as a metagroup of maximum size that may be programmed directly to an updated metablock of maximum size. Metagroup H is of less than maximum size and may either be programmed directly to an updated metablock or may be first stored in serial flash buffer depending on the size of metagroup H. In this example, metagroup H is programmed directly to an updated metagroup. Where longer data runs are received, additional metagroups of maximum size may be used.

Data D at the end of data run 3880 are copied to serial flash buffer (D→L) and subsequently copied to tail metagroup 3884 along with data J copied from an original metagroup (Q→J). Data J are copied from a metagroup 3888 of greater than minimum size (in this case a metagroup of maximum size). Metagroup 3888 includes a logical group R that contains only data that are not updated by the data run. Logical group R is relocated to a relocation metagroup (RET). In other examples a relocation metagroup may contain multiple logical groups. This copying of original data from the original metagroup to a relocation metagroup may be done in parallel with other programming operations for greater efficiency. As can be seen from FIGS. 37 and 38, a partial to full transition may involve more copying of data than a full-to-full transition does (e.g. copying of original data R to relocation metablock T).

FIG. 39 shows an example of a transition from partial alignment to partial alignment (P2P) for a data run 3990 received from a host. This transition is similar to those described above for data at the start of a data run. Data A at the start of the data run 3990 are stored in the serial flash buffer (A→K) and are later copied to an updated metagroup 3992 of minimum size (K→F) along with data E that are copied from an original metagroup 3994 (P→E). Data B are programmed to a metagroup of maximum size (B→G). Data D that extend to the data run boundary and include less than a maximum sized metagroup are written to a maximum sized updated metagroup 3996 (D→I). Data Q from an original metagroup is copied to the same maximum sized update metagroup 3996 (Q→J). Thus, the alignment remains the same during this transition with the start data run boundary mapped to an adaptive metagroup 3992 of minimum size and the remaining data are mapped to adaptive metagroups of maximum size.

FIG. 40 shows an example of a transition from non-alignment to full alignment (N2F). Data run 4002 from the host is received and is used to update original data that are stored without alignment (non-alignment) to the data run boundaries. In this example, the original data are stored in metablocks of maximum size. In contrast, updated metagroups include head metagroup 4004 and tail metagroup 4006 of minimum size for the data boundaries at the start and end of data run 4002. Data A from the first partial logical group of data run 4002 are buffered to the serial buffer (A→K). Similarly, data D from the last partial logical group of the data run is buffered to a serial buffer (D→L). This may be in response to information provided by the host regarding the location of the data run boundary at the end of data run 4002. Data B are stored as a metagroup of maximum size (B→G). For larger data runs, additional data may be stored as additional metagroups of maximum size. Metagroup G is stored in a metablock of maximum size. The remaining data C that are not allocated to either a head, tail or maximum size metagroup is allocated to a pad metagroup (C→H). Metagroup H is stored directly in a metablock of less than maximum size in this example, though in other examples it may first be stored in a serial buffer and then copied to a metablock of less than maximum size. In this example, C may be considered as tail pad data and H may be considered a tail pad block. Data in original metagroups that are not updated (O, P, Q, R) are copied to either relocation metagroups (OS, R→T) or to head and tail metagroups (P→E, Q→J). Copying of these portions of data may be done in parallel where possible. For example, copying of portions O and R to relocated metagroups S and T may be done in parallel where O and R together comprise data equivalent to one maximum sized metagroup or less. Copying of portions P and Q may be done in parallel with other copying operations from other original metagroups or from the serial buffer. Where data portion C is short, data portion C may be buffered and may be copied to an updated metagroup in parallel with other programming operations such as programming of data portions E, F, I and J.

FIG. 41 shows an example of a transition from non-alignment to partial alignment (N2P). Original metagroups are not aligned to the data run boundaries of the data run 4110. In this example, original metagroups are maximum-sized metagroups although this is not necessarily so for non-alignment. Updated metagroups are formed having partial alignment with the data run. An updated metagroup 4112 of minimum size is allocated for the data run boundary at the start of data run 4110 as in FIG. 40. The remaining metagroups are maximum size metagroups and the data run boundary at the end of data run 4110 is not allocated to a minimum sized metagroup. Instead, the data run boundary at the end of data run 4110 is allocated to a metagroup of maximum size 4114 in this example. Original metagroups contain original data (O, P, Q, R) that are copied to updated metagroups (P→E, Q→J) or to relocated metagroups (OS, R→T).

FIG. 42 shows another example of a transition from non-alignment to partial alignment (N2P). Original metablocks are again metablocks of maximum size. FIG. 42 shows a data run 4220 from host having data run boundaries that do not correspond to original metablocks (non-alignment). Updated metablocks are formed to store the data in the data run with partial alignment to the data boundaries. In this example, an updated metagroup of minimum size 4222 is assigned to the data run boundary at the start of data run 4220. Metagroup boundaries of other updated metagroups are located at the same positions as metagroup boundaries of original metagroups. In this example, a metagroup of less than maximum size G is used between the head metagroup and the next metagroup boundary. This may be considered a head pad metagroup and the data stored in it may be considered head pad data. A head pad metagroup may be stored in a head pad metablock either directly or after being buffered in a serial flash buffer. The determination as to whether to store a head pad metagroup directly or buffer it may be based on whether it is greater or less than some threshold (as previously discussed with respect to tail pad data). As before, original data may be copied to relocated metagroups (O→S) or updated metagroups (Q→J) as required.

FIG. 43 shows an example of a transition from non-alignment to non-alignment (N2N). In this example a data run 4330 is received from a host that updates data stored in original metagroups that do not have any alignment to the boundaries of the data run. The updated data are stored in updated metagroups that also do not have any alignment to the boundaries of the data run. In this example, both original metagroups and updated metagroups include only metagroups of maximum size. This scheme may be used in systems that do not use adaptive metablocks (systems in which metablock size is fixed). No serial flash buffer is used in this example. Original data (P, Q) are copied to the updated metablocks (P→E, Q→J). Thus, a large amount of original data are stored in updated metagroups and if subsequent data runs are received with the same data run boundary locations, this data will be copied again.

Data Run Update Management

A file is a set of data created within a host system, or received by the host system from an external source, which is mapped within the host system to logical sector addresses. A set of contiguous logical sector addresses is termed a data run. A data run may be considered a set of logically contiguous sectors allocated by a host for storage of one or more files or portions of a file, the data run extending between previously allocated portions of logical address space. The host may interleave write operations to different data runs. Typically, a limited number of open data runs is allowed at any time so that data runs are opened and closed according to requirements. A sector within a data run may be written to an open buffer or to an update block associated with the data run. Receiving and storing data from data runs involves management of data runs and the memory structures (including buffers and update metablocks) used to store the data. FIG. 44 shows some of the structures and the operations that may be carried out on them.

Opening a data run may occur when a sector is received that is not sequential to the last sector in an existing data run and is not within the range of a permitted sequential address jump from the last sector in an existing data run. A data run may be closed when it is the least recently updated (LRU) data run, the permitted maximum number of data runs exists and a new data run must be opened. It may also be closed when a sector within the data run is updated which causes the update to be considered chaotic. Such chaotic updates are generally handled using other methods, such as those described in U.S. patent application Ser. No. 10/750,155.

A buffer may be a portion of a serial flash buffer for writing sequential data from a data run. A buffer need not be physically contiguous in the serial flash buffer. Interleaved writing to multiple buffers may be facilitated by having non-contiguous buffers. A buffer may be opened when a data run is opened if the first logical group of the data run is incomplete. A buffer may also be opened when the first sector is received for the last logical group of a data run. A buffer may also be opened for pad data (either head or tail pad) where the pad data are less than some predetermined amount. A buffer may be closed when the data to be written to it are complete. A closed buffer is copied by writing all of its data to an update block. A copy may occur when the buffer is one of the next available buffers at the end of the serial flash buffer. Typically, such copying occurs in parallel with other copying of other buffers or of original data.

An update metablock may be an adaptive metablock into which some updated data from a host or from a buffer are written. An update metablock may be allocated when data are received that are not sent to a buffer and for which no incomplete update metablock exists. An update metablock may also be allocated when data are copied from a buffer. The size of the update metablock depends on the amount of data to be stored. Update metablocks may be minimum size metablocks, reduced size metablocks or maximum size metablocks. For example, a minimum size metablock may be used for the start (head) and end (tail) of a data run, a reduced size metablock may be used for pad data (head pad or tail pad) and a maximum size metablock may be used for all other data of a data run. An update block may be considered complete when the last sector is filled with data from either the host, a buffer or an original block. Thus, completion may occur as a result of a copy operation from a buffer or as a result of copy from an original block, which may be triggered by closure of a data run.

An original metablock may be an adaptive metablock, which contains one or more sectors that have been made obsolete by updated sectors from a host. A metablock may be considered an open original metablock when a sector within it is made obsolete by receipt of a sector of updated data. An original metablock may be considered complete when no further sectors within it may be made obsolete by further writing by the host to any open data run. Data may be copied from a complete original metablock to a relocation metablock. A complete original metablock may be considered a fully obsolete original metablock when all valid sectors within it have been copied. A fully obsolete original metablock may be erased.

A relocation metablock is an adaptive metablock into which sequential logical groups of data may be copied from an original metablock. A relocation metablock may be allocated when data are to be copied from an original metablock and are not part of a head or tail metablock. A relocation metablock may be considered complete when its last sector position has been written. Relocation metablocks may be minimum size or reduced size metablocks.

FIG. 45 shows a flowchart for storing sectors received from a host with data boundary alignment according to an embodiment of the present invention. While this example shows sectors of data being stored, other units of data may also be used. Initially a determination is made as to whether storage of the sectors involves a chaotic update to an open data run 4550. A chaotic update is one in which sectors are updated in a non-sequential manner and is described further in application Ser. No. 10/750,155 which application is hereby incorporated by reference in its entirety. A chaotic update to an open data run may be carried out as an alternative to storage with data boundary alignment. Thus, chaotic updates are not described in detail here. If it is determined that the sectors do not require a chaotic update then it is determined if the received sectors are sequential to an open data run or not 4552.

If the received sectors are not sequential to an open data run and if the number of open data runs is less than a predetermined maximum 4554, a new data run is opened 4556. If the number of open data runs is not less than the predetermined maximum then a data run must be closed 4558 (as detailed later) before opening a new data run 4556. After a new data run is opened it is determined if there is an offset from the logical group boundary to the start of the data run 4560. If there is an offset then a buffer is opened 4562, the size of the buffer being equal to the head data, i.e. that portion of the data run that is in the first logical group. Sectors are subsequently written to this buffer until the end of the buffer is reached and the buffer is closed.

If the received sectors are sequential to an open data run and an open buffer exists for the data run 4564, then the sectors are written to the buffer 4566. If no open buffer exists for data run 4564 but an incomplete metablock exists for data run 4568, then the sectors are written to the incomplete metablock 4570 as described later. If no open buffer and no incomplete metablock exist for the data run, then it is determined if the received sectors are head pad data 4572. Also, where a new data run is opened with no offset from a logical group boundary 4560, this determination is made. Where the sectors are head pad data, the amount of data (number of sectors) is compared 4574 to a predetermined value (maxpad) that is the maximum pad length for buffering. If the number of sectors are not greater than maxpad then a buffer is opened 4576 that is equal in size to the head pad data. If the number of sectors is greater than maxpad then a reduced metablock is allocated 4578 and subsequently the sectors are written to this reduced metablock 4570.

If the sectors are determined not to be head pad data 4572 then it is next determined whether the sectors are either tail pad or tail data 4580. If they are not tail pad or tail data, then a maximum size metablock is allocated 4582 and the sectors are subsequently written to the maximum size metablock 4570. This is a sort of default condition for data that is neither head nor tail data. Thus, data in the middle of a data run is generally written to metablocks of maximum size to use maximum parallelism. If the sectors contain tail pad or tail data it is determined if the sectors are tail data (from the last logical group of the data run) 4584. If they are from the last logical group, then a buffer is opened 4586, the buffer size equal to the tail data (equal to the data from the data run in the last logical group). Subsequently, the sectors are written to the buffer 4566. If the sectors are not from the last logical group, then the sectors are tail pad data and it is determined if the tail pad length is greater than a predetermined size (maxpad) 4588. If the number of sectors is greater than maxpad then a reduced size metablock is allocated 4578 and sectors are subsequently written to the metablock 4570. If the tail pad is not greater than maxpad 4588, then a buffer is opened that is equal to the tail pad 4590. The sectors are subsequently written to this buffer 4566.

FIG. 46 shows a flowchart for writing sectors to one or more metablocks. In this and other flowcharts of this application, the logical flow is towards the bottom of the flowchart with decision boxes having an affirmative outcomes shown below the box and negative outcomes shown to one side of the box. It is first determined if the metablock allocated for storage of a group of sectors is a reduced or minimum size metablock 4601. If a reduced or minimum size metablock is not allocated (maximum size metablock allocated), then sectors to be written are written to the allocated metablock in parallel 4603. Then, a determination is made as to whether the metablock is full or not 4605. If the metablock is full, then it is designated "complete," 4607. It is then determined whether all of the data corresponding to the data run or to further data that may be written by the host to the data run has become obsolete in an original metablock 4609 and if so, the original block is considered complete 4611. If a reduced or minimum size metablock is being written 4601, then if no buffers are currently being copied 4612, closed buffers available to be copied are identified 4613 and any original data associated with those buffers is identified 4615 and one or more reduced or minimum size metablocks are allocated 4617. If original data is not currently being relocated 4619, then data to be relocated from a complete original metablock is identified 4612 and a reduced or minimum size metablock is allocated 4623. Writing of sectors to the metablock allocated to the group of sectors in parallel with writing of sectors being copied from a buffer or being relocated to reduced metablock(s) is then carried out as before.

FIG. 47 shows a flowchart for closing a data run. The least recently used (LRU) data run is first identified 4731. If any open buffer exists for this data run 4733 then it is closed 4735 and if any incomplete metablocks exist for the data run 4737 then data are copied from original metablocks or buffers 4739 until the incomplete metablocks become complete 4741. If any partially obsolete original metablocks exist 4743 (complete original metablocks) then reduced size metablocks are allocated 4745 as relocated metablocks and valid sectors are copied 4747 until the original block is fully obsolete 4749. The data run may then be designated as closed 4751.

Although the invention has been described with respect to various exemplary embodiments, it will be understood that the invention is entitled to protection within the full scope of the appended claims.

It is claimed:

1. A removable memory card for storage of data, comprising:
   a non-volatile memory array having a minimum unit of erase of an erase block and having a first part in which erase blocks are grouped into adaptive metablocks containing different numbers of erase blocks that are programmed in parallel, the number of erase blocks selected according to locations of logical boundaries in data to be stored, the memory array having a second part in which data is stored in metablocks in a manner that is not dependent on locations of data boundaries in data to be stored in the second part of the memory array; and
   a controller that determines whether a portion of data received by the memory card is initially sent to the first part or the second part of the memory array depending on whether the portion of data contains a logical boundary or not.

2. The removable memory card of claim 1 wherein the portion of data contains the logical boundary and the portion of data is sent to the second part of the memory array and is subsequently copied to the first part of the memory array.

3. The removable memory card of claim 2 wherein the copying to the first part of the memory array is in parallel with copying of additional data from the second part of the memory array to the first part of the memory array.

4. The removable memory card of claim 2 wherein the copying to the first part of the memory array is in parallel with copying of additional data from the second part of the memory array in a copying operation using maximum parallelism of the non-volatile memory array.

5. The removable memory card of claim 1 wherein the portion of data contains the logical boundary and is initially sent to the second part of the memory array and is subsequently copied from the second part of the memory array to an adaptive metablock of minimum size in the first part of the memory array.

6. The removable memory card of claim 1 wherein the first part of the memory array consists of a first plurality of erase blocks, the second part of the memory array consists of a second plurality of erase blocks, erase blocks that make up the first and second pluralities being interchangeable such that an individual erase block is one of the first plurality of erase blocks at a first time and one of the second plurality of erase blocks at a second time.

7. The removable memory card of claim 1 further comprising a third part in which erase blocks do not contain valid data and are not grouped into metablocks, individual erase blocks in the third part being transferred to the first and second parts to store data and individual erase blocks of the first and second parts being transferred to the third part when they do not contain valid data.

8. The removable memory card of claim 1 wherein the first part comprises a first plurality of dedicated erase blocks, individual ones of the first plurality forming adaptive metablocks that contain data, additional individual ones of the first plurality not containing data and not grouped into adaptive metablocks.

9. The removable memory card of claim 8 wherein the controller selects erase blocks from the additional individual ones of the first plurality to form new adaptive metablocks to store data.

10. The removable memory card of claim 1 wherein the second part comprises a second plurality of dedicated erase blocks, individual ones of the second plurality forming metablocks that contain data, additional individual ones of the second plurality not containing data and not grouped into metablocks.

11. The removable memory card of claim 10 wherein the controller selects erase blocks from the additional individual ones of the second plurality to form new metablocks to store data.

12. A method of storing data in adaptive metablocks in a memory array, an adaptive metablock comprising an individually selected number of erase blocks, an erase block being a minimum unit of erase of the memory array, the memory array including a serial flash buffer that comprises one or more buffer metablocks of maximum size, comprising:
    storing a first portion of data that contains a first logical boundary in a buffer metablock in the serial flash buffer;
    subsequently copying the first portion of data from the buffer metablock to a first adaptive metablock that is not in the serial flash buffer, the first adaptive metablock consisting of one erase block; and
    storing a second portion of data that does not contain a logical boundary in a second adaptive metablock that is not in the serial flash buffer, the second adaptive metablock comprising more than one erase block.

13. The method of claim 12 wherein the second adaptive metablock is a metablock of maximum size.

14. The method of claim 12 wherein the copying of the first portion of data from the buffer metablock is in parallel with copying of additional data from the serial flash buffer to locations in the memory array that are not in the serial flash buffer.

15. The method of claim 14 wherein the additional data includes a second portion of data that contains a second logical boundary, the second portion of data copied to a third adaptive metablock consisting of one erase block.

* * * * *